US010034001B2

(12) United States Patent
Sugio et al.

(10) Patent No.: US 10,034,001 B2
(45) Date of Patent: Jul. 24, 2018

(54) IMAGE CODING METHOD, IMAGE CODING APPARATUS, IMAGE DECODING METHOD, IMAGE DECODING APPARATUS, AND IMAGE CODING AND DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Kyoko Tanikawa, Osaka (JP); Hisao Sasai, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 15/798,618

(22) Filed: Oct. 31, 2017

(65) Prior Publication Data
US 2018/0063533 A1  Mar. 1, 2018

Related U.S. Application Data

(63) Continuation of application No. 15/434,094, filed on Feb. 16, 2017, now Pat. No. 9,838,695, which is a
(Continued)

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/176* (2014.11); *H04N 19/184* (2014.11)

(58) Field of Classification Search
CPC .. H04N 19/105; H04N 19/139; H04N 19/176; H04N 19/184
See application file for complete search history.

(56) References Cited

U.S. PATENT DOCUMENTS 5,905,535 A   5/1999  Kerdranvat
5,995,080 A   11/1999  Biro et al.
(Continued)

FOREIGN PATENT DOCUMENTS

CN   1525762    9/2004
CN   1537390    10/2004
(Continued)

OTHER PUBLICATIONS

Extended European Search Report from European Patent Office (EPO) in European Patent Appl. No. 16193061.5, dated Jan. 27, 2017.
(Continued)

*Primary Examiner* — Anner N Holder
(74) *Attorney, Agent, or Firm* — Greenblum & Bernstein, P.L.C.

(57) ABSTRACT

A coding apparatus derives a first candidate having a first motion vector that has been used to code a first block, a second candidate having a second motion vector that is a first zero vector, and a third candidate having a third motion vector that is a second zero vector. The coding apparatus selects one candidate from candidates including the first, second, and third candidates, and codes an index identifying the selected candidate. A decoding apparatus derives a fourth candidate having a fourth motion vector that has been used to decode the first block, a fifth candidate having a fifth motion vector that is a third zero vector, and a sixth candidate having a sixth motion vector that is a fourth zero vector. The decoding apparatus derives an index identifying one candidate from candidates including the fourth, fifth, and sixth candidates, and selects the candidate identified by the index.

2 Claims, 54 Drawing Sheets

Related U.S. Application Data continuation of application No. 13/479,669, filed on May 24, 2012, now Pat. No. 9,615,107.

(60) Provisional application No. 61/490,777, filed on May 27, 2011.

(51) Int. Cl.
*H04N 19/184* (2014.01)
*H04N 19/176* (2014.01)

(56) References Cited

U.S. PATENT DOCUMENTS

| | | |
|---|---|---|
| 6,192,080 B1 | 2/2001 | Sun et al. |
| 6,424,676 B1 | 7/2002 | Kono et al. |
| 6,427,027 B1 | 7/2002 | Suzuki et al. |
| 6,594,313 B1 | 7/2003 | Hazra et al. |
| 6,795,499 B1 | 9/2004 | Kato et al. |
| 7,154,952 B2 | 12/2006 | Tourapis et al. |
| 7,266,147 B2 | 9/2007 | Deshpande |
| 7,301,482 B1 | 11/2007 | Oberg |
| 7,372,905 B2 | 5/2008 | Foo et al. |
| 7,394,851 B2 | 7/2008 | Kato et al. |
| 7,660,354 B2 | 2/2010 | Shi et al. |
| 7,664,180 B2 | 2/2010 | Kondo et al. |
| 7,680,186 B2 | 3/2010 | Lee et al. |
| 7,697,783 B2 | 4/2010 | Lee et al. |
| 7,702,168 B2 | 4/2010 | Thoreau et al. |
| 7,742,526 B2 | 6/2010 | Kondo et al. |
| 7,746,929 B2 | 6/2010 | Valente |
| 7,801,219 B2 | 9/2010 | Kondo et al. |
| 7,835,436 B2 | 11/2010 | Aridome et al. |
| 7,852,936 B2 | 12/2010 | Mukerjee et al. |
| 7,856,060 B2 | 12/2010 | Kondo et al. |
| 7,940,845 B2 | 5/2011 | Kondo et al. |
| 8,005,144 B2 | 8/2011 | Ji et al. |
| RE43,062 E | 1/2012 | Deshpande |
| 8,175,444 B2 | 5/2012 | Kang et al. |
| 8,180,201 B2 | 5/2012 | Kang et al. |
| 8,190,003 B2 | 5/2012 | Kang et al. |
| 8,208,541 B2 | 6/2012 | Iguchi et al. |
| 8,208,544 B2 | 6/2012 | Song et al. |
| 8,249,147 B2 | 8/2012 | Watanabe et al. |
| 8,275,235 B2 | 9/2012 | Kang et al. |
| 8,325,819 B2 | 12/2012 | Karczewicz |
| 8,355,438 B2 | 1/2013 | Shimizu et al. |
| 8,374,245 B2 | 2/2013 | Tourapis et al. |
| 8,379,722 B2 | 2/2013 | Tourapis et al. |
| 8,396,344 B2 | 3/2013 | Kang et al. |
| 8,538,248 B2 | 9/2013 | Kang et al. |
| 8,542,977 B2 | 9/2013 | Kang et al. |
| 8,565,314 B2 | 10/2013 | Karczewicz et al. |
| 8,599,926 B2 | 12/2013 | Karczewicz |
| 8,670,486 B2 | 3/2014 | Hannuksela |
| 8,675,735 B2 | 3/2014 | Shimizu et al. |
| 8,718,141 B2 | 5/2014 | Kondo et al. |
| 8,761,258 B2 | 6/2014 | Au et al. |
| 8,774,280 B2 | 7/2014 | Tourapis et al. |
| 8,873,630 B2 | 10/2014 | Tourapis et al. |
| 9,185,427 B2 | 11/2015 | Tourapis et al. |
| RE45,983 E | 4/2016 | Deshpande |
| 9,319,700 B2 | 4/2016 | Karczewicz |
| 2003/0202605 A1 | 10/2003 | Hazra et al. |
| 2004/0001546 A1 | 1/2004 | Tourapis et al. |
| 2004/0008786 A1 | 1/2004 | Boyce |
| 2004/0028134 A1 | 2/2004 | Subramaniyan et al. |
| 2004/0047418 A1 | 3/2004 | Tourapis et al. |
| 2004/0052507 A1 | 3/2004 | Kondo et al. |
| 2004/0086044 A1 | 5/2004 | Kondo et al. |
| 2004/0136461 A1 | 7/2004 | Kondo et al. |
| 2004/0146109 A1 | 7/2004 | Kondo et al. |
| 2004/0179620 A1 | 9/2004 | Foo et al. |
| 2004/0190606 A1 | 9/2004 | Deshpande |
| 2004/0223551 A1 | 11/2004 | Hannuksela |
| 2004/0234143 A1 | 11/2004 | Hagai et al. |
| 2004/0264566 A1 | 12/2004 | Kato et al. |
| 2005/0013497 A1 | 1/2005 | Hsu et al. |
| 2005/0025244 A1 | 2/2005 | Lee et al. |
| 2005/0062885 A1 | 3/2005 | Kadono et al. |
| 2005/0078683 A1 | 4/2005 | Page |
| 2005/0141612 A1 | 6/2005 | Abe et al. |
| 2005/0152452 A1 | 7/2005 | Suzuki |
| 2005/0152682 A1 | 7/2005 | Kang et al. |
| 2005/0185928 A1 | 8/2005 | Kang et al. |
| 2005/0213828 A1 | 9/2005 | Thoreau et al. |
| 2005/0243927 A1 | 11/2005 | Hubrich et al. |
| 2005/0243928 A1 | 11/2005 | Hubrich et al. |
| 2006/0023790 A1 | 2/2006 | Tsai et al. |
| 2006/0050778 A1 | 3/2006 | Aridome et al. |
| 2006/0088094 A1 | 4/2006 | Cieplinski et al. |
| 2006/0088286 A1 | 4/2006 | Shibata et al. |
| 2006/0182436 A1 | 8/2006 | Tabuchi et al. |
| 2006/0204228 A1 | 9/2006 | Kang et al. |
| 2006/0209963 A1 | 9/2006 | Valente |
| 2006/0215999 A1 | 9/2006 | Kang et al. |
| 2006/0216000 A1 | 9/2006 | Kang et al. |
| 2006/0233530 A1 | 10/2006 | Kang et al. |
| 2006/0239358 A1 | 10/2006 | Soh et al. |
| 2006/0269153 A1 | 11/2006 | Shi et al. |
| 2006/0280253 A1 | 12/2006 | Tourapis et al. |
| 2006/0291556 A1 | 12/2006 | Watanabe et al. |
| 2007/0014358 A1 | 1/2007 | Tourapis et al. |
| 2007/0014360 A1 | 1/2007 | Botzko et al. |
| 2007/0025621 A1 | 2/2007 | Lee et al. |
| 2007/0030899 A1 | 2/2007 | Iguchi et al. |
| 2007/0041452 A1 | 2/2007 | Kondo et al. |
| 2007/0110156 A1 | 5/2007 | Ji et al. |
| 2007/0154103 A1 | 7/2007 | Au et al. |
| 2007/0183499 A1 | 8/2007 | Kimata et al. |
| 2007/0200949 A1 | 8/2007 | Walker et al. |
| 2008/0063060 A1 | 3/2008 | Kondo et al. |
| 2008/0063061 A1 | 3/2008 | Kondo et al. |
| 2008/0063075 A1 | 3/2008 | Kondo et al. |
| 2008/0069231 A1 | 3/2008 | Kondo et al. |
| 2008/0069232 A1 | 3/2008 | Kondo et al. |
| 2008/0084927 A1 | 4/2008 | Rosenzweig et al. |
| 2008/0089420 A1 | 4/2008 | Karczewicz |
| 2008/0089422 A1 | 4/2008 | Karczewicz |
| 2008/0089423 A1 | 4/2008 | Karczewicz |
| 2008/0089424 A1 | 4/2008 | Karczewicz et al. |
| 2008/0117978 A1 | 5/2008 | Kapasi et al. |
| 2008/0175491 A1 | 7/2008 | Kondo |
| 2008/0219350 A1 | 9/2008 | Guo et al. |
| 2009/0074069 A1 | 3/2009 | Jeon |
| 2009/0147855 A1 | 6/2009 | Song et al. |
| 2009/0304084 A1 | 12/2009 | Hallapuro et al. |
| 2010/0086053 A1 | 4/2010 | Okada et al. |
| 2010/0118939 A1 | 5/2010 | Shimizu et al. |
| 2010/0124273 A1 | 5/2010 | Divorra Escoda et al. |
| 2010/0135387 A1 | 6/2010 | Divorra Escoda et al. |
| 2010/0284465 A1 | 11/2010 | Benzler et al. |
| 2011/0038420 A1 | 2/2011 | Lee et al. |
| 2011/0080954 A1 | 4/2011 | Bossen et al. |
| 2011/0090969 A1 | 4/2011 | Sung et al. |
| 2011/0113451 A1 | 5/2011 | Kang et al. |
| 2011/0176612 A1 | 7/2011 | Tsai et al. |
| 2011/0194608 A1 | 8/2011 | Rusert et al. |
| 2011/0194609 A1 | 8/2011 | Rusert et al. |
| 2011/0206123 A1 | 8/2011 | Panchal et al. |
| 2011/0261882 A1 | 10/2011 | Zheng et al. |
| 2011/0286527 A1 | 11/2011 | Kadono et al. |
| 2012/0008688 A1 | 1/2012 | Tsai et al. |
| 2012/0106645 A1 | 5/2012 | Lin et al. |
| 2012/0128060 A1 | 5/2012 | Lin et al. |
| 2012/0128072 A1 | 5/2012 | Kobayashi et al. |
| 2012/0195368 A1 | 8/2012 | Chien et al. |
| 2012/0207221 A1 | 8/2012 | Aono et al. |
| 2012/0230408 A1 | 9/2012 | Zhou |
| 2012/0243609 A1 | 9/2012 | Zheng et al. |
| 2012/0263235 A1 | 10/2012 | Sugio et al. |
| 2012/0320969 A1 | 12/2012 | Zheng et al. |
| 2012/0320984 A1 | 12/2012 | Zhou |
| 2013/0023801 A1 | 1/2013 | Wang et al. |
| 2013/0101038 A1 | 4/2013 | Shimizu et al. |

(56) References Cited

U.S. PATENT DOCUMENTS

| | | | |
|---|---|---|---|
| 2013/0107959 A1 | 5/2013 | Park et al. | |
| 2013/0148737 A1 | 6/2013 | Tourapis et al. | |
| 2013/0208798 A1 | 8/2013 | Tourapis et al. | |
| 2014/0037003 A1 | 2/2014 | Kadono et al. | |
| 2014/0037009 A1 | 2/2014 | Kadono et al. | |
| 2014/0105302 A1 | 4/2014 | Takehara et al. | |
| 2014/0140408 A1 | 5/2014 | Lee et al. | |
| 2014/0241434 A1 | 8/2014 | Lin et al. | |
| 2014/0301472 A1 | 10/2014 | Kadono et al. | |
| 2015/0016527 A1 | 1/2015 | Tourapis et al. | |
| 2015/0288968 A1 | 10/2015 | Kadono et al. | |
| 2015/0312585 A1 | 10/2015 | Kadono et al. | |
| 2016/0088311 A1 | 3/2016 | Kadono et al. | |
| 2016/0094857 A1 | 3/2016 | Kadono et al. | |
| 2016/0094858 A1 | 3/2016 | Kadono et al. | |
| 2016/0134890 A1 | 5/2016 | Tourapis et al. | |

FOREIGN PATENT DOCUMENTS

| | | |
|---|---|---|
| CN | 1578469 | 2/2005 |
| CN | 1833259 | 9/2006 |
| CN | 101090491 | 12/2007 |
| CN | 101198064 | 6/2008 |
| CN | 101379816 | 3/2009 |
| CN | 100515085 | 7/2009 |
| CN | 101518084 | 8/2009 |
| CN | 101600114 | 12/2009 |
| CN | 101860754 | 10/2010 |
| EP | 0314018 | 5/1989 |
| EP | 1414245 | 4/2004 |
| EP | 1521477 | 4/2005 |
| EP | 1906676 | 4/2008 |
| EP | 2250816 | 11/2010 |
| EP | 2448266 | 5/2012 |
| EP | 2717573 | 4/2014 |
| JP | 8-251601 | 9/1996 |
| JP | 10-224800 | 8/1998 |
| JP | 2002-152750 | 5/2002 |
| JP | 2002-534014 | 10/2002 |
| JP | 2005-136979 | 5/2005 |
| JP | 2005-318576 | 11/2005 |
| JP | 2006-519517 | 8/2006 |
| JP | 2007-028617 | 2/2007 |
| JP | 2007-142637 | 6/2007 |
| JP | 2008-211697 | 9/2008 |
| JP | 2008-283490 | 11/2008 |
| JP | 2009-124748 | 6/2009 |
| JP | 2010-529811 | 8/2010 |
| JP | 2013-517853 | 5/2013 |
| JP | 2014-514814 | 6/2014 |
| KR | 1020090058954 | 6/2009 |
| RU | 2381630 | 10/2005 |
| RU | 2310231 | 11/2007 |
| RU | 2387093 | 4/2010 |
| RU | 2009114363 | 10/2010 |
| RU | 2419244 | 5/2011 |
| TW | 545058 | 8/2003 |
| TW | 200604847 | 2/2006 |
| TW | I259726 | 8/2006 |
| TW | I264227 | 10/2006 |
| TW | 200742443 | 11/2007 |
| TW | I317107 | 11/2009 |
| TW | I325281 | 5/2010 |
| TW | I328357 | 8/2010 |
| TW | I329843 | 9/2010 |
| TW | I330976 | 9/2010 |
| TW | I331877 | 10/2010 |
| TW | I335183 | 12/2010 |
| WO | 2004/014060 | 2/2004 |
| WO | 2004/088988 | 10/2004 |
| WO | 2005/013201 | 2/2005 |
| WO | 2006/019093 | 2/2006 |
| WO | 2007/018626 | 2/2007 |
| WO | 2008/086197 | 7/2008 |
| WO | 2009/011501 | 1/2009 |
| WO | 2009/051419 | 4/2009 |
| WO | 2009/115901 | 9/2009 |
| WO | 2009/126260 | 10/2009 |
| WO | 2010/148919 | 12/2010 |
| WO | 2011/046008 | 4/2011 |
| WO | 2011/047994 | 4/2011 |
| WO | 2011/064673 | 6/2011 |
| WO | 2011/103482 | 8/2011 |
| WO | 2012/128903 | 9/2012 |
| WO | 2012/173415 | 12/2012 |
| WO | 2013/001803 | 1/2013 |

OTHER PUBLICATIONS

Office Action from U.S. Patent and Trademark Office (USPTO) in U.S. Appl. No. 13/652,643, dated Apr. 24, 2017.
Office Action from U.S. Patent and Trademark Office (USPTO) in U.S. Appl. No. 15/228,009, dated May 30, 2017.
Summons to attend oral proceedings from European Patent Office (EPO) in European Patent Appl. No. 12789922.7, dated May 24, 2017.
Office Action from European Patent Office (EPO) in European Patent Appl. No. 12793067.5, dated Jun. 8, 2017.
Office Action mailed by European Patent Office (EPO) in European Patent Appl. No. 12789922.7, dated Oct. 19, 2016.
Office Action mailed by European Patent Office (EPO) in European Patent Appl. No. 12793588.0, dated Oct. 19, 2016.
Office Action mailed by European Patent Office (EPO) in European Patent Appl. No. 12793037.8, dated Oct. 19, 2016.
Office Action from European Patent Office (EPO) in European Patent Appl. No. 12804429.4, dated Jun. 27, 2017.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting: Torino, IT, Jul. 14-22, 2011, Document: JCTVC-F803_d6.
Search and Examination Report from Intellectual Property Office of Singapore (IPOS) in Singapore Patent Appl. No. 2013078837, dated Sep. 26, 2016.
Office Action from European Patent Office (EPO) in European Patent Appl. No. 12792164.1, dated Oct. 6, 2016.
Office Action from European Patent Office (EPO) in European Patent Appl. No. 12819464.4, dated Oct. 19, 2016.
Office Action and Search Report from State Intellectual Property Office (SIPO) of the People's Republic of China in Chinese Patent Application No. 201280049393.4, dated Nov. 4, 2016, together with an English language translation of the Search Report.
Office Action from Intellectual Property Corporation of Malaysia in Malaysian Patent Appl. No. PI 2013702134, dated Aug. 30, 2017.
Office Action mailed by the U.S. Patent and Trademark Office (USPTO) dated Jul. 29, 2016 in U.S. Appl. No. 14/725,180.
Office Action mailed by the Japan Patent Office (JPO) dated Aug. 30, 2016 in Japanese Patent Appl. No. 2015-255441.
Office Action from U.S. Patent and Trademark Office (USPTO) in U.S. Appl. No. 15/228,018, dated Jun. 14, 2017.
Office Action from U.S. Patent and Trademark Office (USPTO) in U.S. Appl. No. 15/140,949, dated Jul. 26, 2017.
Toshiyasu Sugio et. al., "Parsing Robustness for Merge/AMVP", Joint collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F470_r3.
Office Action from U.S. Patent and Trademark Office (USPTO) in U.S. Appl. No. 14/725,180, dated Aug. 15, 2017.
Office Action from United States Patent and Trademark Office (USPTO) in U.S. Appl. No. 13/652,643, dated Oct. 30, 2017.
Office Action from United States Patent and Trademark Office (USPTO) in U.S. Appl. No. 15/140,949, dated Nov. 22, 2017.
Office Action from United States Patent and Trademark Office (USPTO) in U.S. Appl. No. 15/602,631, dated Nov. 22, 2017.
Extended European Search Report from European Patent Office (EPO) issued for European Patent Application No. 12804429.4, dated Apr. 15, 2016.

(56) References Cited

OTHER PUBLICATIONS

J. Jung et al., "Proposition for robust parsing with temporal predictor", Joint Collaborative Team on Video Coding (JCT-VC) of ITU-T SG16 WP3 and ISO/IEC JTC1/SC29/WG11 4th Meeting: Daegu, KR, Jan. 20-28, 2011 [JCTVC-D197] WG11 No. m18957. XP30008237.
Yeping Su et al., "On motion vector competition", Joint Collaborative Team on Video Coding (JCT-VC) of ITU-T SG16 WP3 and ISO/IEC JTC1/SC29/WG11 3rd Meeting: Guangzhou, CN, Oct. 7-15, 2010 [JCTVC-C257] WG11 No. m18298. XP30007964.
Guillaume Laroche et al., "RD Optimized Coding for Motion Vector Predictor Selection" IEEE Transactions on Circuits and Systems for Video Technology, vol. 18, No. 9, Sep. 2008.
Martin Winken et al., "Description of video coding technology proposal by Fraunhofer HHI" Joint Collaborative Team on Video Coding (JCT-VC) of ITU-T SG16 WP3 and ISO/IEC JTC1/SC29/WG11 1st Meeting: Dresden, DE, Apr. 15-23, 2010 Document: JCTVC-A116.
Sugio T et al., "Parsing Robustness for Merge/AMVP", 97. MPEG Meeting; Jul. 18-Jul. 22, 2011; Torino, IT, (Motion Picture Expert Group or ISO/IEC JTC1/SC29/WG11) F-470 Version 6, Jul. 22, 2011 XP002758863.
Extended European Search Report from European Patent Office (EPO) issued for European Patent Application No. 12841970.2, dated Jun. 27, 2016.
Bin Li, Jizheng Xu, Feng Wu, Houctiang Li,"Constrained temporal motion vector prediction for error resilience", JCTVC-D139, Daegu, KR, Jan. 20-28, 2011.
Jian-Liang Lin, Yu-Wen Huang, Chih-Ming Fu, Ching-Yeh Chen, Yu-Pao Tsai, Shawmin Lei, "Syntax for AMVP Parsing Error Control", JCTVC-D126, Daegu, KR, Jan. 20-28, 2011.
Office Action from United States Patent and Trademark office (USPTO) issued for U.S. Appl. No. 15/140,949, dated Jul. 11, 2016.
Office Action from State Intellectual Property Office (SIPO) of the People's Republic of China in Chinese Patent Application No. 201280022673.6, dated Jul. 11, 2016, together with an English language translation of the Search report.
Extended European Search Report from European Patent Office (EPO) issued for European Patent Appl. No. 12793067.5, dated Jan. 5, 2016.
Guillaume Laroche et al., "Competition Based Prediction for Skip Mode Motion Vector Using Macroblock Classification for the H.264 JM KTA Software", Advanced Concepts for Intelligent Vision Systems, Lecture Notes in Computer Science, pp. 789-799, Springer Berlin Heidelberg, XP19069087 (Aug. 28, 2007).
Extended European Search Report from European Patent Office (EPO) issued for European Patent Appl. No. 12789922.7, dated Oct. 1, 2014.
Zhou M et al: "A study on HM3.0 parsing throughput issue", 6. JCT-VC Meeting; 97. MPEG Meeting; Jul. 14-Jul. 22, 2011; Torino: (Joint Collaborative Team on Video Coding of ISO/IEC JTC1/SC29/WG11 and ITU-T SG.16); URL: http://wftp3.itu.int/av-arch/jctvc-site/, No. JCTVC-F068, Jul. 2, 2011 (Jul. 2, 2011), XP030009091.
Li (USTC) B et al: "An investigation on robust parsing", 20110311, No. JCTVC-E148, Mar. 11, 2011(Mar. 11, 2011), XP030008654, ISSN:0000-0007.
Extended European Search Report from European Patent Office (EPO) issued for European Patent Appl. No. 12793588.0, dated Oct. 2, 2014.
Extended European Search Report from European Patent Office (EPO) issued for European Patent Appl. No. 12819464.4 dated Nov. 12, 2014.
Extended European Search Report from European Patent Office (EPO) issued for European Patent Appl. No. 12793037.8, dated Nov. 17, 2014 (corrected version).
Yunfei Zheng et al., Extended Motion Vector Prediction for Bi predictive Mode, Joint Collaborative Team on Video Coding (JCT-VC) of ITU-T SG 16 WP3 and ISO/IEC JTC1/SC29/WG11, 5th Meeting: Geneva, Mar. 2011(Mar. 19, 2011), JCTVC-E343, pp. 1-4.

Toshiyasu Sugio and Takahiro Nishi, "Parsing Robustness for Merge/AMVP", Joint collaborative Team on Video Coding (JCT-VC) of ITU-T SG16 WP3 and ISO/IEC JTC1/SC29/WG11, 6th Meeting: Torino, IT, Jul. 2011 (Jul. 22, 2011), JCTVC-F470_r4.
Extended European Search Report from European Patent Office (EPO)issued for European Patent Application No. 12792164.1 , dated Sep. 11, 2014.
Wiegand T et al: "High Efficiency Video Coding (HEVC) text specification Working Draft 1", 3. JCT-VC Meeting; 95. MPEG Meeting; Oct. 7-Oct. 15, 2010; Guangzhou; (Joint Collaborative Team on Video Coding of ISO/IECJTC1/SC29/WG11 and ITU-T SG.16); URL: http://wftp3.itu.int/av-arch/jctvc-site/, no. JCTVC-C403, Jan. 6, 2011 (Jun. 1, 2011), XP030008032, ISSN: 0000-0018.
Thomas Wiegand et al: "WD2: Working Draft 2 of High-Efficiency Video Coding", 4. JCT-VC Meeting; 95. MPEG Meeting; Jan. 20-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-site/, No. JCTVC-D503, Apr. 15, 2011 (Apr. 15, 2011), XP030113315, pp. 62-63.
Lim J et al: "Extended merging scheme using motion-hypothesis inter prediction", 2. JVT-VC Meeting; Jul. 21-Jul. 28, 2010; Geneva; (Joint Collaborativeteam on Video Coding of ISO/IEC JTC1/SC29/WG11 and ITU-T SG.16); URL: http://wftp3.itu.int/av-arch/jctvc-site/, No. JCTVC-B023, Jul. 23, 2010 (Jul. 23, 2010), XP030007603, ISSN: 0000-0048.
Jungyoup Yang et al: "Motion Vector Coding with Optimal Predictor", 87. MPEG Meeting; Feb. 2-Feb. 6, 2009; Lausanne; (Motion Picture Expert Group or ISO/IEC JTC1/SC29/WG11), No. M16209, Jan. 29, 2009 (Jan. 29, 2009), XP030044806.
Toshiyasu Sugio et al: "Modified usage of predicted motion vectors in forward directional bi-predictive coding frame", 4. JCT-VC Meeting; 95. MPEG Meeting; Jan. 20-Jan. 28, 2011; Daegu; (Joint Collaborative Team on Video Coding of ISO/IEC JTC1/SC29/WG11and ITU-T SG.16); URL: http://wftp3.itu.int/av-arch/jctvc-site/, No. JCTVC-D274, Jan. 15, 2011 (Jan. 15, 2011), XP030008314, ISSN: 0000-0013.
Shijun Sun and Shawmin Lei: "Predictive motion estimation with global motion predictor", Visual Communications and Image Processing; Jan. 20-Jan. 20, 2004; San Jose, Jan. 20, 2004 (Jan. 20, 2004), XP030081305.
Bross B et al: "CE9: Motion Vector Coding Test Report", 4. JCT-VC Meeting; 95. MPEG Meeting; Jan. 20-Jan. 28, 2011; Daegu: (Joint Collaborative Team on Video Coding of ISO/IEC JTC1/SC29/WG11and ITU-T SG.16); URL: http://wftp3.itu.int/av-arch/jctvc-site/, No. JCTVC-D314, Jan. 15, 2011 (Jan. 15, 2011), XP030008354.
Y-J Chiu et al: "CE1 Subtest1: A joint proposal of candidate-based decoder-side motion vector derivation", 4. JCT-VC Meeting; 95. MPEG Meeting; Jan. 20-Jan. 28, 2011; Daegu; (Joint Collaborative Team on Video Coding of ISO/IEC JTC1/SC29/WG11and ITU-T SG.16); URL: http://wftp3.itu.int/av-arch/jctvc-site/, No. JCTVC-D448, Jan. 25, 2011 (Jan. 25, 2011), XP030008487, ISSN: 0000-0013.
Guillaume Laroche et al.: "Robust solution for the AMVP parsing issue", Mar. 10, 2011, No. JCTVC-E219, Mar. 10, 2011 (Mar. 10, 2011), XP030008725, ISSN: 0000-0007.
Sugio T et al: "Parsing Robustness for Merge/AMVP", 6. JCT-VC Meeting; 97. MPEG Meeting; Jul. 14-Jul. 22, 2011; Torino: (Joint Collaborative Team on Video Coding of ISO/IEC JTC1/SC29/WG11and ITU-T SG.16); URL: http://wftp3.itu.int/av-Arch/jctvcsite/, No. JCTVC-F470, Jul. 1, 2011 (Jul. 1, 2011), XP030009493.
Chen J et al: "MVP index parsing with fixed number of candidates", 6. JCT-VC Meeting; 97. MPEG Meeting; Jul. 14-Jul. 22, 2011; Torino: (Joint Collaborative Team on Video Coding of ISO/IEC JTC1/SC29/WG11 and ITU-T SG.16); URL: http://wftp3.itu.int/av-arch/jctvc-site/, No. JCTVC-F402, Jul. 2, 2011 (Jul. 2, 2011), XP030009425.
Office Action from United States Patent and Trademark Office (USPTO) in U.S. Appl. No. 13/479,636, dated Jul. 24, 2014.

(56) References Cited

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver. 2, 5$^{th}$ Meeting: Geneva, CH, Mar. 16-23, 2011.
International Preliminary Report on Patentability from WIPO in International Patent Application No. PCT/JP2012/004924, dated Dec. 3, 2013.
Extended European Search Report from European Patent Office (EPO) in European Patent Application No. 12771702.3, dated Feb. 4, 2014.
Steffen Kamp et al., "Multihypothesis prediction using decoder side-motion vector derivation in inter-frame video coding", Visual Communications and Image Processing; Jan. 20-Jan. 22, 2009; San Jose, Jan. 20, 2009 (Jan. 20, 2009), XP030081712.
Byeong-Moon Jeon, "New syntax for Bi-directional mode in MH pictures", 3. JVT Meeting; 60. MPEG Meeting; May 6-May 10, 2002; Fairfax, US; (Joint Video Team of ISO/IEC JTC1/SC29/WG11 and ITU-T SG16 Q.6), No. JVT-C121, May 10, 2002 (May 10, 2002), XP030005233, ISSN: 0000-0442.
Yoshinori Suzuki et al., "Extension of uni-prediction simplification in B slices", 95. MPEG Meeting; Jan. 24-Jan. 28, 2011; Daegu; (Motion Picture Expert Group or ISO/IEC JTC1/SC29/WG11) No. m19400, Jan. 25, 2011 (Jan. 25, 2011), XP030047967.
Markus Flierl et al., "Generalized B pictures and the draft H.264/AVC video-compression standard", IEEE Transactions on Circuits and Systems for Video Technology, IEEE Service Center, Piscataway, NJ, US, vol. 13, No. 7, Jul. 1, 2003 (Jul. 1, 2003), pp. 587-597, XP011099251, ISSN: 1051-8215,DOI: 10.1109/TCSVT.2003.814963.
Hideaki Kimata et al., "Spatial temporal adaptive direct prediction for Bi-Directional prediction coding on H.264", 23. Picture Coding Symposium; Apr. 23-Apr. 25, 2003; Saint Malo, Apr. 23, 2003 (Apr. 23, 2003), XP030080000.
Athanasios Leontaris et al., "Weighted prediction methods for improved motion compensation", Image Processing (ICIP), 2009 16th IEEE International Conference on, IEEE, Piscataway, NJ, USA, Nov. 7, 2009 (Nov. 7, 2009), pp. 1029-1032, XP031628457, ISBN:978-1-4244-5653-6.
International Preliminary Report on Patentability from WIPO in International Patent Application No. PCT/JP2012/006110, dated Feb. 18, 2014.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting: Torino, IT, Oct. 8, 2011, [JCTVC-F803] (version 5).
International Search Report dated May 22, 2012 in International (PCT) Application No. PCT/JP2012/001351.
Thomas Wiegand et al., "WD2: Working Draft 2 of High-Efficiency Video Coding", Joint Collaborative Team on Video Coding (JCT-VC) of ITU-T SG16 WP3 and ISO/IEC JTC1/SC29/WG11, JCTVC-D503_r1, 4th Meeting: Daegu, KR, Jan. 20-28, 2011, pp. i-viii, 9-10, 85-94.
J. Jung and G. Clare, "Temporal MV predictor modification for MV-Comp, Skip, Direct and Merge schemes", Joint Collaborative Team on Video Coding (JCT-VC) of ITU-T SG16 WP3 and ISO/IEC JTC1/SC29/WG11, JCTVC-D164, 4th Meeting: Daegu, KR, Jan. 20-28, 2011, pp. 1-5.
Hideki Takehara et al., "Bi-derivative merge candidate", Joint Collaborative Team on Video Coding (JCT-VC) of ITU-T SG16 WP3 and ISO/IEC JCT1/SC29/WG11, JCTVC-F372, 6$^{th}$ Meeting: Torino, IT, Jul. 14-22, 2011, pp. 1-5.
Guillaume Laroche et al., "Robust solution for the AMVP parsing issue", Joint Collaborative Team on Video Coding (JCT-VC) of ITU-T SG16 WP3 and ISO/IEC JTC1/SC29/WG11, JCTVC-E219, 5$^{th}$ Meeting: Geneva, CH, Mar. 16-23, 2011.
J. Jung et al., "Proposition for robust parsing with temporal predictor", Joint Collaborative Team on Video Coding (JCT-VC) of ITU-T SG16 WP3 and ISO/IEC JTC1/SC29/WG11, JCTVC-D197, 4$^{th}$ Meeting: Daegu, KR, Jan. 20-28, 2011.

International Search Report from WIPO in International Patent Application No. PCT/JP2012/003316, dated Aug. 21, 2012.
International Search Report from WIPO in International Patent Application No. PCT/JP2012/003416, dated Aug. 28, 2012.
International Search Report from WIPO in International Patent Application No. PCT/JP2012/003496, dated Aug. 28, 2012.
International Search Report from WIPO in International Patent Application No. PCT/JP2012/003493, dated Aug. 28, 2012.
Bin Li et al., "On merge candidate construction", Joint Collaborative Team on Video Coding (JCT-VC) of ITU-T SG16 WP3 and ISO/IEC JTC1/SC29/WG11, JCTVC-E146, 5$^{th}$ Meeting: Geneva, CH, Mar. 16-23, 2011.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603_d8, Ver.8, 5$^{th}$ Meeting: Geneva, CH, Mar. 16-23, 2011.
International Search Report from WIPO in International Patent Application No. PCT/JP2012/004924, dated Oct. 30, 2012.
Toshiyasu Sugio et al., "Parsing Robustness for Merge/AMVP", Joint Collaborative Team on Video Coding (JCT-VC) of ITU-T SG16 WP3 and ISO/IEC JTCI/SC29/WG11, Document: JCTVC-F470, 6$^{th}$ Meeting, Torino, IT, Jul. 14-22, 2011.
Jianle Chen et al., "MVP index parsing with fixed number of candidates", Joint Collaborative Team on Video Coding (JCT-VC) of ITU-T SG16 WP3 and ISO/IEC JTCI/SC29/WG11, Document: JCTVC-F402, 6$^{th}$ Meeting, Torino, IT, Jul. 14-22, 2011.
Minhua Zhou et al., "A study on HM3.0 parsing throughput issue", Joint Collaborative Team on Video Coding (JCT-VC) of ITU-T SG16 WP3 and ISO/IEC JTCI/SC29/WG11, JCTVC-F068, 6$^{th}$ Meeting: Torino, IT, Jul. 14-22, 2011.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d2, Ver. 4, 6$^{th}$ Meeting: Torino, IT, Jul. 14-22, 2011.
International Search Report from WIPO in International Patent Application No. PCT/JP2012/006110, dated Jan. 8, 2013.
Thomas Wiegand at al., "WD3: Working Draft of High-Efficiency Video Coding", Joint Collaborative Team on Video Coding (JCT-VC) of ITU-T SG16 WP3 and ISO/IEC JTC1/SC29/WG11, Document: JCTVC-E603, Ver. 5, 5th Meeting: Geneva, CH, Mar. 16-23, 2011.
Bin Li et al., "On merge candidate construction", Joint Collaborative Team on Video Coding (JCT-VC) of ITU-T SG16 WP3 and ISO/IEC JTC1/SC29/WG11 5th Meeting: Geneva, CH, Mar. 16-23, 2011, [JCTVC-E146_r3].
Minhua Zhou et al., "A study on HM2. 0 bitstream parsing and error resiliency issue", Joint Collaborative Team on Video Coding (JCT-VC) of ITU-T SG16 WP3 and ISO/IEC JTC1/SC29/WG11 5th Meeting: Geneva, CH, Mar. 16-23, 2011, [JCTVC-E0118].
International Search Report (ISR) from International Searching Authority (Japan Patent Office) in International Pat. Appl. No. PCT/JP2012/003386, dated Aug. 28, 2012.
"Advanced Video Coding for Generic Audiovisual Services", ITU-T Recommendation H. 264, Mar. 2010.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 2011.
U.S. Appl. No. 13/477,606 to Toshiyasu Sugio et al., filed May 22, 2012.
U.S. Appl. No. 13/479,636 to Toshiyasu Sugio et al., filed May 24, 2012.
U.S. Appl. No. 13/482,549 to Toshiyasu Sugio et al., filed May 29, 2012.
U.S. Appl. No. 13/482,411 to Toshiyasu Sugio et al., filed May 29, 2012.
U.S. Appl. No. 13/565,384 to Toshiyasu Sugio et al., filed Aug. 2, 2012.
Office Action from United States Patent and Trademark Office (USPTO) in U.S. Appl. No. 15/379,993, dated Feb. 9, 2017.
Office Action from United States Patent and Trademark Office (USPTO) in U.S. Appl. No. 14/725,180, dated Feb. 24, 2017.

(56) References Cited

OTHER PUBLICATIONS

Office Action from United States Patent and Trademark Office (USPTO) in U.S. Appl. No. 15/140,962, dated Mar. 15, 2017.
Office Action from United States Patent and Trademark Office (USPTO) in U.S. Appl. No. 15/266,004, dated Jan. 19, 2017.
Office Action from United States Patent and Trademark Office (USPTO) in U.S. Appl. No. 13/536,309, dated Oct. 19, 2016.
Office Action from United States Patent and Trademark Office (USPTO) in U.S. Appl. No. 15/140,962, dated Oct. 26, 2016.
Office Action from United States Patent and Trademark Office (USPTO) in U.S. Appl. No. 15/228,009, dated Nov. 16, 2016.
Office Action from United States Patent and Trademark Office (USPTO) in U.S. Appl. No. 15/140,921, dated Nov. 18, 2016.
Office Action from United States Patent and Trademark Office (USPTO) in U.S. Appl. No. 15/140,949, dated Nov. 28, 2016.
Office Action from Canadian Intellectual Property Office in Canadian Patent Appl. No. 2,834,191, dated Feb. 8, 2018.
Official Communication from European Patent Office (EPO) in European Patent Appl. No. 12793588.0, dated Feb. 14, 2018.
Official Communication from European Patent Office (EPO) in European Patent Appl. No. 12793037.8, dated Feb. 14, 2018.
Office Action from Canadian Intellectual Property Office in Canadian Patent Appl. No. 2834123, dated Feb. 20, 2018.
Office Action from Canadian Intellectual Property Office in Canadian Patent Appl. No. 2834125, dated Feb. 20, 2018.
Office Action from Canadian Intellectual Property Office in Canadian Patent Appl. No. 2834190, dated Feb. 20, 2018.
Office Action from Canadian Intellectual Property Office in Canadian Patent Appl. No. 2836063, dated Mar. 16, 2018.
Summons to attend oral proceedings from European Patent Office (EPO) in European Patent Appl. No. 12819464.4, dated Mar. 5, 2018.
Office Action from Canadian Intellectual Property Office in Canadian Patent Appl. No. 2843560, dated Apr. 30, 2018.

Reference picture list 0

| Reference picture index 0 | Display order |
|---|---|
| 0 | 2 |
| 1 | 1 |
| 2 | 0 |

Reference picture list 1

| Reference picture index 1 | Display order |
|---|---|
| 0 | 1 |
| 1 | 2 |
| 2 | 0 |

FIG. 5

Size of merging block candidate list = 2

| Merging block candidate index | Assigned bit sequence |
| --- | --- |
| 0 | 0 |
| 1 | 1 |

Size of merging block candidate list = 3

| Merging block candidate index | Assigned bit sequence |
| --- | --- |
| 0 | 0 |
| 1 | 10 |
| 2 | 11 |

Size of merging block candidate list = 4

| Merging block candidate index | Assigned bit sequence |
| --- | --- |
| 0 | 0 |
| 1 | 10 |
| 2 | 110 |
| 3 | 111 |

Size of merging block candidate list = 5

| Merging block candidate index | Assigned bit sequence |
| --- | --- |
| 0 | 0 |
| 1 | 10 |
| 2 | 110 |
| 3 | 1110 |
| 4 | 1111 |

FIG. 8

| | Descriptor |
|---|---|
| prediction_unit(x0, y0, log2PUWidth, log2PUHeight, PartIdx, InferredMergeFlag){ | |
|   if(skip_flag[x0][y0]){ | |
|     if(NumMergeCand > 1) | |
|       merge_idx[x0][y0]) | ue(v) \| ae(v) |
|   } else if(PredMode == MODE_INTRA){ | u(1) \| ae(v) |
|   ... | |
|   } else {/* MODE_INTER */ | |
|     if(!InferredMergeFlag) | |
|       merge_flag[x0][y0] | u(1) \| ae(v) |
|     if(merge_flag[x0][y0] && NumMergeCand > 1){ | |
|       merge_idx[x0][y0] | ue(v) \| ae(v) |
|     } else { | |
|       ... | |
|     } | |
|   } | |
| } | |

Size of merging block candidate list = total number of merging block candidates

Merging block candidate index

Merging flag

Merging block candidate index

Size of merging block candidate list = total number of merging block candidates

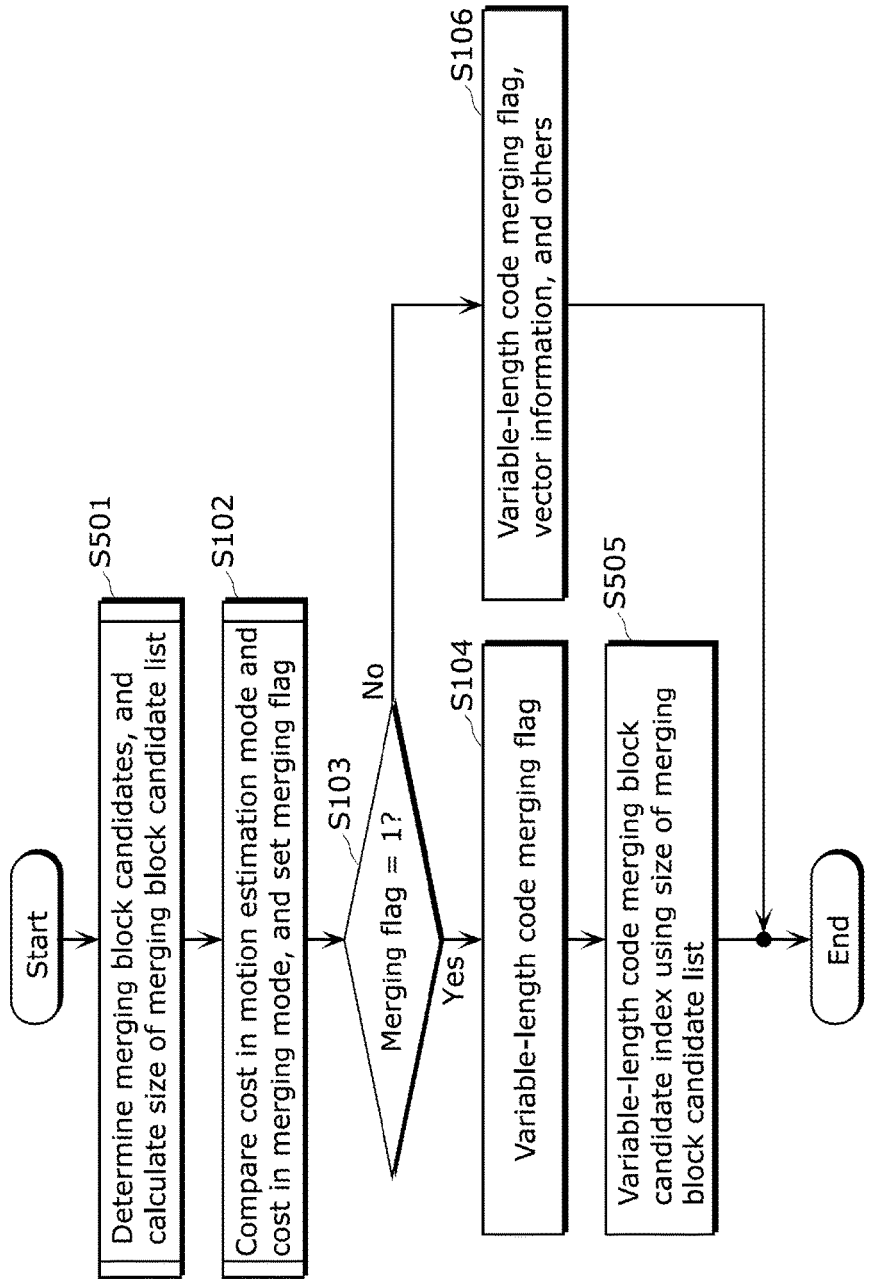

| Merging block candidate index | Merging block candidate |
|---|---|
| 0 | Neighboring block A (Prediction direction 0, (MvL0_A, RefL0_A)) |
| 1 | Neighboring block B (Prediction direction 1, (MvL1_B, RefL1_B)) |
| 2 | co-located merge block (Bi-directional prediction, (MvL0_Col, RefL0_Col), (MvL1_Col, RefL1_Col)) |
| 3 | Unusable-for-merging candidate (Neighboring block C, intra picture prediction) |
| 4 | Neighboring block D (Prediction direction 0, (MvL0_D, RefL0_V)) |

When MvL0_A = MvL0_D and
RefL0_A = RefL0_D, remove
one of neighboring blocks A and D

- Remove identical candidate and unusable-for-merging candidate
- Add new candidate and increment total number of merging block candidate by 1 when total number of usable-for-merging candidates - total number of merging block candidates > 0

(b)

| Merging block candidate index | Merging block candidate |
|---|---|
| 0 | Neighboring block A (Prediction direction 0 (MvL0_A, RefL0_A)) |
| 1 | Neighboring block B (Prediction direction 1 (MvL1_B, RefL1_B)) |
| 2 | co-located merging block (Bi-directional prediction, (MvL0_Col, RefL0_Col), (MvL1_Col, RefL1_Col)) |
| 3 | New candidate |

Total number of merging block candidates = 4

FIG. 36

Size of merging block candidate list = total number of usable-for-merging candidates

| | Descriptor |
|---|---|
| prediction_unit(x0, y0, log2PUWidth, log2PUHeight, PartIdx, InferredMergeFlag){ | |
|   if(skip_flag[x0][y0]){ | |
|     if(NumMergeCand > 1) | |
|       merge_idx[x0][y0]) | ue(v) \| ae(v) |
|   } else if(PredMode == MODE_INTRA){ | |
|     ... | |
|   } else {/* MODE_INTER */ | u(1) \| ae(v) |
|     if(!InferredMergeFlag) | |
|       merge_flag[x0][y0] | u(1) \| ae(v) |
|     if(merge_flag[x0][y0] && NumMergeCand > 1){ | |
|       merge_idx[x0][y0] | ue(v) \| ae(v) |
|     } else { | |
|       ... | |
|     } | |
|   } | |
| } | |

- Merging block candidate index
- Merging flag
- Merging block candidate index

Size of merging block candidate list = total number of usable-for-merging candidates

FIG. 37

| | Descriptor |
|---|---|
| prediction_unit(x0, y0, log2PUWidth, log2PUHeight, PartIdx, InferredMergeFlag){ | |
|   if(skip_flag[x0][y0]){ | |
|     merge_idx[x0][y0] | ue(v) \| ae(v) |
|   } else if(PredMode == MODE_INTRA){ | |
|     ... | u(1) \| ae(v) |
|   } else {/* MODE_INTER */ | |
|     if(!InferredMergeFlag) | |
|       merge_flag[x0][y0] | u(1) \| ae(v) |
|     if(merge_flag[x0][y0]){ | |
|       merge_idx[x0][y0] | ue(v) \| ae(v) |
|     } else { | |
|       ... | |
|     } | |
|   } | |
| } | |

Merging block candidate index → merge_idx[x0][y0] (first)
Merging flag → merge_flag[x0][y0]
Merging block candidate index → merge_idx[x0][y0] (second)

FIG. 46

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 57
| Corresponding standard | Driving frequency |
|---|---|
| MPEG-4 AVC | 500 MHz |
| MPEG-2 | 350 MHz |
| ⋮ | ⋮ |
FIG. 58A
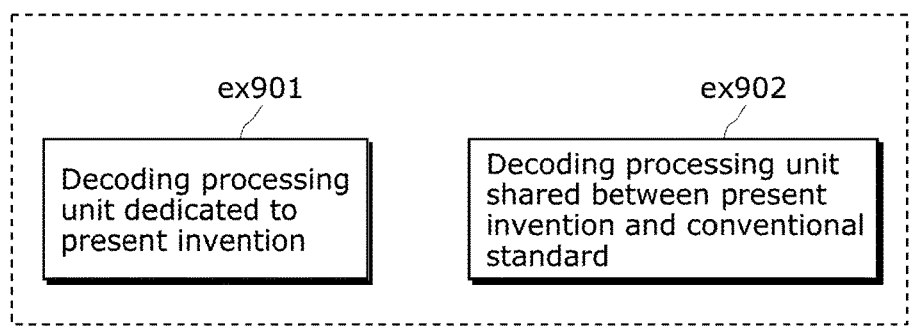
FIG. 58B
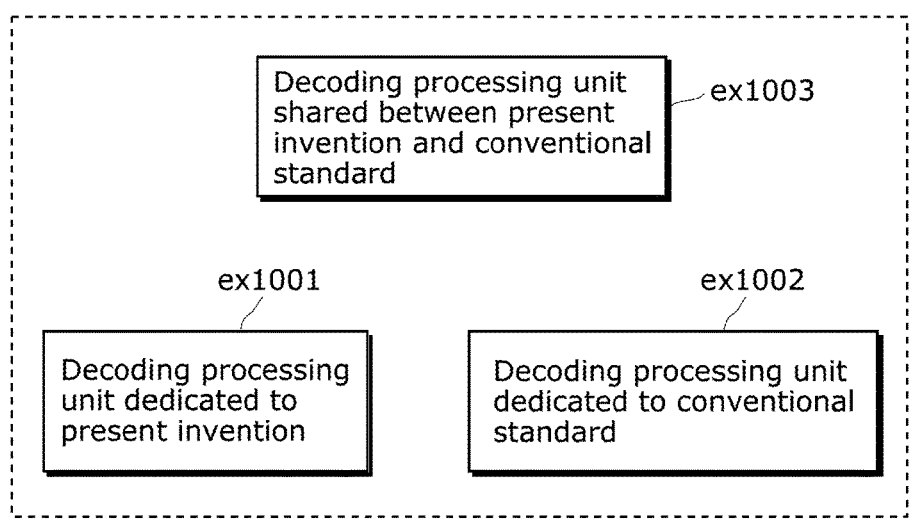

IMAGE CODING METHOD, IMAGE CODING APPARATUS, IMAGE DECODING METHOD, IMAGE DECODING APPARATUS, AND IMAGE CODING AND DECODING APPARATUS

CROSS REFERENCE TO RELATED APPLICATIONS

This is a continuation application of U.S. patent application Ser. No. 15/434,094, filed Feb. 16, 2017, which is a continuation of U.S. patent application Ser. No. 13/479,669, filed May 24, 2012, and which claims the benefit of U.S. Provisional Patent Application No. 61/490,777, filed May 27, 2011. The entire disclosure of each of the above-identified applications, including the specification, drawings, and claims, is incorporated herein by reference in its entirety.

TECHNICAL FIELD

The present disclosure relates to an image coding method and an image decoding method.

BACKGROUND ART

Generally, in coding processing of a moving picture, the amount of information is reduced by compression for which redundancy of a moving picture in spatial direction and temporal direction is made use of. Generally, conversion to a frequency domain is performed as a method in which redundancy in spatial direction is made use of, and coding using prediction between pictures (the prediction is hereinafter referred to as inter prediction) is performed as a method of compression for which redundancy in temporal direction is made use of. In the inter prediction coding, a current picture is coded using, as a reference picture, a coded picture which precedes or follows the current picture in order of display time. Subsequently, a motion vector is derived by performing motion estimation on the current picture with reference to the reference picture. Then, redundancy in temporal direction is removed using a calculated difference between picture data of the current picture and prediction picture data which is obtained by motion compensation based on the derived motion vector (see Non-patent Literature 1, for example). Here, in the motion estimation, difference values between current blocks in the current picture and blocks in the reference picture are calculated, and a block having the smallest difference value in the reference picture is determined as a reference block. Then, a motion vector is estimated from the current block and the reference block.

CITATION LIST

Non Patent Literature

[Non-patent Literature 1] ITU-T Recommendation H.264 "Advanced video coding for generic audiovisual services", March 2010

[Non-patent Literature 2] JCT-VC, "WD3: Working Draft 3 of High-Efficiency Video Coding", JCTVC-E603, March 2011

SUMMARY OF INVENTION

Technical Problem

It is still desirable to increase coding efficiency for image coding and decoding in which inter prediction is used, beyond the above-described conventional technique.

In view of this, the object of the present disclosure is to provide an image coding method and an image decoding method with which coding efficiency for image coding and image decoding using inter prediction is increased.

Solution to Problem

An image coding method according to an aspect of the present disclosure is an image coding method for coding an image on a block-by-block basis to generate a bitstream, and includes: deriving, as a first merging candidate, a merging candidate based on a prediction direction, a motion vector, and a reference picture index which have been used for coding a block spatially or temporally neighboring a current block to be coded, the merging candidate being a combination of a prediction direction, a motion vector, and a reference picture index for use in coding of the current block; deriving, as a second merging candidate, a merging candidate having a motion vector which is a predetermined vector; selecting a merging candidate to be used for the coding of the current block from the derived first merging candidate and the derived second merging candidate; and attaching an index for identifying the selected merging candidate to the bitstream.

It should be noted that these general or specific aspects can be implemented as a system, a method, an integrated circuit, a computer program, a computer-readable recording medium such as a compact disc read-only memory (CD-ROM), or as any combination of a system, a method, an integrated circuit, a computer program, and a computer-readable recording medium.

Advantageous Effects of Invention

According to an aspect of the present disclosure, coding efficiency for image coding and decoding using inter prediction can be increased.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 5 shows a relationship between the size of a merging block candidate list and bit sequences assigned to merging block candidate indexes;

FIG. 8 shows syntax for attachment of merging block candidate indexes to a bitstream;

FIG. 25 is a flowchart showing processing operations of the image coding apparatus according to Embodiment 5;

FIG. 26 shows in (a) and (b) an exemplary merging block candidate list according to Embodiment 5;

FIG. 36 shows syntax for attachment of merging block candidate indexes to a bitstream;

FIG. 37 shows exemplary syntax in the case where the size of a merging block candidate list is fixed at the maximum value of the total number of merging block candidates;

FIG. 46 illustrates a structure of multiplexed data;

FIG. 57 shows an example of a look-up table in which video data standards are associated with driving frequencies;

FIG. 58A is a diagram showing an example of a configuration for sharing a module of a signal processing unit; and FIG. 58B is a diagram showing another example of a configuration for sharing a module of the signal processing unit.

DESCRIPTION OF EMBODIMENTS (Underlying Knowledge Forming Basis of the Present Disclosure)

In a moving picture coding scheme already standardized, which is referred to as H.264, three picture types of I picture, P picture, and B picture are used for reduction of the amount of information by compression.

The I picture is not coded by inter prediction coding. Specifically, the I picture is coded by prediction within the picture (the prediction is hereinafter referred to as intra prediction). The P picture is coded by inter prediction coding with reference to one coded picture preceding or following the current picture in order of display time. The B picture is coded by inter prediction coding with reference to two coded pictures preceding and following the current picture in order of display time.

In inter prediction coding, a reference picture list for identifying a reference picture is generated. In a reference picture list, reference picture indexes are assigned to coded reference pictures to be referenced in inter prediction. For example, two reference picture lists (L0, L1) are generated for a B picture because it can be coded with reference to two pictures.

Figure 1A:
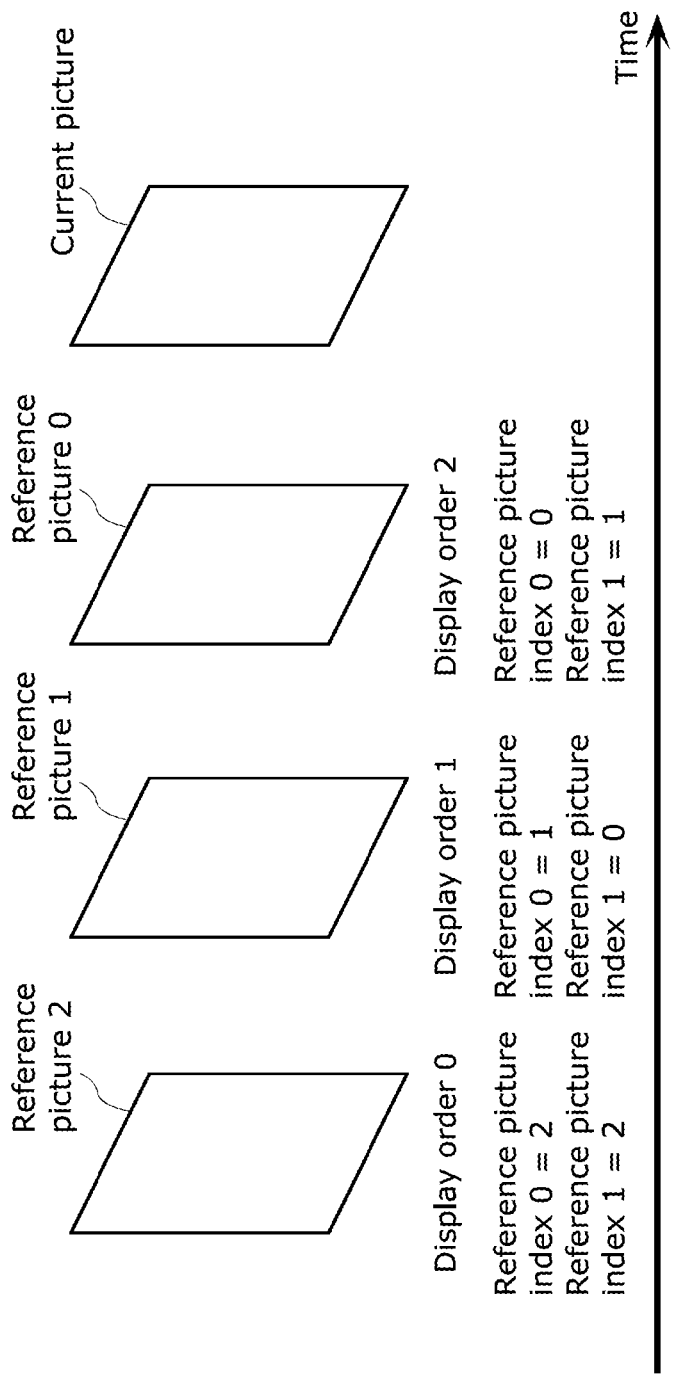
FIG. 1A is a diagram for illustrating an exemplary reference picture list for a B picture.
Figures 1B, 1C, 2:
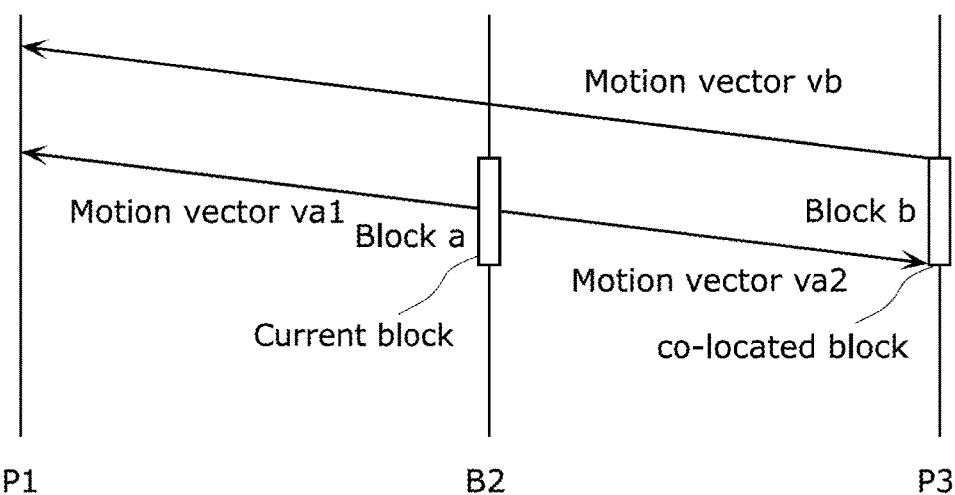
FIG. 1B is a diagram for illustrating an exemplary reference picture list of a prediction direction 0 for a B picture.
FIG. 1C is a diagram for illustrating an exemplary reference picture list of a prediction direction 1 for a B picture.
FIG. 2 is a diagram for illustrating motion vectors for use in the temporal motion vector prediction mode.

FIG. 1A is a diagram for illustrating an exemplary reference picture list for a B picture. FIG. 1B shows an exemplary reference picture list 0 (L0) for a prediction direction 0 in bi-directional prediction. In the reference picture list 0, the reference picture index 0 having a value of 0 is assigned to a reference picture 0 with a display order number 2. The reference picture index 0 having a value of 1 is assigned to a reference picture 1 with a display order number 1. The reference picture index 0 having a value of 2 is assigned to a reference picture 2 with a display order number 0. In other words, the shorter the temporal distance of a reference picture from the current picture, the smaller the reference picture index assigned to the reference picture.

On the other hand, FIG. 1C shows an exemplary reference picture list 1 (L1) for a prediction direction 1 in bi-directional prediction. In the reference picture list 1, the reference picture index 1 having a value of 0 is assigned to a reference picture 1 with a display order number 1. The reference picture index 1 having a value of 1 is assigned to a reference picture 0 with a display order number 2. The reference picture index 2 having a value of 2 is assigned to a reference picture 2 with a display order number 0.

In this manner, it is possible to assign reference picture indexes having values different between prediction directions to a reference picture (the reference pictures 0 and 1 in FIG. 1A) or to assign the reference picture index having the same value for both directions to a reference picture (the reference picture 2 in FIG. 1A).

In a moving picture coding method referred to as H.264 (see Non-patent Literature 1), a motion vector estimation mode is available as a coding mode for inter prediction of each current block in a B picture. In the motion vector estimation mode, a difference value between picture data of a current block and prediction picture data and a motion vector used for generating the prediction picture data are coded. In addition, in the motion vector estimation mode, bi-directional prediction and uni-directional prediction can be selectively performed. In bi-directional prediction, a prediction picture is generated with reference to two coded pictures one of which precedes a current picture to be coded and the other of which follows the current picture. In uni-directional prediction, a prediction picture is generated with reference to one coded picture preceding or following a current picture to be coded.

Furthermore, in the moving picture coding method referred to as H.264, a coding mode referred to as a temporal motion vector prediction mode can be selected for derivation of a motion vector in coding of a B picture. The inter prediction coding method performed in the temporal motion vector prediction mode will be described below using FIG. 2. FIG. 2 is a diagram for illustrating motion vectors for use in the temporal motion vector prediction mode. Specifically, FIG. 2 shows a case where a block a in a picture B2 is coded in temporal motion vector prediction mode.

In the coding, a motion vector vb is used which has been used for coding a block b located in the same position in a picture P3, which is a reference picture following the picture B2, as the position of the block a in the picture B2 (in the case, the block b is hereinafter referred to as a co-located block of the block a). The motion vector vb is a motion vector used for coding the block b with reference to the picture P1.

Two reference blocks for the block a are obtained from a forward reference picture and a backward reference picture, that is, a picture P1 and a picture P3 using motion vectors parallel to the motion vector vb. Then, the block a is coded by bi-directional prediction based on the two obtained reference blocks. Specifically, in the coding of the block a, a motion vector va1 is used to reference the picture P1, and a motion vector va2 is used to reference the picture P3.

In addition, a merging mode is discussed as an inter prediction mode for coding of each current block in a B picture or a P picture (see Non-patent Literature 2). In the merging mode, a current block is coded using a prediction direction, a motion vector, and a reference picture index which are duplications of those used for coding a neighboring block of the current block. At this time, the duplications of the index and others of the neighboring block are attached to a bitstream so that the motion direction, motion vector, and reference picture index used for the coding can be selected in decoding. A concrete example for it is given below with reference to FIG. 3.

Figure 3:
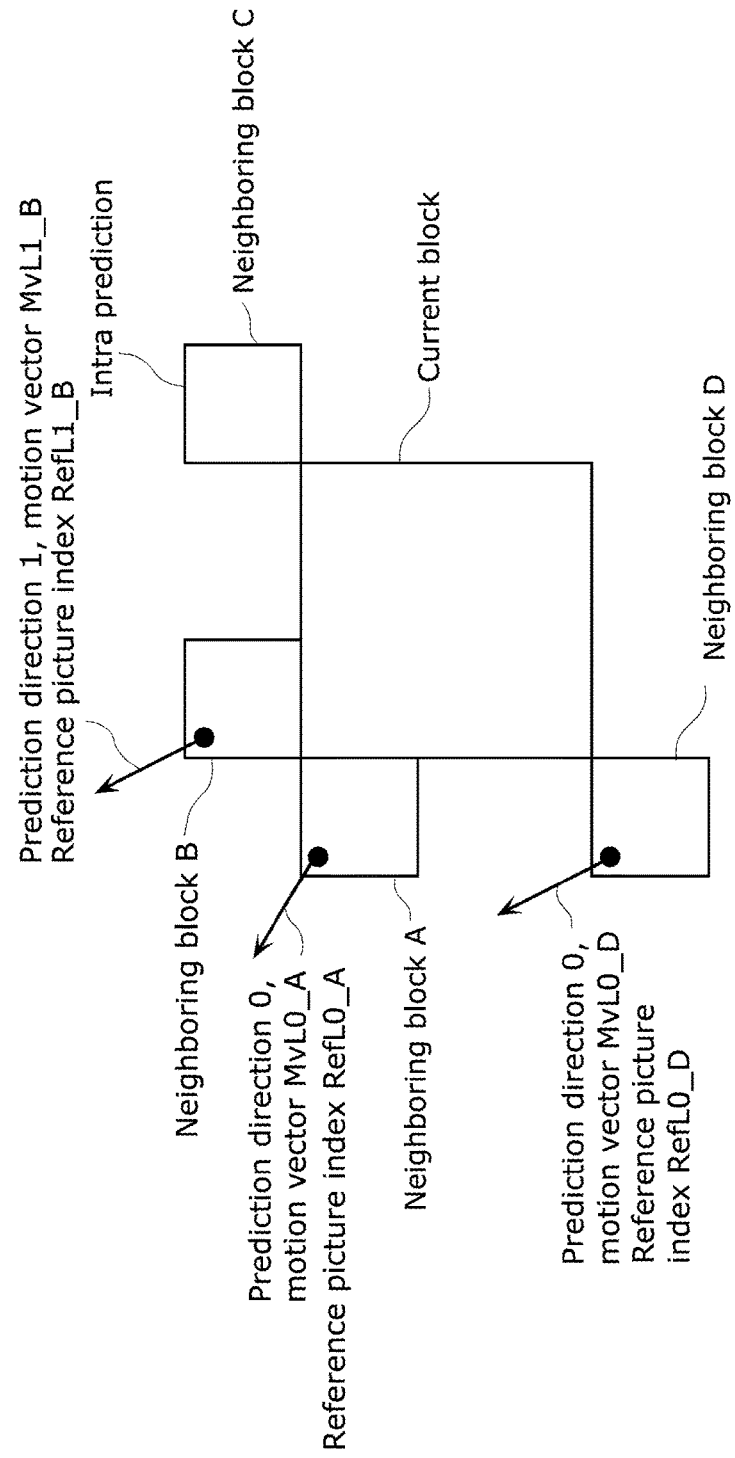
FIG. 3 shows an exemplary motion vector of a neighboring block for use in the merging mode.

FIG. 3 shows an exemplary motion vector of a neighboring block for use in the merging mode. In FIG. 3, a neighboring block A is a coded block located on the immediate left of a current block. A neighboring block B is a coded block located immediately above the current block. A neighboring block C is a coded block located immediately right above the current block. A neighboring block D is a coded block located immediately left below the current block.

The neighboring block A is a block coded by uni-directional prediction in the prediction direction 0. The neighboring block A has a motion vector MvL0_A having the prediction direction 0 as a motion vector with respect to a reference picture indicated by a reference picture index RefL0_A of the prediction direction 0. Here, MvL0 indicates a motion vector which references a reference picture specified in a reference picture list 0 (L0). MvL1 indicates a motion vector which references a reference picture specified in a reference picture list 1 (L1).

The neighboring block B is a block coded by uni-directional prediction in the prediction direction 1. The neighboring block B has a motion vector MvL1_B having the prediction direction 1 as a motion vector with respect to a reference picture indicated by a reference picture index RefL1_B of the prediction direction 1.

The neighboring block C is a block coded by intra prediction.

The neighboring block D is a block coded by uni-directional prediction in the prediction direction 0. The neighboring block D has a motion vector MvL0_D having the prediction direction 0 as a motion vector with respect to a reference picture indicated by a reference picture index RefL0_D of the prediction direction 0.

In this case, for example, a combination of a prediction direction, a motion vector, and a reference picture index with which the current block can be coded with the highest coding efficiency is selected as a prediction direction, a motion vector, and a reference picture index of the current block from the prediction directions, motion vectors and reference picture indexes of the neighboring blocks A to D, and a prediction direction, a motion vector, and a reference picture index which are calculated using a co-located block in temporal motion vector prediction mode. Then, a merging block candidate index indicating the selected block having the prediction direction, motion vector, and reference picture index is attached to a bitstream.

Figure 4:
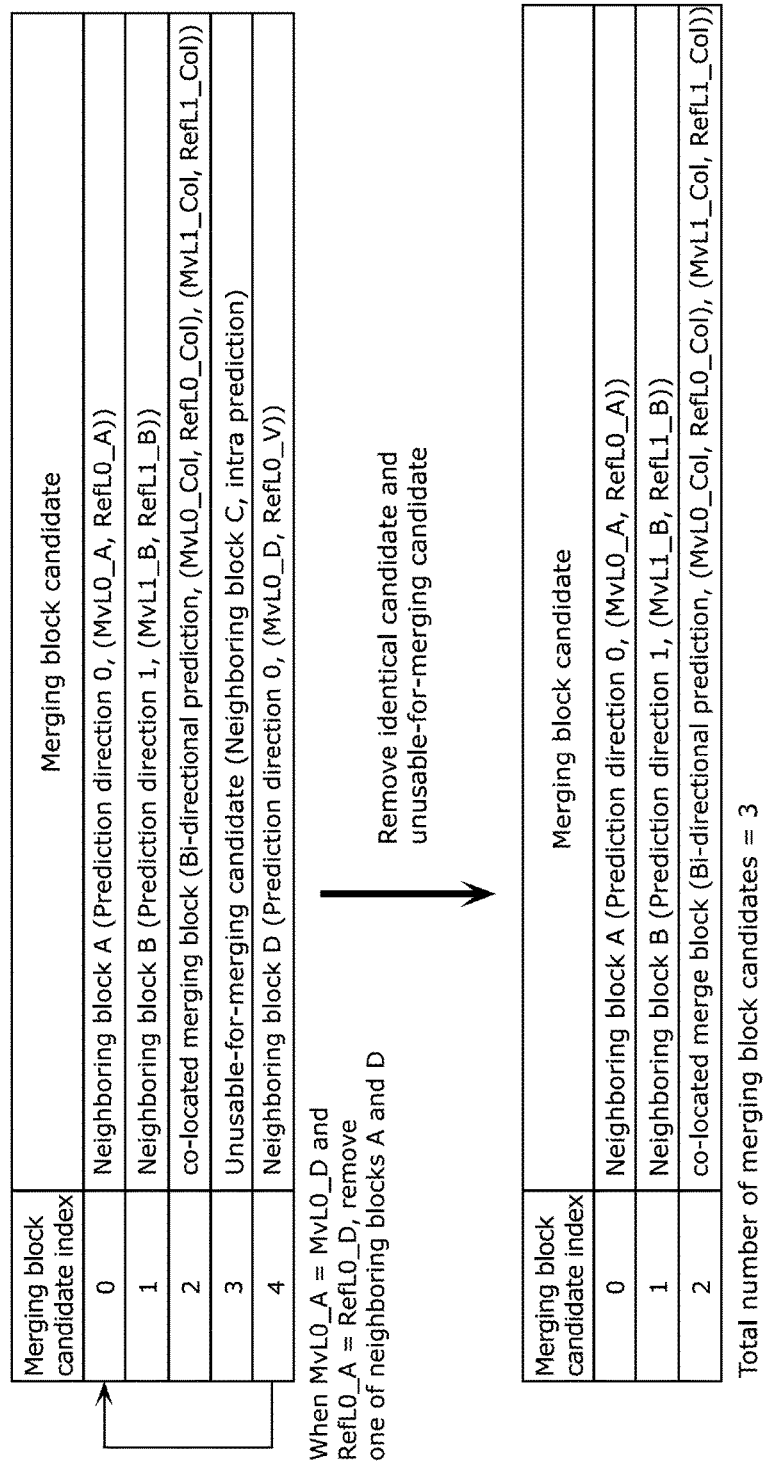
FIG. 4 is a diagram for illustrating an exemplary merging block candidate list.

For example, when the neighboring block A is selected, the current block is coded using the motion vector MvL0_A having the prediction direction 0 and the reference picture index RefL0_A. Then, only the merging block candidate index having a value of 0 which indicates use of the neighboring block A as shown in FIG. 4 is attached to a bitstream. The amount of information on a prediction direction, a motion vector, and a reference picture index is thereby reduced.

Furthermore, in the merging mode, a candidate which cannot be used for coding (hereinafter referred to as an unusable-for-merging candidate), and a candidate having a combination of a prediction direction, a motion vector, and a reference picture index identical to a combination of a prediction direction, a motion vector, and a reference picture index of any other merging block (hereinafter referred to as an identical candidate) are removed from merging block candidates as shown in FIG. 4.

In this manner, the total number of merging block candidates is reduced so that the amount of code assigned to merging block candidate indexes can be reduced. Here, "unusable for merging" means (1) that the merging block candidate has been coded by intra prediction, (2) that the merging block candidate is outside the boundary of a slice including the current block or the boundary of a picture including the current block, or (3) that the merging block candidate is yet to be coded.

In the example shown in FIG. 4, the neighboring block C is a block coded by intra prediction. The merging block candidate having the merging block candidate index 3 is therefore an unusable-for-merging candidate and removed from the merging block candidate list. The neighboring block D is identical in prediction direction, motion vector, and reference picture index to the neighboring block A. The merging block candidate having the merging block candidate index 4 is therefore removed from the merging block candidate list. As a result, the total number of the merging block candidates is finally three, and the size of the merging block candidate list is set at three.

Merging block candidate indexes are coded by variable-length coding by assigning bit sequences according to the size of each merging block candidate list as shown in FIG. 5. Thus, in the merging mode, the amount of code is reduced by changing bit sequences assigned to merging mode indexes according to the size of each merging block candidate list.

Figure 6:
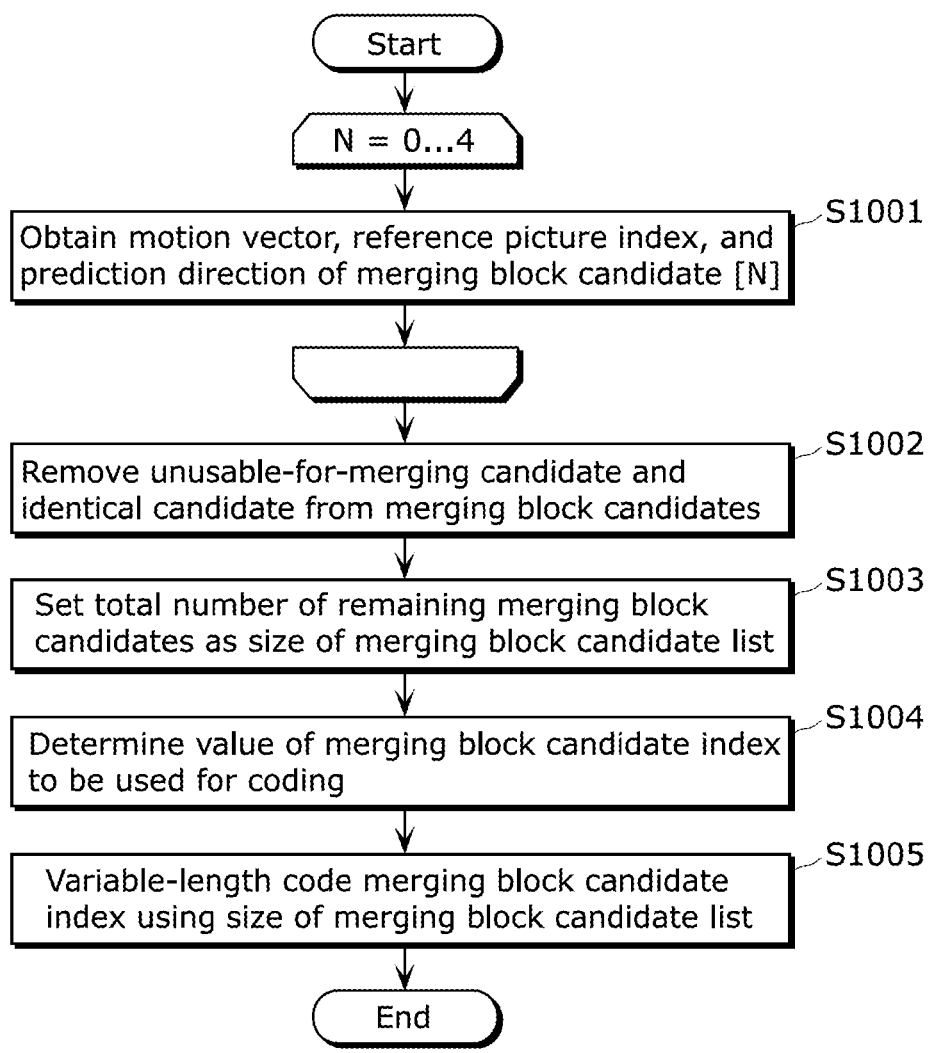
FIG. 6 is a flowchart showing an example of a process for coding when the merging mode is used.

FIG. 6 is a flowchart showing an example of a process for coding when the merging mode is used. In Step S1001, motion vectors, reference picture indexes, and prediction directions of merging block candidates are obtained from neighboring blocks and a co-located block. In Step S1002, identical candidates and unusable-for-merging candidates are removed from the merging block candidates. In Step S1003, the total number of the merging block candidates after the removing is set as the size of the merging block candidate list. In Step S1004, the merging block candidate index to be used for coding the current block is determined. In Step S1005, the determined merging block candidate index is coded by performing variable-length coding in bit sequence according to the size of the merging block candidate list.

Figure 7:
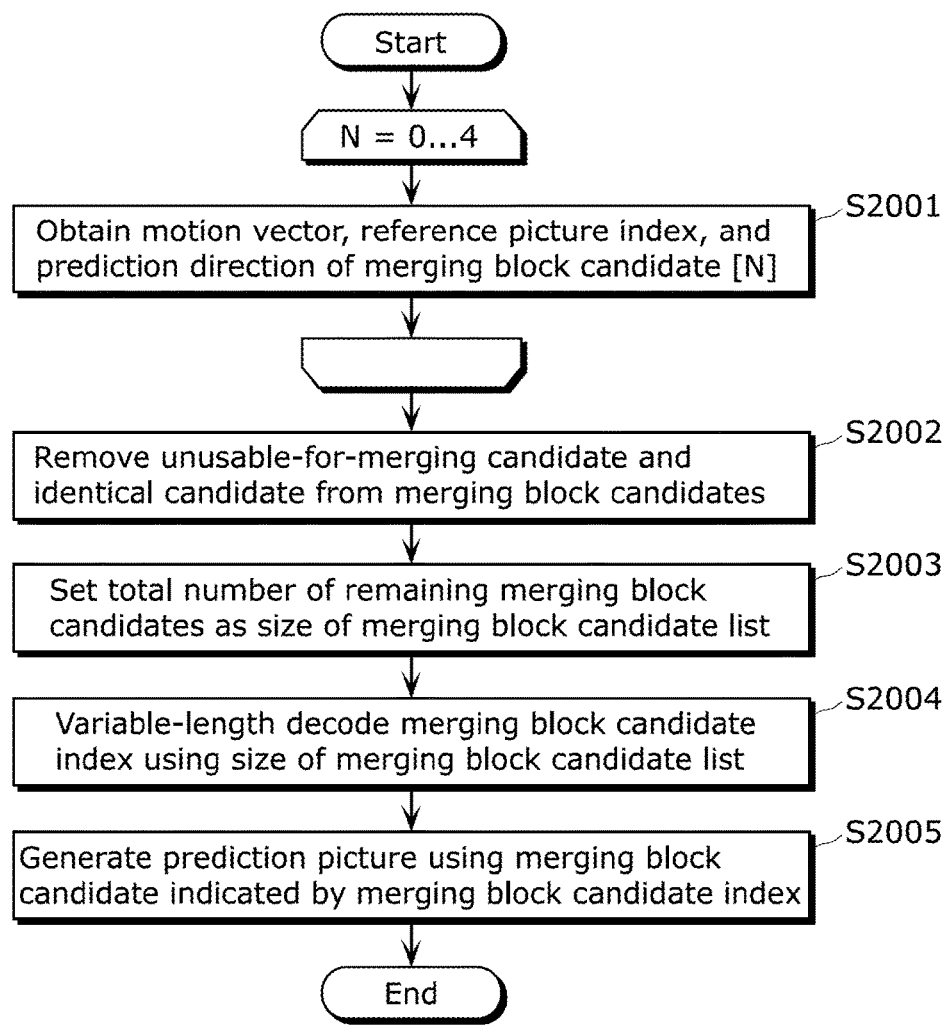
FIG. 7 is a flowchart showing a process for decoding using the merging mode.

FIG. 7 is a flowchart showing an example of a process for decoding using the merging mode. In Step S2001, motion vectors, reference picture indexes, and prediction directions of merging block candidates are obtained from neighboring blocks and a co-located block. In Step S2002, identical candidates and unusable-for-merging candidates are removed from the merging block candidates. In Step S2003, the total number of the merging block candidates after the removing is set as the size of the merging block candidate list. In Step S2004, the merging block candidate index to be used for decoding a current block is decoded from a bitstream using the size of the merging block candidate list. In Step S2005, decoding of a current block is performed by generating a prediction picture using the merging block candidate indicated by the decoded merging block candidate index.

FIG. 8 shows syntax for attachment of merging block candidate indexes to a bitstream. In FIG. 8, merge_idx represents a merging block candidate index, and merge_flag represents a merging flag. NumMergeCand represents the size of a merging block candidate list. NumMergeCand is set at the total number of merging block candidates after unusable-for-merging candidates and identical candidates are removed from the merging block candidates.

Coding or decoding of an image is performed using the merging mode in the above-described manner.

However, in the merging mode, a motion vector for use in coding a current block is calculated from a merging block candidate neighboring the current block. Then, for example, when a current block to be coded is a stationary region and its neighboring block is a moving-object region, coding efficiency may decrease due to lack of increase in accuracy of prediction in merging mode because motion vectors usable in the merging mode are affected by the moving-object region.

An image coding method according to an aspect of the present disclosure is an image coding method for coding an image on a block-by-block basis to generate a bitstream, and includes: deriving, as a first merging candidate, a merging candidate based on a prediction direction, a motion vector, and a reference picture index which have been used for coding a block spatially or temporally neighboring a current block to be coded, the merging candidate being a combination of a prediction direction, a motion vector, and a reference picture index for use in coding of the current block; deriving, as a second merging candidate, a merging candidate having a motion vector which is a predetermined vector; selecting a merging candidate to be used for the coding of the current block from the derived first merging candidate and the derived second merging candidate; and attaching an index for identifying the selected merging candidate to the bitstream.

With this method, a merging candidate having a motion vector which is a predetermined vector can be derived as a second merging candidate. It is therefore possible to derive a merging candidate having a motion vector and others for a stationary region as a second merging candidate, for example. In other words, a current block having a predetermined motion is efficiently coded so that a coding efficiency can be increased.

For example, in the deriving of a merging candidate as a second merging candidate, the second merging candidate may be derived for each referable reference picture.

With this, a second merging candidate can be derived for each reference picture. It is therefore possible to increase the variety of merging candidates so that coding efficiency can be further increased.

For example, the predetermined vector may be a zero vector.

With this, a merging candidate having a motion vector for a stationary region can be derived because the predetermined vector which is a zero vector. It is therefore possible to further increase coding efficiency when a current block to be coded is a stationary region.

For example, the image coding method may further include determining a maximum number of merging candidates; and determining whether or not the total number of the derived first merging candidate is smaller than the maximum number; wherein the deriving of a merging candidate as a second merging candidate is performed when it is determined that the total number of the first merging candidate is smaller than the maximum number.

With this, a second merging candidate can be derived when it is determined that the total number of the first merging candidates is smaller than the maximum number. Accordingly, the total number of merging candidates can be increased within a range not exceeding the maximum number so that coding efficiency can be increased.

For example, in the attaching, the index may be coded using the determined maximum number, and the coded index may be attached to the bitstream.

With this method, an index for identifying a merging candidate can be coded using the determined maximum number. In other words, an index can be coded independently of the total number of actually derived merging candidates. Therefore, even when information necessary for derivation of a merging candidate (for example, information on a co-located block) is lost, an index can be still decoded and error resistance is thereby enhanced.

Furthermore, an index can be decoded independently of the total number of actually derived merging candidates. In other words, an index can be decoded without waiting for derivation of merging candidates. In other words, a bitstream can be generated for which deriving of merging candidates and decoding of indexes can be performed in parallel.

For example, in the coding, information indicating the determined maximum number may be further attached to the bitstream.

With this, information indicating the determined maximum number can be attached to a bitstream. It is therefore possible to switch maximum numbers by the appropriate unit so that coding efficiency can be increased.

For example, in the deriving of a first merging candidate, a merging candidate which is a combination of a prediction direction, a motion vector, and a reference picture index may be derived as the first merging candidate, the combination being different from a combination of a prediction direction, a motion vector, and a reference picture index of any first merging candidate previously derived.

With this, a merging candidate which is a combination of a prediction direction, a motion vector, and a reference picture index identical to a combination of a prediction direction, a motion vector, and a reference picture index of any first merging candidate previously derived can be removed from the first merging candidates. As a result, the total number of the second merging candidates can be increased so that the variety of combinations of a prediction direction, a motion vector, and a reference picture index for a selectable merging candidate can be increased. It is therefore possible to further increase coding efficiency.

For example, the image coding method may further include switching a coding process between a first coding process conforming to a first standard and a second coding process conforming to a second standard; and attaching, to the bitstream, identification information indicating either the first standard or the second standard to which the coding process after the switching conforms, wherein when the coding process is switched to the first coding process, the deriving of a merging candidate as a first merging candidate, the deriving of a merging candidate as a second merging candidate, the selecting, and the attaching are performed as the first coding process.

With this, it is possible to switchably perform the first coding process conforming to the first standard and the second coding process conforming to the second standard.

Furthermore, an image decoding method according to an aspect of the present disclosure is a method for decoding, on a block-by-block basis, a coded image included in a bitstream and includes: deriving, as a first merging candidate, a merging candidate based on a prediction direction, a motion vector, and a reference picture index which have been used for decoding a block spatially or temporally neighboring a current block to be decoded, the merging candidate being a combination of a prediction direction, a motion vector, and a reference picture index for use in decoding of the current block; deriving, as a second merging candidate, a merging candidate having a motion vector which is a predetermined vector; obtaining, from the bitstream, an index for identifying a merging candidate; and selecting, based on the obtained index, a merging candidate from the first merging candidate and the second merging candidate, the merging candidate being to be used for the decoding of a current block.

With this method, a merging candidate having a motion vector which is a predetermined vector can be derived as a second merging candidate. It is therefore possible to derive a merging candidate having a motion vector and others for a stationary region as a second merging candidate, for example. This makes it possible to appropriately decode a bitstream generated by coding a block having a predetermined motion efficiently, so that a bitstream coded with increased coding efficiency can be appropriately decoded.

For example, in the deriving of a merging candidate as a second merging candidate, the second merging candidate may be derived for each referable reference picture.

With this, a second merging candidate can be derived for each reference picture. The variety of merging candidates is thereby increased, so that a bitstream coded with further increased coding efficiency can be appropriately decoded.

For example, the predetermined vector may be a zero vector.

With this, a merging candidate having a motion vector for a stationary region can be derived because the predetermined vector which is a zero vector. It is therefore possible to appropriately decode a bitstream coded with increased coding efficiency.

For example, the image decoding method may further include: determining a maximum number of merging candidates; and determining whether or not the total number of the derived first merging candidate is smaller than the maximum number, wherein the deriving of a merging candidate as a second merging candidate is performed when it is determined that the total number of the derived first merging candidate is smaller than the maximum number.

With this, a second merging candidate can be derived when it is determined that the total number of the first merging candidates is smaller than the maximum number. Accordingly, the total number of merging candidates can be increased within a range not exceeding the maximum number so that a bitstream coded with increased coding efficiency can be appropriately decoded.

For example, in the obtaining, the index coded and attached to the bitstream may be obtained by decoding the index using the determined maximum number.

With this, an index for identifying a merging candidate can be decoded using a determined maximum number. In other words, an index can be decoded independently of the total number of actually derived merging candidates. Therefore, even when information necessary for derivation of a merging candidate (for example, information on a co-located block) is lost, an index can be still decoded and error resistance is thereby enhanced. Furthermore, an index can be decoded without waiting for derivation of merging candidates so that deriving of merging candidates and decoding of indexes can be performed in parallel.

For example, in the determining of a maximum number of a merging candidate, the maximum number may be determined based on information attached to the bitstream and indicating the maximum number.

With this, a maximum number can be determined based on information attached to a bitstream. It is therefore possible to decode an image coded using maximum numbers changed by the appropriate unit.

For example, in the deriving of a merging candidate as a first merging candidate, a merging candidate which is a combination of a prediction direction, a motion vector, and a reference picture index may be derived as the first merging candidate, the combination being different from a combination of a prediction direction, a motion vector, and a reference picture index of any first merging candidate previously derived.

With this, a merging candidate which is a combination of a prediction direction, a motion vector, and a reference picture index identical to a combination of a prediction direction, a motion vector, and a reference picture index of any first merging candidate previously derived can be removed from the first merging candidates. As a result, the total number of the second merging candidates can be increased so that the variety of combinations of a prediction direction, a motion vector, and a reference picture index for a selectable merging candidate can be increased. It is therefore possible to appropriately decode a bitstream coded with further increased coding efficiency.

For example, the image decoding method may further include: switching a decoding process between a first decoding process conforming to a first standard and a second decoding process conforming to a second standard, according to identification information which is attached to the bitstream and indicates either the first standard or the second standard, wherein when the decoding process is switched to the first decoding process, the deriving of a merging candidate as a first merging candidate, the deriving of a merging candidate as a second merging candidate, the obtaining, and the selecting are performed as the first decoding process.

With this, it is possible to switchably perform the first decoding process conforming to the first standard and the second decoding process conforming to the second standard.

It should be noted that these general or specific aspects can be implemented as a system, a method, an integrated circuit, a computer program, a computer-readable recording medium such as a compact disc read-only memory (CD-ROM), or as any combination of a system, a method, an integrated circuit, a computer program, and a computer-readable recording medium.

An image coding apparatus and an image decoding apparatus according to an aspect of the present disclosure will be described specifically below with reference to the drawings.

Each of the exemplary embodiments described below shows a specific example. The numerical values, shapes, materials, constituent elements, the arrangement and connection of the constituent elements, steps, the processing order of the steps etc. shown in the following exemplary embodiments are mere examples, and therefore do not limit the inventive concept in the present disclosure. Furthermore, among the constituent elements in the following exemplary embodiments, constituent elements not recited in any one of the independent claims defining the most generic part of the inventive concept are not necessarily required in order to overcome the disadvantages.

Embodiment 1

Figure 9:
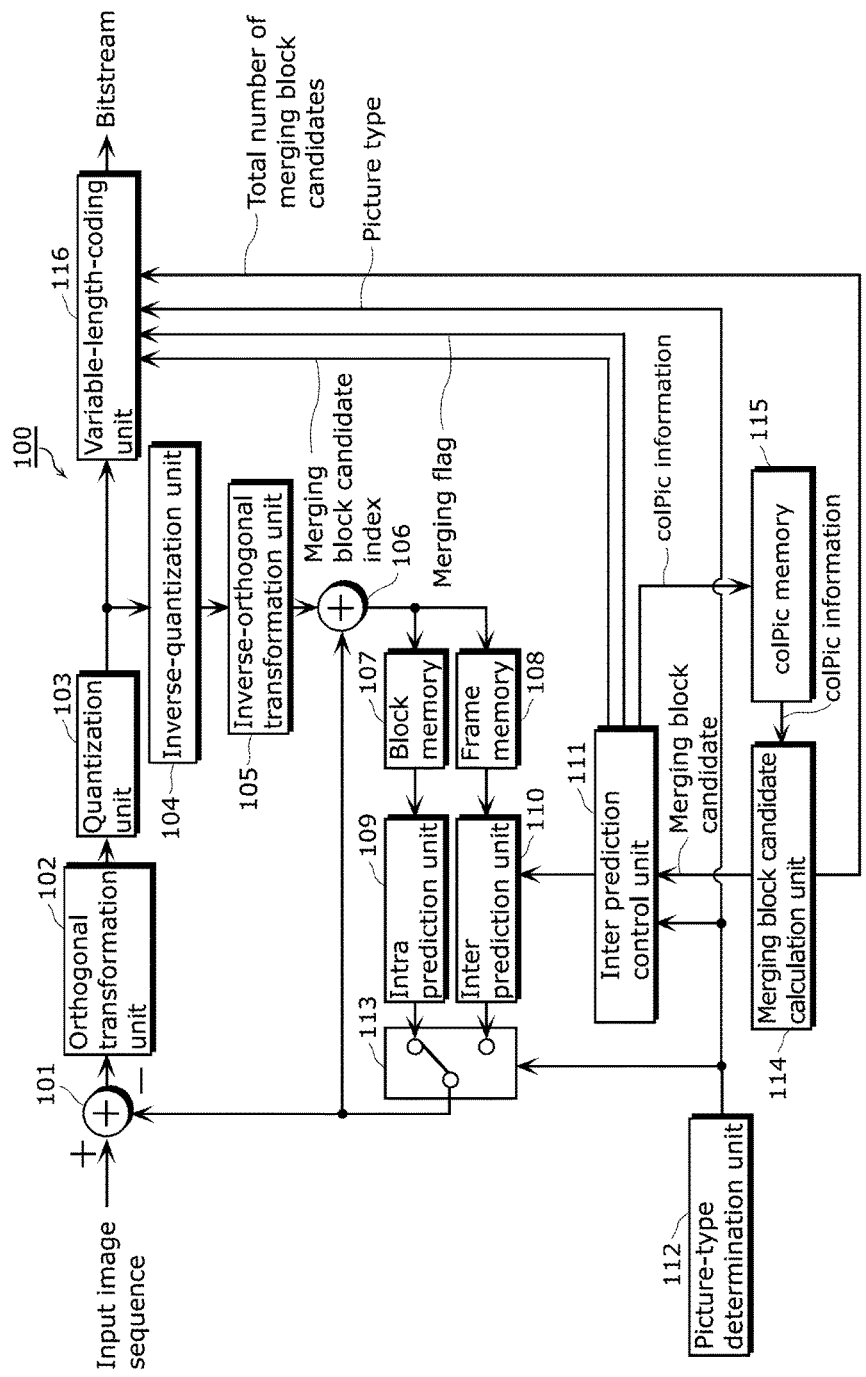
FIG. 9 is a block diagram showing a configuration of an image coding apparatus according to Embodiment 1.

FIG. 9 is a block diagram showing a configuration of an image coding apparatus according to Embodiment 1. An image coding apparatus 100 codes an image on a block-by-block basis to generate a bitstream.

As shown in FIG. 9, the image coding apparatus 100 includes a subtractor 101, an orthogonal transformation unit 102, a quantization unit 103, an inverse-quantization unit 104, an inverse-orthogonal-transformation unit 105, an adder 106, block memory 107, frame memory 108, an intra prediction unit 109, an inter prediction unit 110, an inter prediction control unit 111, a picture-type determination unit 112, a switch 113, a merging block candidate calculation unit 114, colPic memory 115, and a variable-length-coding unit 116.

The subtractor 101 subtracts, on a block-by-block basis, prediction picture data from input image data included in an input image sequence to generate prediction error data.

The orthogonal transformation unit 102 transforms the generated prediction error data from a picture domain into a frequency domain.

The quantization unit 103 quantizes the prediction error data transformed into a frequency domain.

The inverse-quantization unit 104 inverse-quantizes the prediction error data quantized by the quantization unit 103.

The inverse-orthogonal-transformation unit 105 transforms the inverse-quantized prediction error data from a frequency domain into a picture domain.

The adder 106 adds, on a block-by-block basis, prediction picture data and the prediction error data inverse-quantized by the inverse-orthogonal-transformation unit 105 to generate reconstructed image data.

The block memory 107 stores the reconstructed image data in units of a block.

The frame memory 108 stores the reconstructed image data in units of a frame.

The picture-type determination unit 112 determines in which of the picture types of I picture, B picture, and P picture the input image data is to be coded. Then, the picture-type determination unit 112 generates picture-type information indicating the determined picture type.

The intra prediction unit 109 generates intra prediction picture data of a current block by performing intra prediction using reconstructed image data stored in the block memory 107 in units of a block.

The inter prediction unit 110 generates inter prediction picture data of a current block by performing inter prediction using reconstructed image data stored in the frame memory 108 in units of a frame and a motion vector derived by a process including motion estimation.

When a current block is coded by intra prediction coding, the switch 113 outputs intra prediction picture data generated by the intra prediction unit 109 as prediction picture data of the current block to the subtractor 101 and the adder 106. On the other hand, when a current block is coded by inter prediction coding, the switch 113 outputs inter prediction picture data generated by the inter prediction unit 110 as prediction picture data of the current block to the subtractor 101 and the adder 106.

The merging block candidate calculation unit 114 derives merging block candidates for merging mode using motion vectors and others of neighboring blocks of the current block and a motion vector and others of the co-located block (colPic Information) stored in the colPic memory 115. Furthermore, the merging block candidate calculation unit 114 adds the derived merging block candidate to a merging block candidate list.

Furthermore, the merging block candidate calculation unit 114 derives, as a new candidate, a merging block candidate having a prediction direction, a motion vector, and a reference picture index for a stationary region (hereinafter referred to as a "zero merging block candidate") using a method described later. Then, the merging block candidate calculation unit 114 adds the derived zero merging block candidate as a new merging block candidate to the merging block candidate list. Furthermore, the merging block candidate calculation unit 114 calculates the total number of merging block candidates.

Furthermore, the merging block candidate calculation unit 114 assigns merging block candidate indexes each having a different value to the derived merging block candidates. Then, the merging block candidate calculation unit 114 transmits the merging block candidates and merging block candidate indexes to the inter prediction control unit 111. Furthermore, the merging block candidate calculation unit 114 transmits the calculated total number of merging block candidates to the variable-length-coding unit 116.

The inter prediction control unit 111 selects a prediction mode using which prediction error is the smaller from a prediction mode in which a motion vector derived by motion estimation is used (motion estimation mode) and a prediction mode in which a motion vector derived from a merging block candidate is used (merging mode). The inter prediction control unit 111 also transmits a merging flag indicating whether or not the selected prediction mode is the merging mode to the variable-length-coding unit 116. Furthermore, the inter prediction control unit 111 transmits a merging block candidate index corresponding to the determined merging block candidates to the variable-length-coding unit 116 when the selected prediction mode is the merging mode. Furthermore, the inter prediction control unit 111 transfers the colPic information including the motion vector and others of the current block to the colPic memory 115.

The variable-length-coding unit 116 generates a bitstream by performing variable-length coding on the quantized prediction error data, the merging flag, and the picture-type information. The variable-length-coding unit 116 also sets the total number of merging block candidates as the size of the merging block candidate list. Furthermore, the variable-length-coding unit 116 performs variable-length coding on a merging block candidate index to be used for coding, by assigning, according to the size of the merging block candidate list, a bit sequence to the merging block candidate index.

Figure 10:
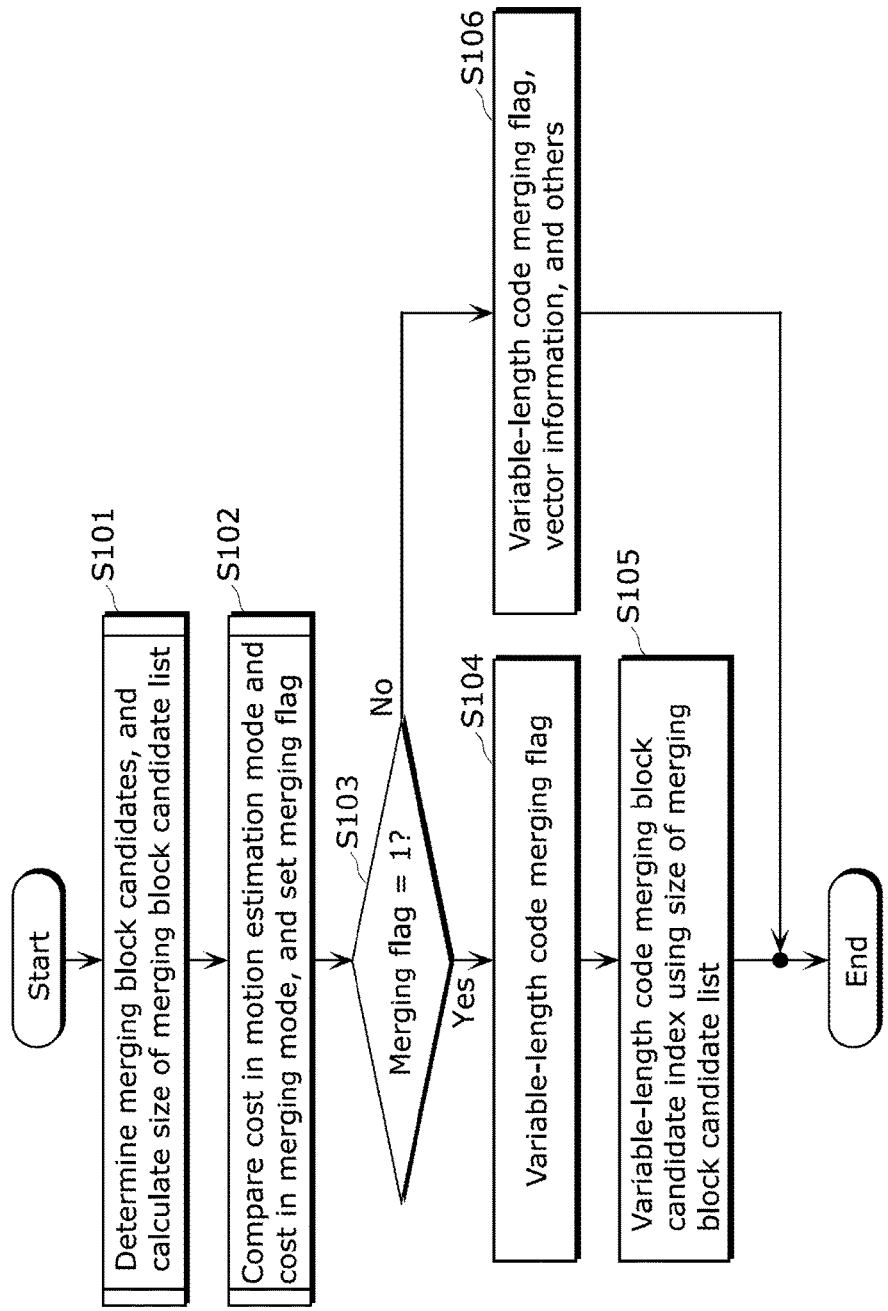
FIG. 10 is a flowchart showing processing operations of the image coding apparatus according to Embodiment 1.

FIG. 10 is a flowchart showing processing operations of the image coding apparatus 100 according to Embodiment 1.

In Step S101, the merging block candidate calculation unit 114 derives merging block candidates from neighboring blocks and a co-located block of a current block. Furthermore, the merging block candidate calculation unit 114 calculates the size of a merging block candidate list using a method described later.

For example, in the case shown in FIG. 3, the merging block candidate calculation unit 114 selects the neighboring blocks A to D as merging block candidates. Furthermore, the merging block candidate calculation unit 114 calculates, as a merging block candidate, a co-located merging block having a motion vector, a reference picture index, and a prediction direction which are calculated from the motion vector of a co-located block using the time prediction mode.

Figure 11:
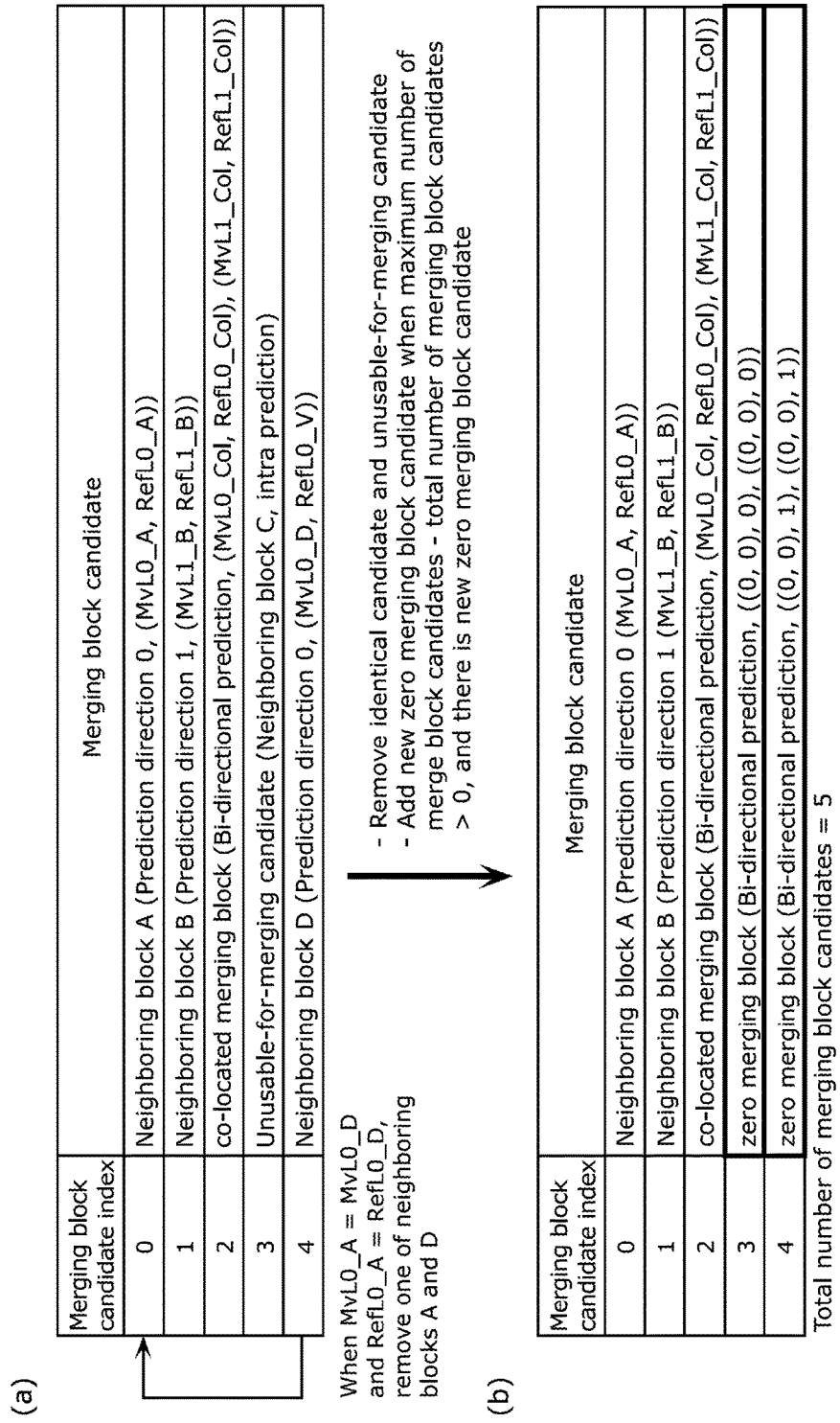
FIG. 11 shows in (a) and (b) an exemplary merging block candidate list according to Embodiment 1.

The merging block candidate calculation unit 114 assigns merging block candidate indexes to the respective merging block candidates as shown in (a) in FIG. 11. Next, the merging block candidate calculation unit 114 calculates a merging block candidate list as shown in (b) in FIG. 11 and the size of the merging block candidate list by removing unusable-for-merging candidates and identical candidates and adding a new zero merging block candidate using a method described later.

Shorter codes are assigned to merging block candidate indexes of smaller values. In other words, the smaller the value of a merging block candidate index, the smaller the amount of information necessary for indicating the merging block candidate index.

On the other hand, the larger the value of a merging block candidate index, the larger the amount of information necessary for the merging block candidate index. Therefore, coding efficiency will be increased when merging block candidate indexes of smaller values are assigned to merging block candidates which are more likely to have motion vectors of higher accuracy and reference picture indexes of higher accuracy.

Therefore, a possible case is that the merging block candidate calculation unit 114 counts the total number of times of selection of each merging block candidates as a merging block, and assigns merging block candidate indexes of smaller values to blocks with a larger total number of the times. Specifically, this can be achieved by specifying a merging block selected from neighboring blocks and assigning a merging block candidate index of a smaller value to the specified merging block when a current block is coded.

When a merging block candidate does not have information such as a motion vector (for example, when the merging block has been a block coded by intra prediction, it is located outside the boundary of a picture or the boundary of a slice, or it is yet to be coded), the merging block candidate is unusable for coding.

In Embodiment 1, a merging block candidate unusable for coding is referred to as an unusable-for-merging candidate, and a merging block candidate usable for coding is referred to as a usable-for-merging candidate. In addition, among a plurality of merging block candidates, a merging block candidate identical in motion vector, reference picture index, and prediction direction to any other merging block is referred to as an identical candidate.

In the case shown in FIG. 3, the neighboring block C is an unusable-for-merging candidate because it is a block coded by intra prediction. The neighboring block D is an identical candidate because it is identical in motion vector, reference picture index, and prediction direction to the neighboring block A.

In Step S102, the inter prediction control unit 111 selects a prediction mode based on comparison, using a method described later, between prediction error of a prediction picture generated using a motion vector derived by motion estimation and prediction error of a prediction picture generated using a motion vector obtained from a merging block candidate. When the selected prediction mode is the merging mode, the inter prediction control unit 111 sets the merging flag to 1, and when not, the inter prediction control unit 111 sets the merging flag to 0.

In Step S103, whether or not the merging flag is 1 (that is, whether or not the selected prediction mode is the merging mode) is determined.

When the result of the determination in Step S103 is true (Yes, S103), the variable-length-coding unit 116 attaches the merging flag to a bitstream in Step S104. Subsequently, in Step S105, the variable-length-coding unit 116 assigns bit sequences according to the size of the merging block candidate list as shown in FIG. 5 to the merging block candidate indexes of merging block candidates to be used for coding. Then, the variable-length-coding unit 116 performs variable-length coding on the assigned bit sequence.

On the other hand, when the result of the determination in Step S103 is false (S103, No), the variable-length-coding unit 116 attaches information on a merging flag and a motion estimation vector mode to a bitstream in Step S106.

In Embodiment 1, a merging block candidate index having a value of "0" is assigned to the neighboring block A as shown in (a) in FIG. 11. A merging block candidate index having a value of "1" is assigned to the neighboring block B. A merging block candidate index having a value of "2" is assigned to the co-located merging block. A merging block candidate index having a value of "3" is assigned to the neighboring block C. A merging block candidate index having a value of "4" is assigned to the neighboring block D.

It should be noted that the merging block candidate indexes having such a value may be assigned otherwise. For example, when a new zero merging block candidate is added using a method described later, the variable-length-coding unit 116 may assign smaller values to preexistent merging block candidates and a larger value to the new zero merging block candidate. In other words, the variable-length-coding unit 116 may assign a merging block candidate index of a smaller value to a preexistent merging block candidate in priority to a new candidate.

Furthermore, merging block candidates are not limited to the blocks at the positions of the neighboring blocks A, B, C, and D. For example, a neighboring block located above the lower left neighboring block D can be used as a merging block candidate. Furthermore, it is not necessary to use all the neighboring blocks as merging block candidates. For example, it is also possible to use only the neighboring blocks A and B as merging block candidates.

Furthermore, although the variable-length-coding unit 116 attaches a merging block candidate index to a bitstream in Step S105 in FIG. 10 in Embodiment 1, attaching such a merging block candidate index to a bitstream is not always necessary. For example, the variable-length-coding unit 116 need not attach a merging block candidate index to a bitstream when the size of the merging block candidate list is "1". The amount of information on the merging block candidate index is thereby reduced.

Figure 12:
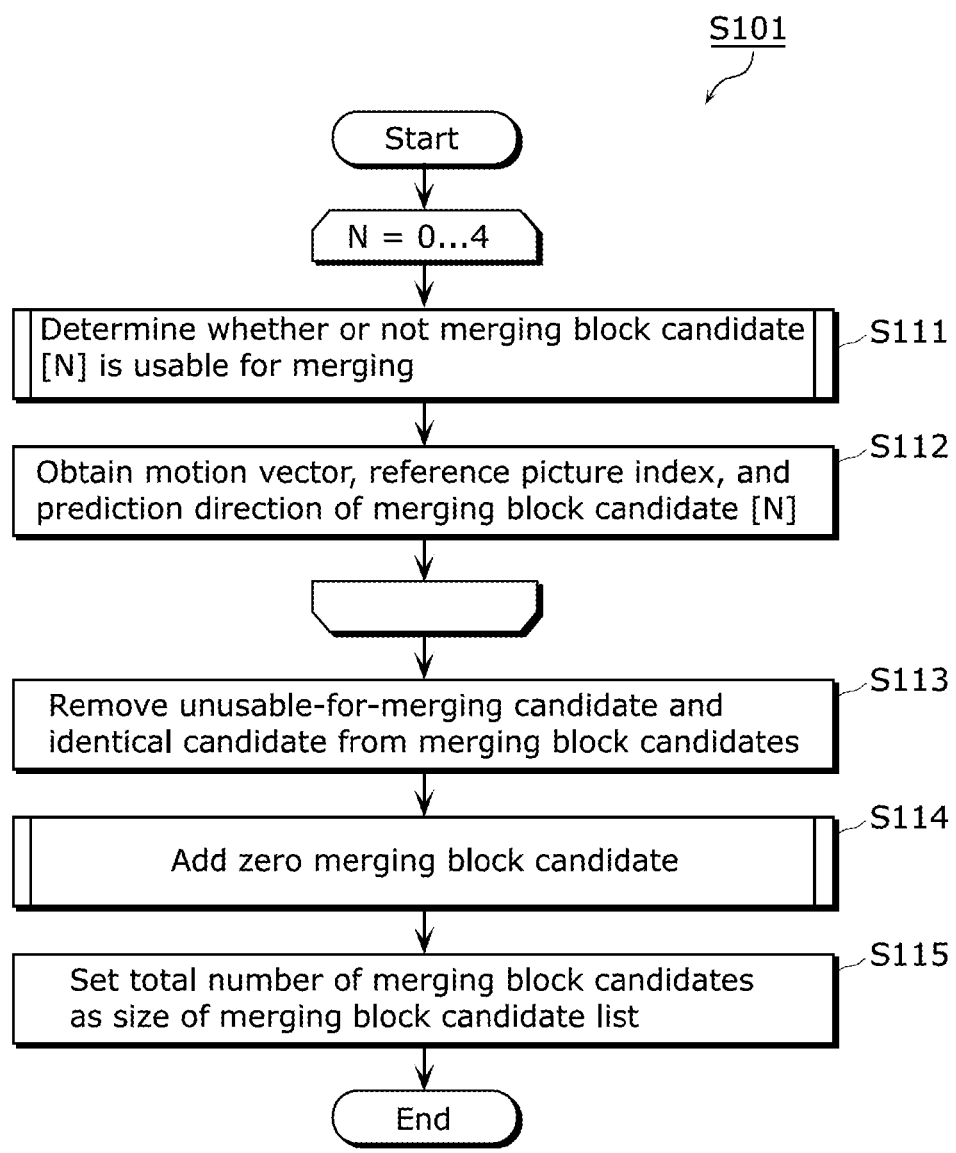
FIG. 12 is a flowchart illustrating a process for calculating merging block candidates and the size of a merging block candidate list according to Embodiment 1.

FIG. 12 is a flowchart showing details of the process in Step S101 in FIG. 10. Specifically, FIG. 12 illustrates a method of calculating merging block candidates and the size of a merging block candidate list. FIG. 12 will be described below.

In Step S111, the merging block candidate calculation unit 114 determines whether or not a merging block candidate [N] is a usable-for-merging candidate using a method described later.

Here, N denotes an index value for identifying each merging block candidate. In Embodiment 1, N takes values from 0 to 4. Specifically, the neighboring block A in FIG. 3 is assigned to a merging block candidate [0]. The neighboring block B in FIG. 3 is assigned to a merging block candidate [1]. The co-located merging block is assigned to a merging block candidate [2]. The neighboring block C in FIG. 3 is assigned to a merging block candidate [3]. The neighboring block D in FIG. 3 is assigned to a merging block candidate [4].

In Step S112, the merging block candidate calculation unit 114 obtains the motion vector, reference picture index, and prediction direction of the merging block candidate [N], and adds them to a merging block candidate list.

In Step S113, the merging block candidate calculation unit 114 searches the merging block candidate list for an unusable-for-merging candidate and an identical candidate, and removes the unusable-for-merging candidate and the identical candidate from the merging block candidate list as shown in FIG. 11.

In Step S114, the merging block candidate calculation unit 114 adds a new zero merging block candidate to the merging block candidate list using a method described later. Here, when a new zero merging block candidate is added, the merging block candidate calculation unit 114 may reassign merging block candidate indexes so that the merging block candidate indexes of smaller values are assigned to preexistent merging block candidates in priority to the new candidate. In other words, the merging block candidate calculation unit 114 may reassign the merging block candidate indexes so that a merging block candidate index of a larger value is assigned to the new zero merging block candidate. The amount of code of merging block candidate indexes is thereby reduced.

In S115, the merging block candidate calculation unit 114 sets the total number of merging block candidates after the adding of the zero merging block candidate as the size of the merging block candidate list. In the example shown in FIG. 11, the total number of merging block candidates calculated using a method described later is "5", and the size of the merging block candidate list is set at "5".

The new zero merging block candidate in Step S114 is a candidate newly added to merging block candidates using a method described later when the total number of merging block candidates is smaller than a maximum number of merging block candidates. In this manner, when the total number of merging block candidates is smaller than a maximum number of merging block candidate, the image coding apparatus 100 adds a new zero merging block candidate so that coding efficiency can be increased.

Figure 13:
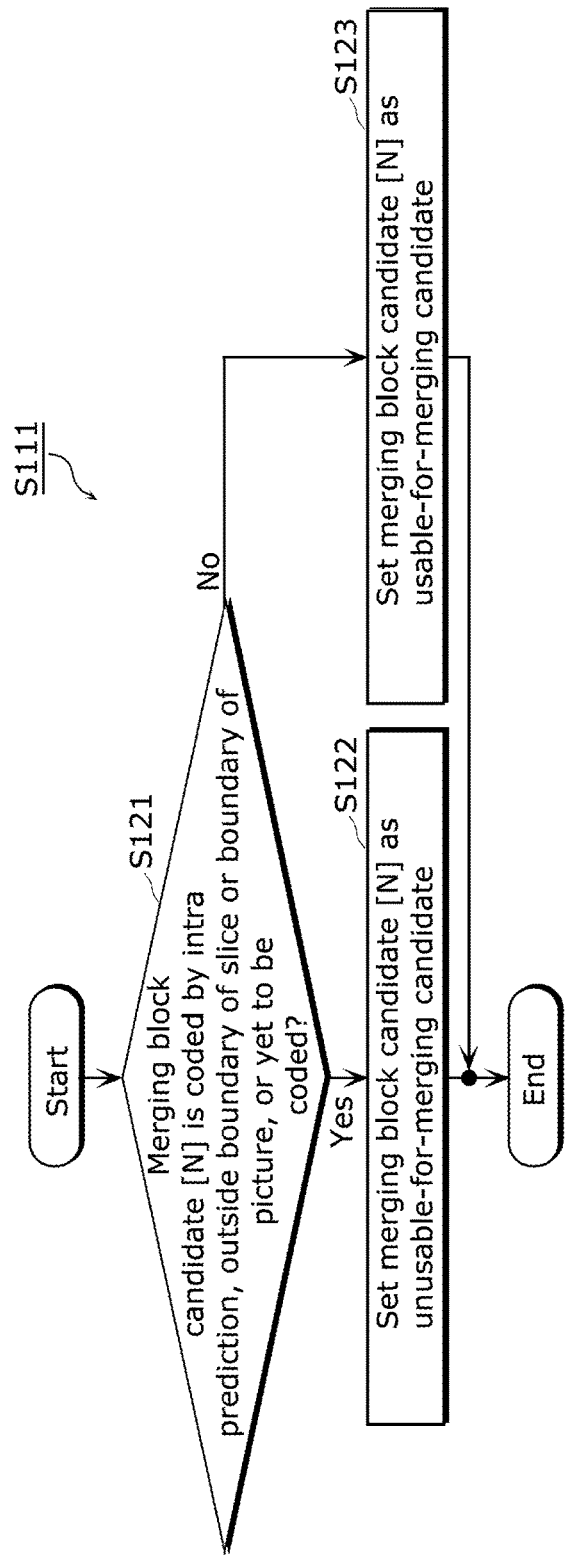
FIG. 13 is a flowchart illustrating a process for determining whether or not a merging block candidate is a usable-for-merging candidate and updating the total number of usable-for-merging candidates according to Embodiment 1.

FIG. 13 is a flowchart showing details of the process in Step S111 in FIG. 12. Specifically, FIG. 13 illustrates a method of determining whether or not a merging block candidate [N] is a usable-for-merging candidate and updating the total number of usable-for-merging candidates. FIG. 13 will be described below.

In Step S121, the merging block candidate calculation unit 114 determines whether it is true or false that (1) a merging block candidate [N] has been coded by intra prediction, (2) the merging block candidate [N] is a block outside the boundary of a slice including the current block or the boundary of a picture including the current block, or (3) the merging block candidate [N] is yet to be coded.

When the result of the determination in Step S121 is true (S121, Yes), the merging block candidate calculation unit 114 sets the merging block candidate [N] as an unusable-for-merging candidate in Step S122. On the other hand, when the result of the determination in Step S121 is false (S121, No), the merging block candidate calculation unit 114 sets the merging block candidate [N] as a usable-for-merging candidate in Step S123.

Figure 14:
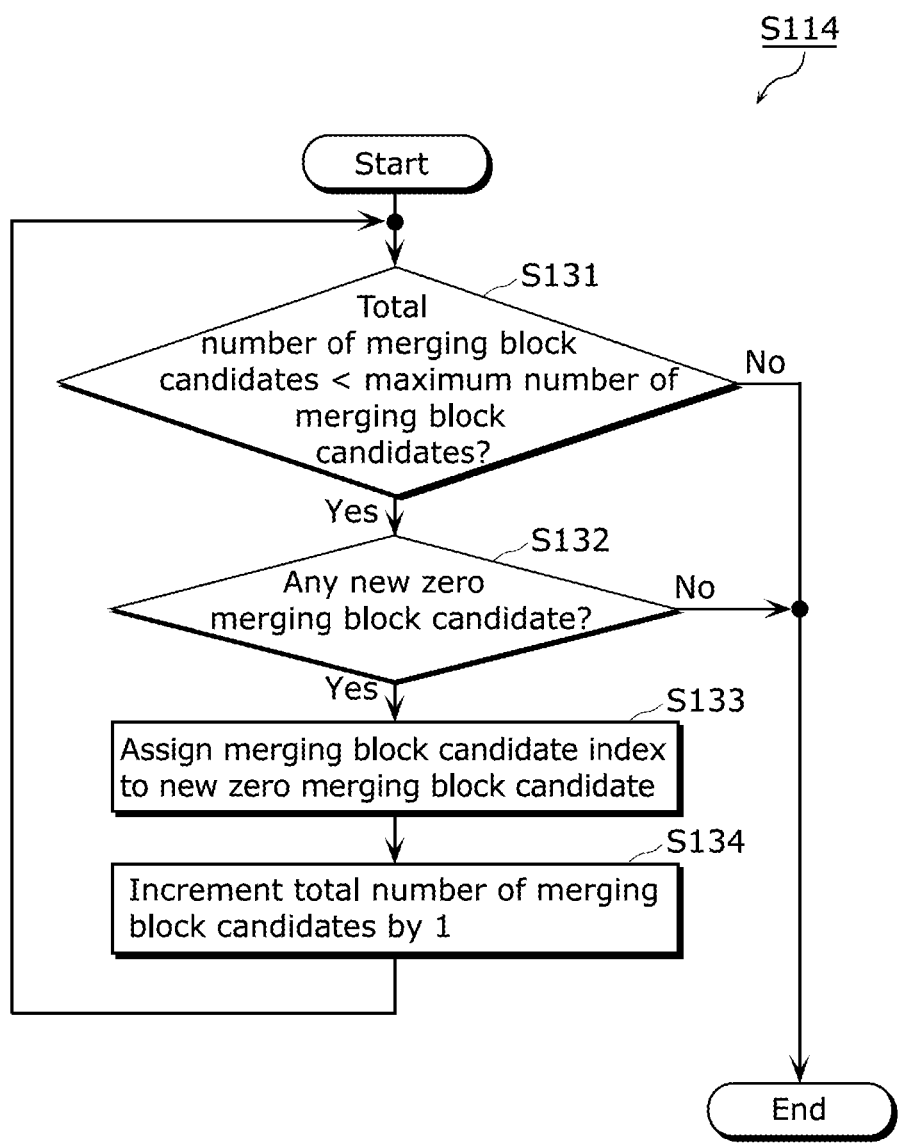
FIG. 14 is a flowchart illustrating a process for adding a zero merging block candidate according to Embodiment 1.

FIG. 14 is a flowchart showing details of the process in Step S114 in FIG. 12. Specifically, FIG. 14 illustrates a method of adding a zero merging block candidate. FIG. 14 will be described below.

In Step S131, the merging block candidate calculation unit 114 determines whether or not the total number of merging block candidates is smaller than the total number of usable-for-merging candidates. In other words, the merging block candidate calculation unit 114 determines whether or not the total number of merging block candidates is still below the maximum number of merging block candidates.

Here, when the result of the determination in Step S131 is true (S131, Yes), in Step S132, the merging block candidate calculation unit 114 determines whether or not there is a new zero merging block candidate which can be added as a merging block candidate to the merging block candidate list. Here, when the result of the determination in Step S132 is true (S132, Yes), in Step S133, the merging block candidate calculation unit 114 assigns a merging block candidate index having a value to the new zero merging block candidate and adds the new zero merging block candidate to the merging block candidate list. Furthermore, in Step S134, the merging block candidate calculation unit 114 increments the total number of merging block candidates by one.

On the other hand, when the result of the determination in Step S131 or in Step S132 is false (S131 or S132, No), the process for adding a zero merging block candidate ends. Specifically, when the total number of merging block candidates has reached the maximum number of merging block candidates, or when there is no new zero merging block candidate, the process for adding a new zero merging block candidate ends.

Figure 15:
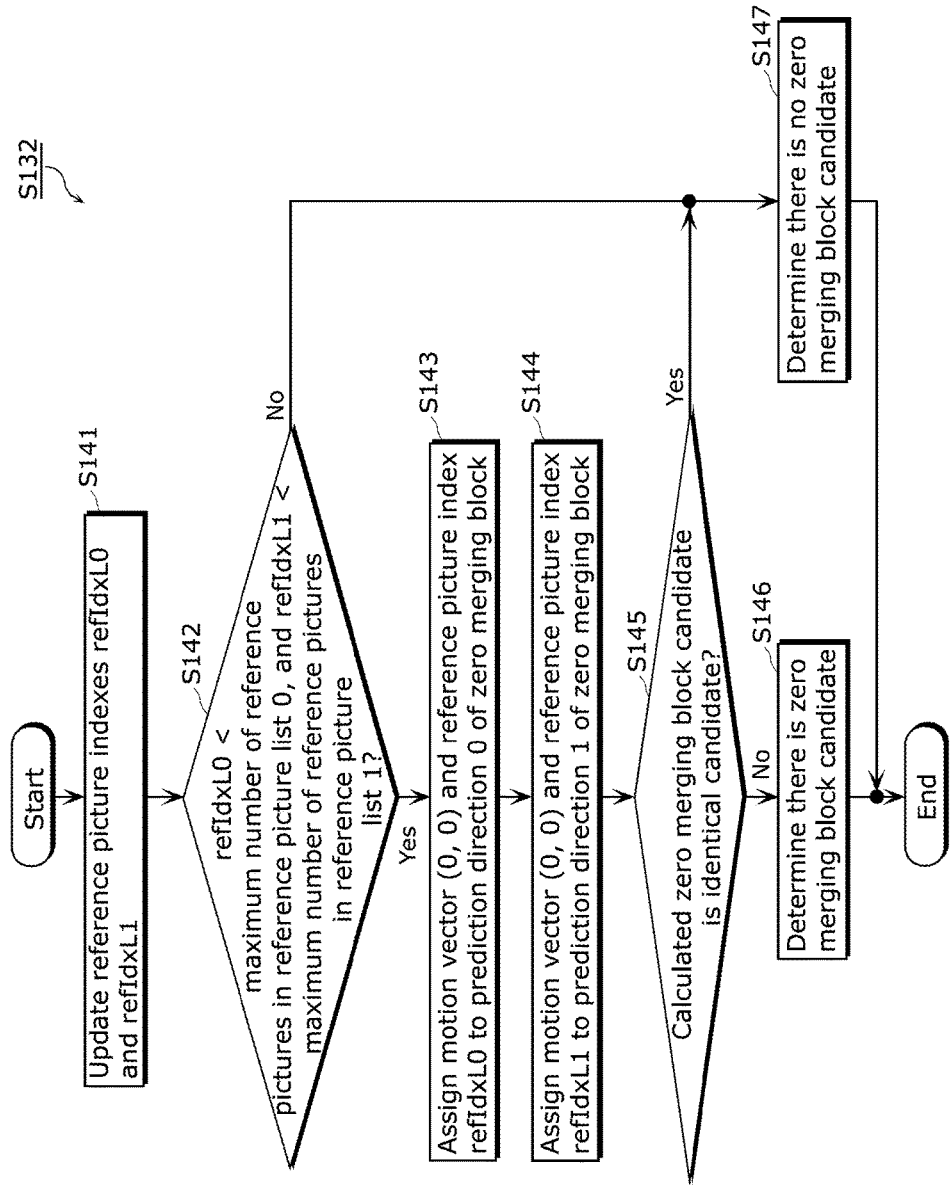
FIG. 15 is a flowchart illustrating a process for determining whether or not there is a zero merging block candidate according to Embodiment 1.

FIG. 15 is a flowchart showing details of the process in Step S132 in FIG. 14. Specifically, FIG. 15 illustrates a method of determining whether or not there is a zero merging block candidate. FIG. 15 will be described below.

In Step S141, the merging block candidate calculation unit 114 updates the value of a reference picture index refIdxL0 having the prediction direction 0 and the value of a reference picture index refIdxL1 having the prediction direction 1 for use in generating a zero merging block candidate. The reference picture indexes refIdxL0 and refIdxL1 each have an initial value of "−1", and are incremented by "+1" each time the process in Step S141 is performed. Specifically, first, the merging block candidate calculation unit 114 adds, as a zero merging block candidate for a stationary region, a zero merging block candidate which has a motion vector being a zero-value vector (zero vector) and a reference picture index having a value of 0 to a merging block candidate list. Next, the merging block candidate calculation unit 114 adds, to the merging block candidate list, a zero merging block candidate which has a motion vector being a zero-value vector and a reference picture index having a value of 1.

In Step S142, the merging block candidate calculation unit 114 determines whether it is true or false that the updated value of the reference picture index refIdxL0 having the prediction direction 0 is smaller than a maximum number of reference pictures in the reference picture list 0 for the prediction direction 0, and the updated value of the reference picture index refIdxL1 having the prediction direction 1 is smaller than a maximum number of reference pictures in the reference picture list 1 for the prediction direction 1.

Then, when the result of the determination in Step S142 is true (S142, Yes), in Step S143, the merging block candidate calculation unit 114 assigns a motion vector which is a zero-value vector (0, 0) and the reference picture index refIdxL0 to the prediction direction 0 of the zero merging block. Furthermore, in Step S144, the merging block candidate calculation unit 144 assigns a motion vector which is a zero-value vector (0, 0) and the reference picture index refIdxL1 to the prediction direction 1 of the zero merging block.

Figure 16:
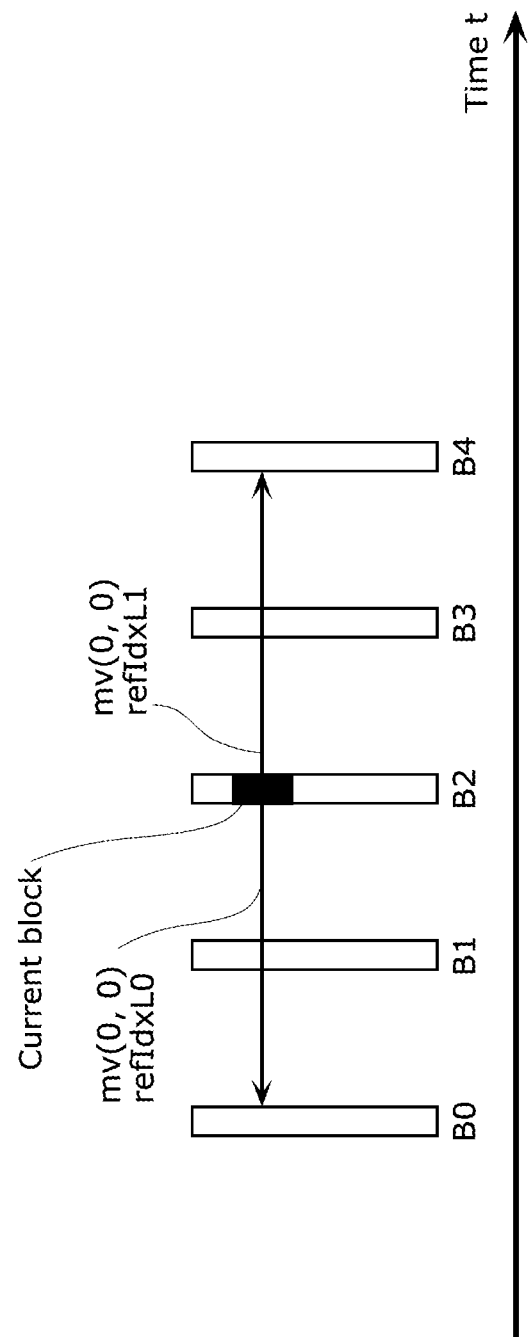
FIG. 16 shows an example of a zero merging block according to Embodiment 1.

The merging block candidate calculation unit 114 thus calculates a zero merging block for bi-directional prediction by the processes in Step S143 and Step S144. FIG. 16 shows an example of a calculated zero merging block.

In Step S145, the merging block candidate calculation unit 114 determines whether or not the merging block candidate list already includes a merging block candidate identical in motion vector, reference picture index, and prediction direction to the calculated zero merging block candidate. In other words, the merging block candidate calculation unit 114 determines whether or not the calculated zero merging block candidate is an identical candidate.

When the result of the determination in S145 is false (S145, No), in Step S146, the merging block candidate calculation unit 114 determines that there is a zero merging block candidate.

On the other hand, when the result of the determination in Step S142 is false (S142, No) or the result of the determination in Step S145 is true (S145, Yes), in Step S147, the merging block candidate calculation unit 114 determines that there is no zero merging block candidate.

In this manner, the merging block candidate calculation unit 114 calculates a zero merging block candidate which has a motion vector being a zero-value vector for each referable reference picture, and adds the calculated zero merging block to a merging block candidate list. The image coding apparatus 100 thus can increase efficiency of coding in merging mode especially when a current block to be coded is a stationary region.

Figure 17:
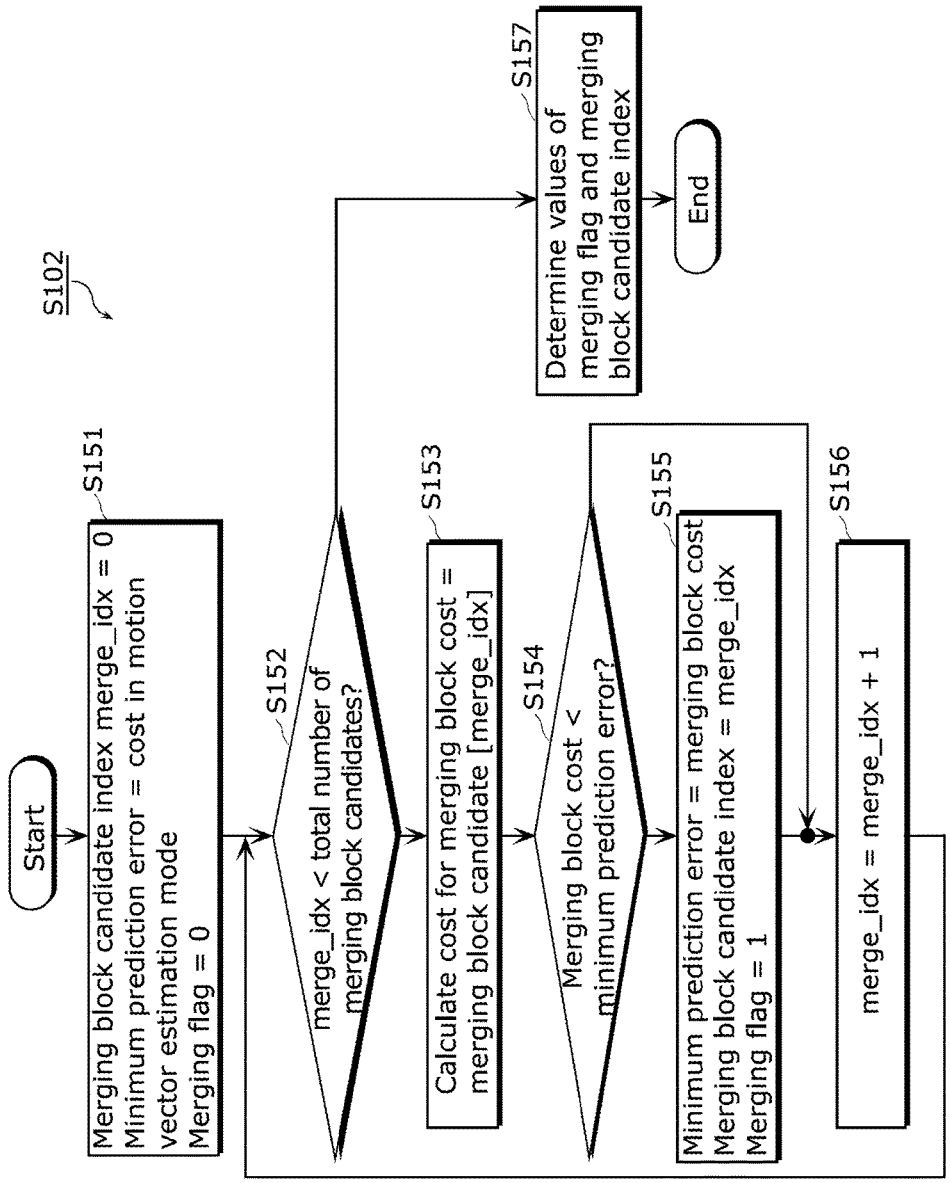
FIG. 17 is a flowchart illustrating a process for selecting a merging block candidate according to Embodiment 1.

FIG. 17 is a flowchart showing details of the process in Step S102 in FIG. 10. Specifically, FIG. 17 illustrates a process for selecting a merging block candidate. FIG. 17 will be described below.

In Step S151, the inter prediction control unit 111 sets a merging block candidate index at 0, the minimum prediction error at the prediction error (cost) in the motion vector estimation mode, and a merging flag at 0. Here, the cost is calculated using the following formula for an R-D optimization model, for example.

$$Cost = D + \lambda R \qquad (Equation\ 1)$$

In Equation 1, D denotes coding distortion. For example, D is the sum of absolute differences between original pixel values of a current block to be coded and pixel values obtained by coding and decoding of the current block using a prediction picture generated using a motion vector. R denotes the amount of generated codes. For example, R is the amount of code necessary for coding a motion vector used for generation of a prediction picture. $\lambda$ denotes an undetermined Lagrange multiplier.

In Step S152, the inter prediction control unit 111 determines whether or not the value of a merging block candidate index is smaller than the total number of merging block candidates of a current block. In other words, the inter prediction control unit 111 determines whether or not there is still a merging block candidate on which the process from Step S153 to Step S155 has not been performed yet.

When the result of the determination in Step S152 is true (S152, Yes), in Step S153, the inter prediction control unit 111 calculates the cost for a merging block candidate to which a merging block candidate index is assigned. Then, in Step S154, the inter prediction control unit 111 determines whether or not the calculated cost for a merging block candidate is smaller than the minimum prediction error.

Here, when the result of the determination in Step S154 is true, (S154, Yes), the inter prediction control unit 111 updates the minimum prediction error, the merging block candidate index, and the value of the merging flag in Step S155. On the other hand, when the result of the determination in Step S154 is false (S154, No), the inter prediction control unit 111 does not update the minimum prediction error, the merging block candidate index, or the value of the merging flag.

In Step S156, the inter prediction control unit 111 increments the merging block candidate index by one, and repeats from Step S152 to Step S156.

On the other hand, when the result of the determination in Step S152 is false (S152, No), that is, there is no more unprocessed merging block candidate, the inter prediction control unit 111 fixes the final values of the merging flag and merging block candidate index in Step S157.

Thus, the image coding apparatus 100 according to Embodiment 1 adds, to a merging block candidate list, a new merging block candidate having a motion vector and a reference picture index for a stationary region so that coding efficiency can be increased. More specifically, the image coding apparatus 100 calculates, for each referable reference picture, a merging block candidate which has a motion vector being a zero-value vector, and newly adds the calculated merging block candidate to a merging block candidate list, so that efficiency of coding in merging mode can be increased especially when a current block is a stationary region.

It should be noted that the example described in Embodiment 1 in which a merging block candidate which has a motion vector being a zero-value vector is calculated as a motion vector for a stationary region is not limiting. For example, with consideration for small camera shake during video shooting, the merging block candidate calculation unit 114 may calculate a merging block candidate which has, as a motion vector, a predetermined vector having a value slightly larger or smaller than a value of 0 (for example, a motion vector (0, 1)) as a new candidate instead of a zero merging block candidate. In this case, the variable-length-coding unit 116 may add offset parameters, for example, (OffsetX, OffsetY) to a header or others of a sequence, a picture, or a slice. In this case, the merging block candidate calculation unit 114 calculates a merging block candidate having a motion vector (OffsetX, OffsetY) as a new candidate.

It should be noted that the example described in Embodiment 1 in which merging flag is always attached to a bitstream in merging mode is not limiting. For example, the merging mode may be forcibly selected depending on a block shape for use in inter prediction of a current block. In this case, it is possible to reduce the amount of information by attaching no merging flag to a bitstream.

It should be noted that the example described in Embodiment 1 where the merging mode is used in which a current block is coded using a prediction direction, a motion vector, and a reference picture index copied from a neighboring block of the current block is not limiting. For example, a skip merging mode may be used. In the skip merging mode, a current block is coded in the same manner as in the merging mode, using a prediction direction, a motion vector, and a reference picture index copied from a neighboring block of the current block with reference to a merging block candidate list created as shown in (b) in FIG. 11. When all resultant prediction errors are zero for the current block, a skip flag set at 1 and the skip flag and a merging block candidate index are attached to a bitstream. When any of the resultant prediction errors is non-zero, a skip flag is set at 0 and the skip flag, a merging flag, a merging block candidate index, and the prediction errors are attached to a bitstream.

It should be noted that the example described in Embodiment 1 where the merging mode is used in which a current block is coded using a prediction direction, a motion vector, and a reference picture index copied from a neighboring block of the current block is not limiting. For example, a motion vector in the motion vector estimation mode may be coded using a merging block candidate list created as shown in (b) in FIG. 11. Specifically, a difference is calculated by subtracting a motion vector of a merging block candidate indicated by a merging block candidate index from a motion vector in the motion vector estimation mode. Furthermore, the calculated difference and the merging block candidate index may be attached to a bitstream.

Optionally, a difference may be calculated by scaling a motion vector MV_Merge of a merging block candidate using a reference picture index RefIdx_ME in the motion estimation mode and a reference picture index RefIdx_Merge of the merging block candidate and subtracting a motion vector scaledMV_Merge of the merging block candidate after the scaling from the motion vector in the motion estimation mode. Then, the calculated difference and the merging block candidate index may be attached to a bitstream. The following is an exemplary formula for the scaling.

$$scaledMV\_Merge=MV\_Merge\times(POC(RefIdx\_ME)-curPOC)/(POC(RefIdx\_Merge)-curPOC) \quad \text{(Equation 2)}$$

Here, POC (RefIdx_ME) denotes the display order of a reference picture indicated by a reference picture index RefIdx_ME. POC (RefIdx_Merge) denotes the display order of a reference picture indicated by a reference picture index RefIdx_Merge. curPOC denotes the display order of a current picture to be coded.

It should be noted that the example described in Embodiment 1 in which a zero merging block candidate for bi-directional prediction is generated from a motion vector being a zero-value vector, a reference picture index having a prediction direction 0, and a reference picture index having a prediction direction 1 is not limiting. For example, the merging block candidate calculation unit 114 may generate a zero merging block candidate having a prediction direction 0 using a motion vector being a zero-value vector and a reference picture index having a prediction direction 0, and add the zero merging block candidate to a merging block candidate list. Furthermore, similarly, the merging block candidate calculation unit 114 may generate a zero merging block candidate having a prediction direction 1 using a motion vector being a zero-value vector and a reference picture index having a prediction direction 1, and add the zero merging block candidate to a merging block candidate list.

It should be noted that the example described in Embodiment 1 in which zero merging block candidates are generated using a reference picture index having an initial value of 0 and incremented by "+1" is not limiting. For example, the merging block candidate calculation unit 114 may generate zero merging block candidates in order of reference picture indexes assigned to the reference pictures starting from a reference picture index assigned to the reference picture closest to a current picture to a reference picture index assigned to the farthest one in display order.

Embodiment 2

Although the merging block candidate calculation unit 114 determines in Step S145 in FIG. 15 whether or not a zero merging block candidate is an identical candidate in Embodiment 1, this determination is not always necessary. For example, the determination in Step S145 may be omitted. This reduces computational complexity in derivation of a merging block candidate list for the image coding apparatus 100.

Furthermore, it should be noted that Embodiment 1 in which zero merging block candidates are added to a merging block candidate list until the total number of merging block candidates reaches a maximum number of merging block candidates is not limiting. For example, the merging block candidate calculation unit 114 may determine in S131 in FIG. 14 whether or not the total number of merging block candidates has reached a predetermined threshold value which is smaller than a maximum number of merging block candidates. This reduces computational complexity in derivation of a merging block candidate list for the image coding apparatus 100.

Furthermore, it should be noted that Embodiment 1 in which adding a zero merging block candidate to a merging block candidate list is ended when the total number of merging block candidates reaches a maximum number of merging block candidates is not limiting. For example, the determination in Step S131 in FIG. 14 as to whether or not the total number of merging block candidates has reached the maximum number of merging block candidates may be omitted, and the merging block candidate calculation unit 114 may add all new zero merging block candidates to the merging block candidate list until it turns out that there is no more new zero merging block candidate. This widens the range of optional merging block candidates for the image coding apparatus 100 so that coding efficiency can be increased.

Such a modification of the image coding apparatus according to Embodiment 1 will be specifically described below as an image coding apparatus according to Embodiment 2.

Figure 18:
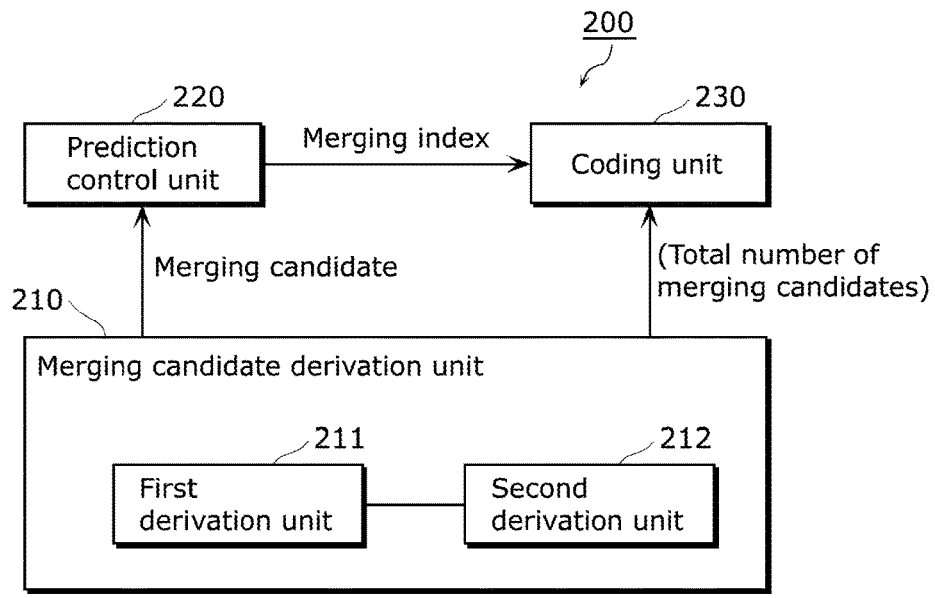
FIG. 18 is a block diagram showing a configuration of an image coding apparatus according to Embodiment 2.

FIG. 18 is a block diagram showing a configuration of an image coding apparatus 200 according to Embodiment 2. The image coding apparatus 200 codes an image on a block-by-block basis to generate a bitstream. The image coding apparatus 200 includes a merging candidate derivation unit 210, a prediction control unit 220, and a coding unit 230.

The merging candidate derivation unit 210 corresponds to the merging block candidate calculation unit 114 in Embodiment 1. The merging candidate derivation unit 210 derives merging candidates. The merging candidate derivation unit 210 generates a merging candidate list in which, for example, indexes each identifying a different derived merging candidate (hereinafter referred to as merging candidate indexes) are associated with the respective derived merging candidates.

The merging candidates are candidates each of which is a combination of a prediction direction, a motion vector, and a reference picture index for use in coding of a current block. Specifically, each of the merging candidates is a combination including at least a set of a prediction direction, a motion vector, and a reference picture index.

The merging candidates correspond to the merging block candidates in Embodiment 1. The merging candidate list is the same as the merging block candidate list.

As shown in FIG. 18, the merging candidate derivation unit 210 includes a first derivation unit 211 and a second derivation unit 212.

The first derivation unit 211 derives first merging candidates based on, for example, a prediction direction, a motion vector, and a reference picture index which have been used for coding a block spatially or temporally neighboring the current block. Then, for example, the first derivation unit 211 registers the first merging candidates derived in this manner in the merging candidate list in association with the respective merging candidate indexes.

The spatially neighboring block is a block which is within a picture including the current block and neighbors the current block. Specifically, the neighboring blocks A to D shown in FIG. 3 are examples of the spatially neighboring block.

The temporally neighboring block is a block which is within a picture different from a picture including the current block and corresponds to the current block. Specifically, a co-located block is an example of the temporally neighboring block.

It should be noted that the temporally neighboring block need not be a block located in the same position as the current block (co-located block). For example, the temporally neighboring block may be a block neighboring the co-located block.

It should be noted that the first derivation unit 211 may derive, as a first merging candidate, a combination of a prediction direction, a motion vector, and a reference picture index which have been used for coding blocks which spatially neighbor the current block except unusable-for-merging blocks. An unusable-for-merging block is a block coded by intra prediction, a block outside the boundary of a slice including the current block or the boundary of a picture including the current block, or a block yet to be coded. With this configuration, the first derivation unit 211 can derive first merging candidates from blocks appropriate for obtaining merging candidates.

The second derivation unit 212 derives, as a second merging candidate, a merging candidate having a motion vector which is a predetermined vector. Specifically, for example, the second derivation unit 212 derives a second merging candidate for each referable reference picture. In this manner, the image coding apparatus 200 can increase the variety of merging candidates, and thereby further increase coding efficiency.

It should be noted that the second derivation unit 212 need not derive a second merging candidate for each referable reference picture. For example, the second derivation unit 212 may derive second merging candidates for a predetermined number of reference pictures.

The predetermined vector may be a zero vector as described in Embodiment 1. With this, the second derivation unit 212 can derive a merging candidate having a motion vector for a stationary region. The image coding apparatus 200 thus can achieve further increased coding efficiency when a current block to be coded is a stationary region. It should be noted that the predetermined vector need not be a zero vector.

Then, for example, the second derivation unit 212 registers second merging candidates derived in this manner in the merging candidate list each in association with a different merging candidate index. At this time, the second derivation unit 212 may register the second merging candidates in the merging candidate list so that the merging candidate indexes assigned to the first merging candidates are smaller than the merging candidate indexes assigned to the second merging candidates as in Embodiment 1. With this, the image coding apparatus 200 can reduce the code amount when the first merging candidates are more likely to be selected as a merging candidate to be used for coding than a second merging candidate so that coding efficiency can be increased.

The prediction control unit 220 selects a merging candidate to be used for coding a current block from the derived first merging candidates and second merging candidates. In other words, the prediction control unit 220 selects a merging candidate to be used for coding a current block from the merging candidate list.

The coding unit 230 attaches an index for identifying the selected merging candidate (merging candidate index) to a bitstream. For example, the coding unit 230 codes a merging candidate index using the sum of the total number of the derived first merging candidates and the total number of the derived second merging candidates (total number of merging candidates), and attaches the coded merging candidate index to a bitstream.

Next, operations of the image coding apparatus 200 in the above-described configuration will be described below.

Figure 19:
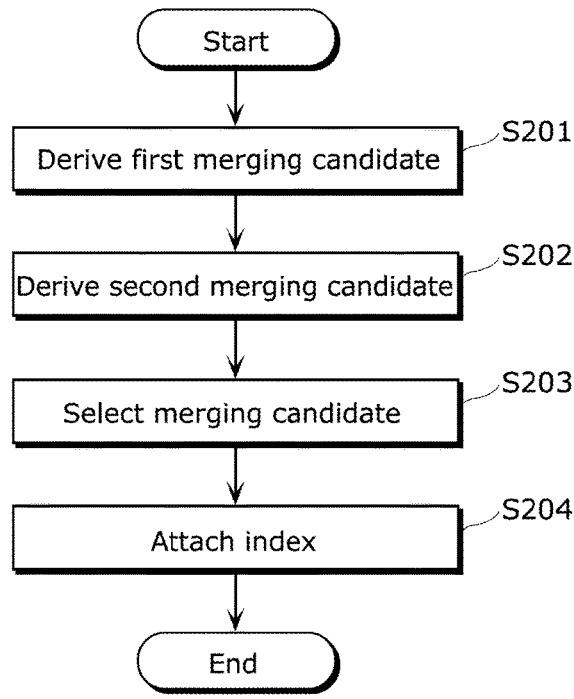
FIG. 19 is a flowchart showing processing operations of the image coding apparatus according to Embodiment 2.

FIG. 19 is a flowchart showing processing operations of the image coding apparatus 200 according to Embodiment 2.

First, the first derivation unit 211 derives a first merging candidate (S201). Subsequently, the second derivation unit 212 derives a second merging candidate (S202).

Next, the prediction control unit 220 selects a merging candidate to be used for coding a current block from the first merging candidates and the second merging candidates (S203). For example, the prediction control unit 220 selects a merging candidate for which the cost represented by Equation 1 is a minimum from the merging candidate list as in Embodiment 1.

Finally, the coding unit 230 attaches a coded index for identifying the selected merging candidate to a bitstream (S204).

In this manner, the image coding apparatus 200 according to Embodiment 2 can derive, as a second merging candidate, a merging candidate having a motion vector which is a predetermined vector. It is therefore possible for the image coding apparatus 200 to derive a merging candidate having a motion vector and others for a stationary region as a second merging candidate, for example. In other words, it is possible for the image coding apparatus 200 to efficiently code a current block having a predetermined motion so that coding efficiency can be increased.

Embodiment 3

Figure 20:
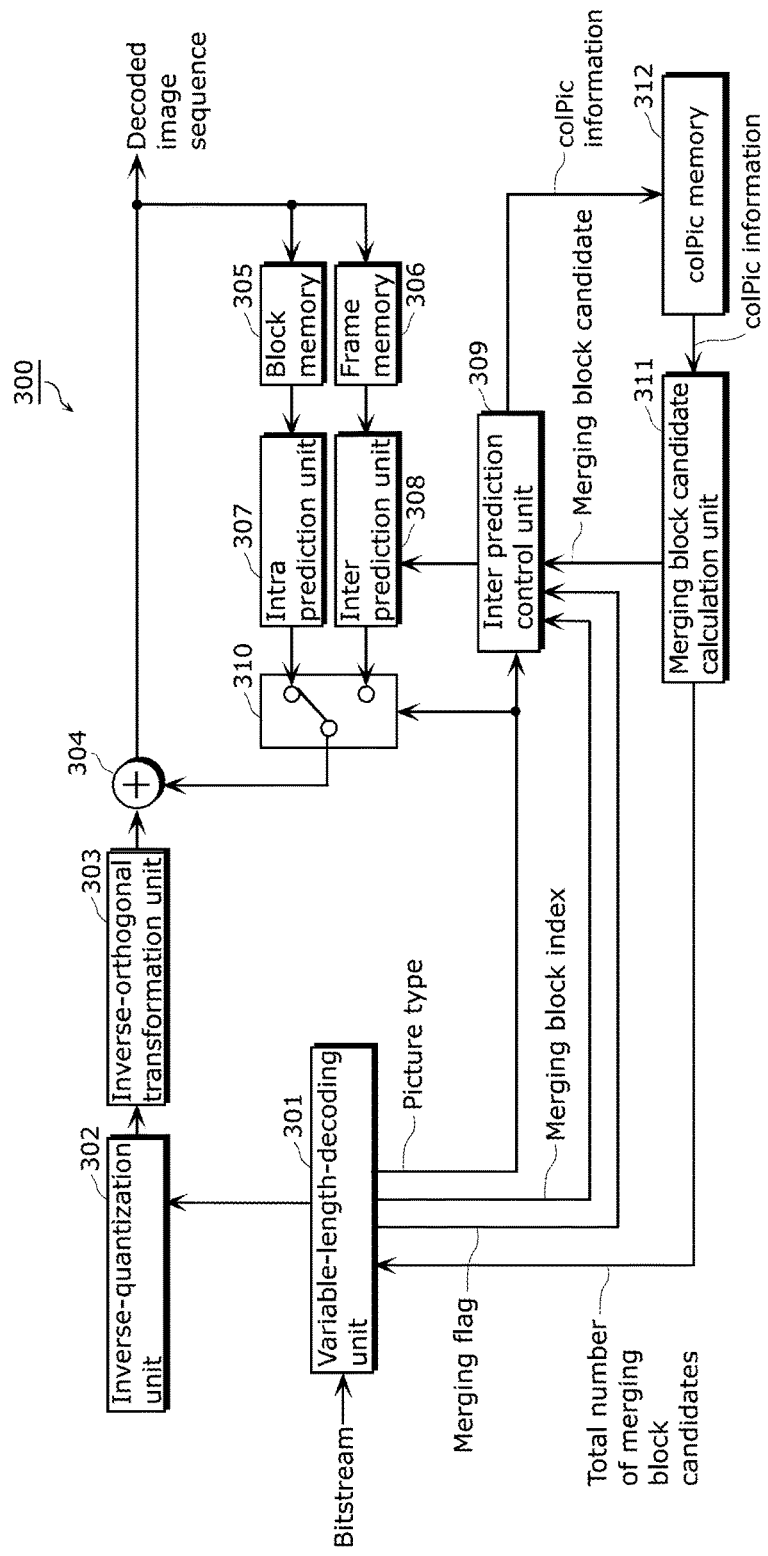
FIG. 20 is a block diagram showing a configuration of an image decoding apparatus according to Embodiment 3.

FIG. 20 is a block diagram showing a configuration of an image decoding apparatus 300 according to Embodiment 3. The image decoding apparatus 300 is an apparatus corresponding to the image coding apparatus 200 according to Embodiment 1. Specifically, for example, the image decoding apparatus 300 decodes, on a block-by-block basis, coded images included in a bitstream generated by the image coding apparatus 100 according to Embodiment 1.

As shown in FIG. 20, the image decoding apparatus 300 includes a variable-length-decoding unit 301, an inverse-quantization unit 302, an inverse-orthogonal-transformation unit 303, an adder 304, block memory 305, frame memory 306, an intra prediction unit 307, an inter prediction unit 308, an inter prediction control unit 309, a switch 310, a merging block candidate calculation unit 311, and colPic memory 312.

The variable-length-decoding unit 301 generates picture-type information, a merging flag, and a quantized coefficient by performing variable-length decoding on an input bitstream.

Furthermore, the variable-length-decoding unit 301 performs variable-length decoding on a merging block candidate index using the total number of merging block candidates calculated by the merging block candidate calculation unit 311.

The inverse-quantization unit 302 inverse-quantizes the quantized coefficient obtained by the variable-length decoding.

The inverse-orthogonal-transformation unit 303 generates prediction error data by transforming an orthogonal transformation coefficient obtained by the inverse quantization from a frequency domain to a picture domain.

The block memory 305 stores, in units of a block, decoded image data generated by adding the prediction error data and prediction picture data.

The frame memory 306 stores decoded image data in units of a frame.

The intra prediction unit 307 generates prediction picture data of a current block to be decoded, by performing intra prediction using the decoded image data stored in the block memory 305 in units of a block.

The Inter prediction unit 308 generates prediction picture data of a current block to be decoded, by performing inter prediction using the decoded image data stored in the frame memory 306 in units of a frame.

When a current block is decoded by intra prediction decoding, the switch 310 outputs intra prediction picture data generated by the intra prediction unit 307 as prediction picture data of the current block to the adder 304. On the other hand, when a current block is decoded by inter prediction decoding, the switch 310 outputs inter prediction picture data generated by the inter prediction unit 308 as prediction picture data of the current block to the adder 304.

The merging block candidate calculation unit 311 derives merging block candidates from motion vectors and others of neighboring blocks of the current block and a motion vector and others of a co-located block (colPic information) stored in the colPic memory 312. Furthermore, the merging block candidate calculation unit 311 adds the derived merging block candidate to a merging block candidate list.

Furthermore, the merging block candidate calculation unit 311 derives, as a zero merging block candidate, a merging block candidate having a prediction direction, a motion vector, and a reference picture index for a stationary region using a method described later. Then, the merging block candidate calculation unit 311 adds the derived zero merging block candidate as a new merging block candidate to the merging block candidate list. Furthermore, the merging block candidate calculation unit 311 calculates the total number of merging block candidates.

Furthermore, the merging block candidate calculation unit 311 assigns merging block candidate indexes each having a different value to the derived merging block candidates. Then, the merging block candidate calculation unit 311 transmits the merging block candidates to which the merging block candidate indexes have been assigned to the inter prediction control unit 309. Furthermore, the merging block candidate calculation unit 311 transmits the calculated total number of merging block candidates to the variable-length-decoding unit 301.

The inter prediction control unit 309 causes the inter prediction unit 308 to generate an inter prediction picture using information on motion vector estimation mode when the merging flag decoded is "0". On the other hand, when the merging flag is "1", the inter prediction control unit 309 determines, based on a decoded merging block candidate index, a motion vector, a reference picture index, and a prediction direction for use in inter prediction from a plurality of merging block candidates. Then, the inter prediction control unit 309 causes the inter prediction unit 308 to generate an inter prediction picture using the determined motion vector, reference picture index, and prediction direction. Furthermore, the inter prediction control unit 309 transfers colPic information including the motion vector of the current block to the colPic memory 312.

Finally, the adder 304 generates decoded image data by adding the prediction picture data and the prediction error data.

Figure 21:
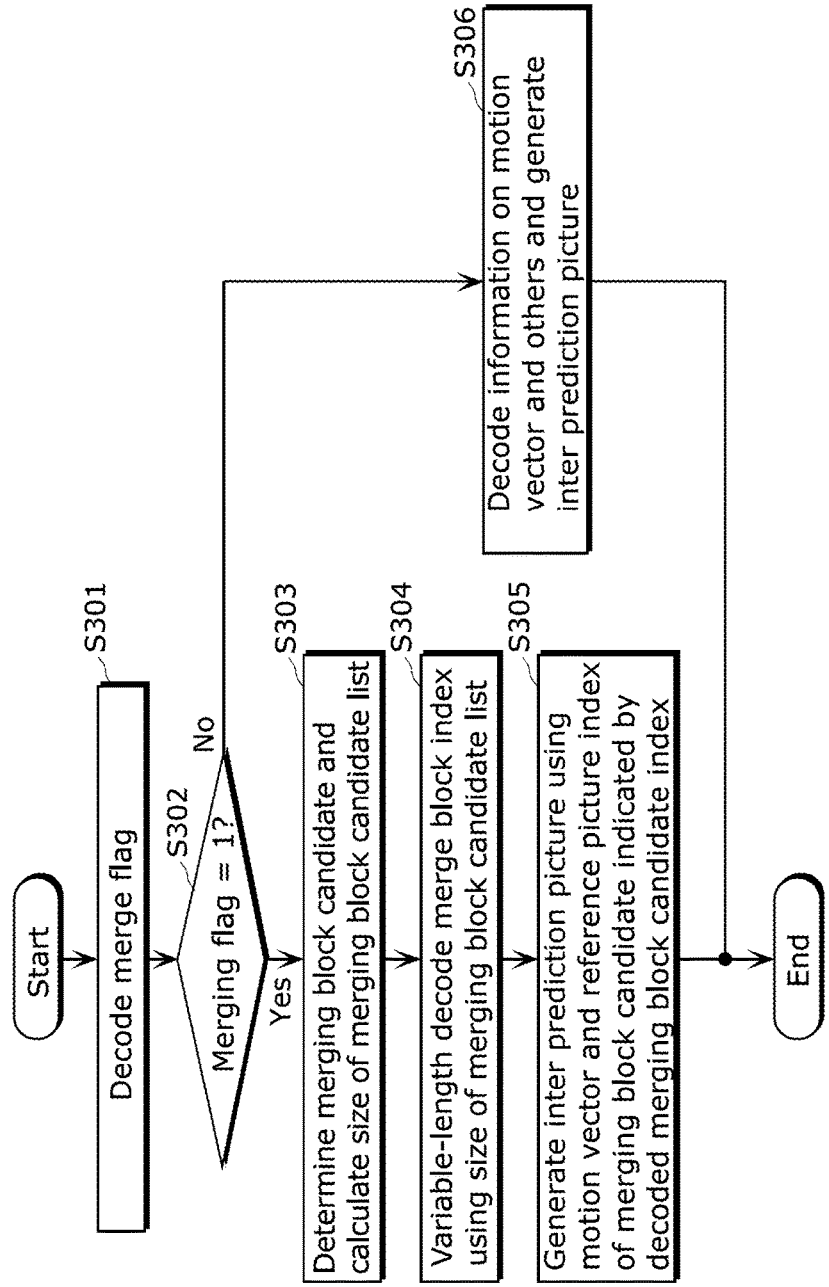
FIG. 21 is a flowchart showing processing operations of the image decoding apparatus according to Embodiment 3.

FIG. 21 is a flowchart showing processing operations of the image decoding apparatus 300 according to Embodiment 3.

In Step S301, the variable-length-decoding unit 301 decodes a merging flag.

In Step S702, when the merging flag is "1" (S302, Yes), in Step S303, the merging block candidate calculation unit 311 generates a merging block candidate in the same manner as in Step S101 in FIG. 10. Furthermore, the merging block candidate calculation unit 311 calculates the total number of merging block candidates as the size of a merging block candidate list.

In Step S304, the variable-length-decoding unit 301 performs variable-length decoding on a merging block candidate index from a bitstream using the size of the merging block candidate list.

In Step S305, the inter prediction control unit 309 causes the inter prediction unit 308 to generate an inter prediction picture using the motion vector, reference picture index, and prediction direction of the merging block candidate indicated by the decoded merging block candidate index.

When the merging flag is "0" in Step S302 (S302, No), in Step S306, the inter prediction unit 308 generates an inter prediction picture using information on motion vector estimation mode decoded by the variable-length-decoding unit 301.

Optionally, when the size of a merging block candidate list calculated in Step S303 is "1", a merging block candidate index may be estimated to be "0" without being decoded.

In this manner, the image coding apparatus 300 according to Embodiment 3 adds, to a merging block candidate list, a new merging block candidate having a motion vector and a reference picture index for a stationary region. The image decoding apparatus 300 thus can appropriately decode a bitstream coded with increased coding efficiency. More specifically, a bitstream coded in merging mode with increased efficiency can be appropriately decoded using a merging block candidate list to which a new merging block candidate which is calculated for each referable reference picture and has a motion vector being a zero-value vector are added, especially in the case where a current block is a stationary region.

Embodiment 4

Although the image decoding apparatus according to Embodiment 3 includes constituent elements as shown in FIG. 20, the image decoding apparatus need not include all of the constituent elements. Such a modification of the image decoding apparatus according to Embodiment 3 will be specifically described below as an image decoding apparatus according to Embodiment 4.

Figure 22:
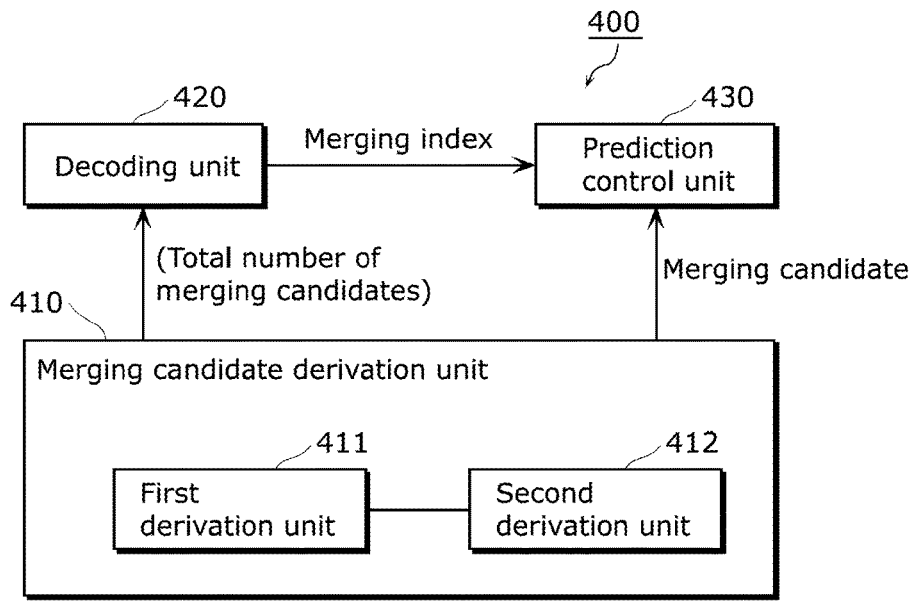
FIG. 22 is a block diagram showing a configuration of an image decoding apparatus according to Embodiment 4.

FIG. 22 is a block diagram showing a configuration of an image decoding apparatus 400 according to Embodiment 4. The image decoding apparatus 400 is an apparatus corresponding to the image coding apparatus 200 according to Embodiment 2. For example, the image decoding apparatus 400 decodes, on a block-by-block basis, coded images included in a bitstream generated by the image coding apparatus 200 according to Embodiment 2.

As shown in FIG. 22, the image decoding apparatus 400 includes a merging candidate derivation unit 410, a decoding unit 420, and a prediction control unit 430.

The merging candidate derivation unit 410 corresponds to the merging block candidate calculation unit 311 in Embodiment 3. The merging candidate derivation unit 410 derives merging candidates.

The merging candidate derivation unit 410 generates a merging candidate list in which, for example, indexes each identifying a different derived merging candidate (merging candidate indexes) are associated with the respective derived merging candidates.

As shown in FIG. 22, the merging candidate derivation unit 410 includes a first derivation unit 411 and a second derivation unit 412.

The first derivation unit 411 derives first merging candidates in the same manner as the first derivation unit 211 in Embodiment 2. Specifically, the first derivation unit 411 derives first merging candidates based on, for example, a prediction direction, a motion vector, and a reference picture index which have been used for decoding a block spatially or temporally neighboring a current block to be decoded. Then, for example, the first derivation unit 411 registers the first merging candidates derived in this manner in the merging candidate list in association with the respective merging candidate indexes.

The second derivation unit 412 derives, as a second merging candidate, a merging candidate having a motion vector which is a predetermined vector. Specifically, the second derivation unit 412 derives a second merging candidate in the same manner as the second derivation unit 212 in Embodiment 2. Then, for example, the second derivation unit 412 registers second merging candidates derived in this manner in the merging candidate list each in association with a different merging candidate index.

More specifically, for example, the second derivation unit 412 derives a second merging candidate for each referable reference picture. The variety of merging candidates is thereby increased, so that a bitstream coded with further increased coding efficiency can be appropriately decoded.

The predetermined vector may be a zero vector as described in Embodiment 1. The second derivation unit 214 thus can derive a merging candidate having a motion vector for a stationary region. With this, the image decoding apparatus 400 can appropriately decode a bitstream coded with increased coding efficiency.

The decoding unit 420 obtains an index for identifying a merging candidate from a bitstream. For example, the decoding unit 420 obtains a merging candidate index by decoding a coded merging candidate index attached to a bitstream using the sum of the total number of the derived first merging candidates and the total number of the derived second merging candidates (total number of merging candidates).

The prediction control unit 430 selects, based on the obtained index, a merging candidate to be used for decoding a current block from the derived first merging candidates and second merging candidates. In other words, the prediction control unit 430 selects a merging candidate to be used for decoding a current block from the merging candidate list.

Next, operations of the image decoding apparatus 400 in the above-described configuration will be explained below.

Figure 23:
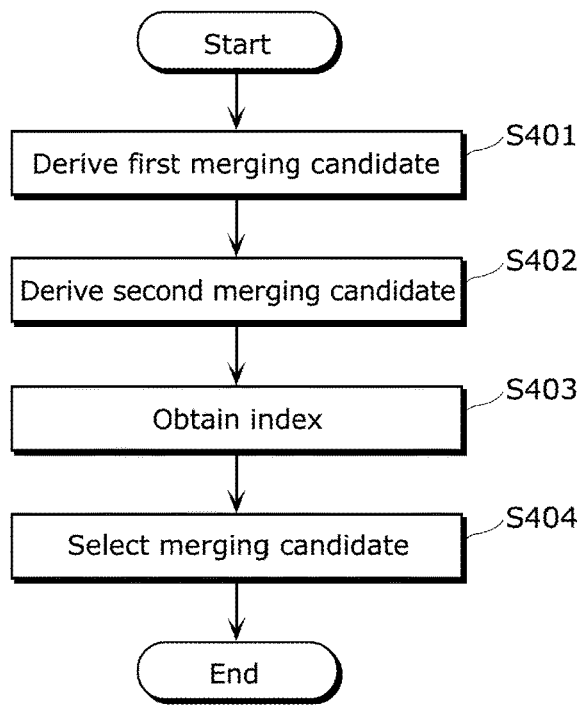
FIG. 23 is a flowchart showing processing operations of the image decoding apparatus according to Embodiment 4.

FIG. 23 is a flowchart showing processing operations of the image decoding apparatus 400 according to Embodiment 4.

First, the first derivation unit 411 derives a first merging candidate (S401). Subsequently, the second derivation unit 412 derives a second merging candidate (S402). Then, the decoding unit 420 obtains a merging candidate index from a bitstream (S403).

Finally, the prediction control unit 430 selects, based on the obtained index, a merging candidate to be used for decoding a current block from the first merging candidates and second merging candidates (S404).

In this manner, the image decoding apparatus 400 according to Embodiment 4 can derive, as a second merging candidate, a merging candidate having a motion vector which is a predetermined vector. It is therefore possible for the image decoding apparatus 400 to derive a merging candidate having a motion vector and others for a stationary region as a second merging candidate, for example. In other words, it is possible for the image decoding apparatus 400 to efficiently decode a current block having a predetermined motion, and thereby appropriately decode a bitstream coded with increased coding efficiency.

Embodiment 5

The merging candidates correspond to the merging block candidates in Embodiment 1. The method of deriving the size of a merging block candidate list according to Embodiment 5 will be described below in detail.

In the merging mode according to Embodiment 1, the total number of merging block candidates is set as the size of a merging block candidate list for use in coding or decoding of a merging block candidate index. The total number of merging block candidates is determined after unusable-for-merging candidates or identical candidates are removed based on information on reference pictures including a co-located block.

A discrepancy in bit sequence assigned to a merging block candidate index is therefore caused between an image coding apparatus and an image decoding apparatus in the case where there is a difference in the total number of merging block candidates between the image coding apparatus and the image decoding apparatus. As a result, the image decoding apparatus cannot decode a bitstream correctly.

For example, when information on a reference picture referenced as a co-located block is lost due to packet loss in a transmission path, the motion vector or the reference picture index of the co-located block becomes unknown. Accordingly, the information on a merging block candidate to be generated from the co-located block becomes unknown. In such a case, it is no longer possible to correctly remove unusable-for-merging candidates or identical candidates from the merging block candidates in decoding. As a result, the image decoding apparatus fails to obtain the correct size of a merging block candidate list, and it is therefore impossible to normally decode a merging block candidate index.

Thus, the image coding apparatus according to Embodiment 5 is capable of calculating the size of a merging block candidate list for use in coding or decoding of a merging block candidate index, using a method independent of information on reference pictures including a co-located block. The image coding apparatus thereby achieves enhanced error resistance.

Figure 24:
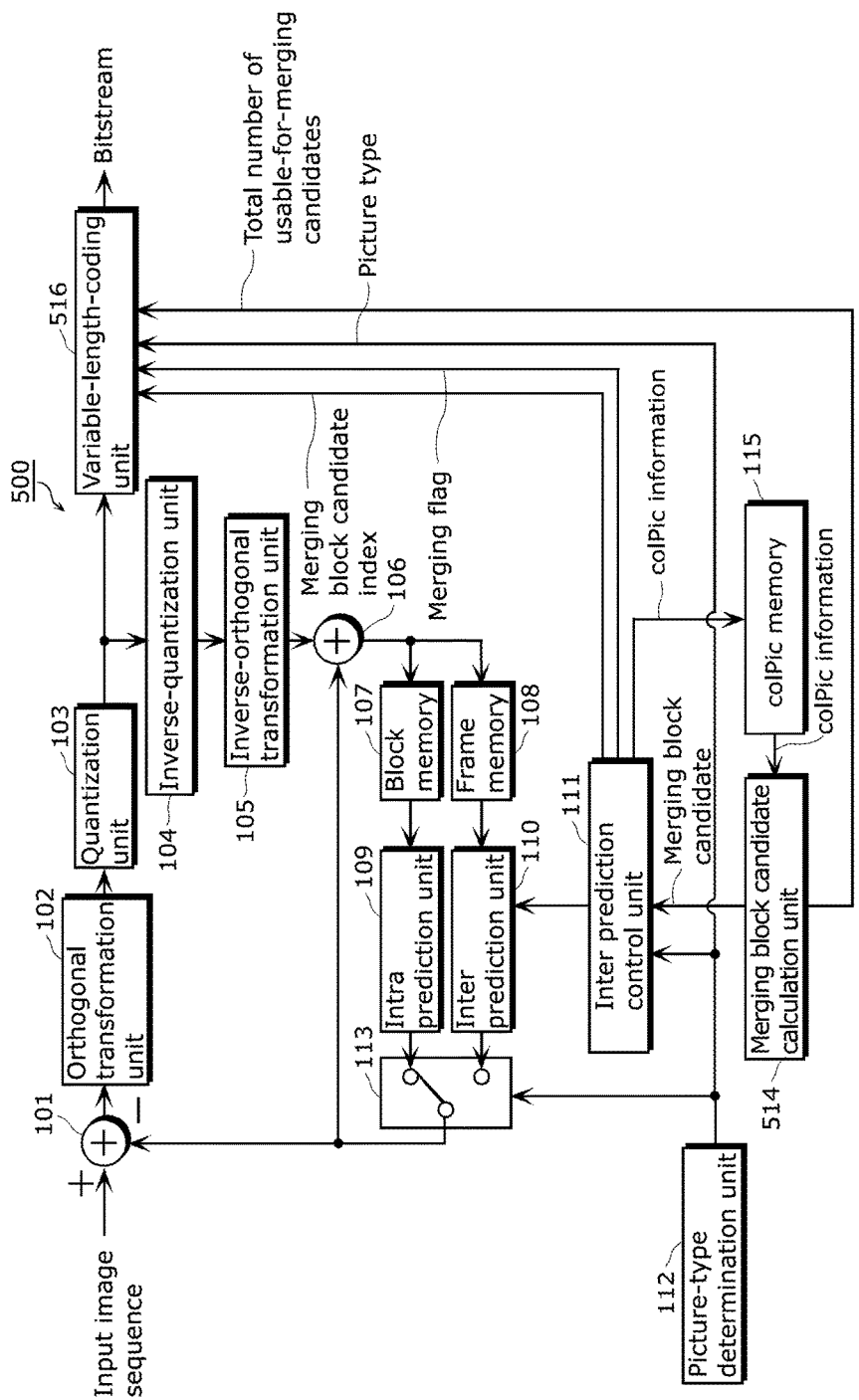
FIG. 24 is a block diagram showing a configuration of an image coding apparatus according to Embodiment 5.

FIG. 24 is a block diagram showing a configuration of an image coding apparatus 500 according to Embodiment 5. For FIG. 24, the constituent elements in common with FIG. 9 are denoted with the same reference signs, and description thereof is omitted.

As shown in FIG. 24, the image coding apparatus 500 includes a subtractor 101, an orthogonal transformation unit 102, a quantization unit 103, an inverse-quantization unit 104, an inverse-orthogonal-transformation unit 105, an adder 106, block memory 107, frame memory 108, an intra prediction unit 109, an inter prediction unit 110, an inter prediction control unit 111, a picture-type determination unit 112, a switch 113, a merging block candidate calculation unit 514, colPic memory 115, and a variable-length-coding unit 516.

The merging block candidate calculation unit 514 derives merging block candidates for merging mode using motion vectors and others of neighboring blocks of the current block and a motion vector and others of the co-located block (colPic information) stored in the colPic memory 115. Then, the merging block candidate calculation unit 514 calculates the total number of usable-for-merging candidates using a method described later.

Furthermore, the merging block candidate calculation unit 514 assigns merging block candidate indexes each having a different value to the derived merging block candidates. Then, the merging block candidate calculation unit 514 transmits the merging block candidates and merging block candidate indexes to the inter prediction control unit 111. Furthermore, the merging block candidate calculation unit 514 transmits the calculated total number of usable-for-merging candidates to the variable-length-coding unit 116.

The variable-length-coding unit 516 generates a bitstream by performing variable-length coding on the quantized prediction error data, the merging flag, and the picture-type information. The variable-length-coding unit 516 also sets the total number of usable-for-merging candidates as the size of the merging block candidate list. Furthermore, the variable-length-coding unit 516 performs variable-length coding on a merging block candidate index to be used for coding, by assigning, according to the size of the merging block candidate list, a bit sequence to the merging block candidate index.

FIG. 25 is a flowchart showing processing operations of the image coding apparatus 500 according to Embodiment 5. For FIG. 25, the steps in common with FIG. 10 are denoted with the same reference signs, and description thereof is omitted as appropriate.

In Step S501, the merging block candidate calculation unit 514 derives merging block candidates from neighboring blocks and a co-located block of a current block. Furthermore, the merging block candidate calculation unit 514 calculates the size of a merging block candidate list using a method described later.

For example, in the case shown in FIG. 3, the merging block candidate calculation unit 514 selects the neighboring blocks A to D as merging block candidates. Furthermore, the merging block candidate calculation unit 514 calculates, as a merging block candidate, a co-located merging block having a motion vector and others which are calculated from the motion vector of a co-located block using the time prediction mode.

The merging block candidate calculation unit 514 assigns merging block candidate indexes to the respective merging block candidates as shown in (a) in FIG. 26. Next, the merging block candidate calculation unit 514 calculates a merging block candidate list as shown in (b) in FIG. 26 and the size of the merging block candidate list by removing unusable-for-merging candidates and identical candidates and adding new candidates using a method described later.

Shorter codes are assigned to merging block candidate indexes of smaller values. In other words, the smaller the value of a merging block candidate index, the smaller the amount of information necessary for indicating the merging block candidate index.

On the other hand, the larger the value of a merging block candidate index, the larger the amount of information necessary for the merging block candidate index. Therefore, coding efficiency will be increased when merging block candidate indexes of smaller values are assigned to merging block candidates which are more likely to have motion vectors of higher accuracy and reference picture indexes of higher accuracy.

Therefore, a possible case is that the merging block candidate calculation unit 514 counts the total number of times of selection of each merging block candidates as a merging block, and assigns merging block candidate indexes of smaller values to blocks with a larger total number of the times. Specifically, this can be achieved by specifying a merging block selected from neighboring blocks and assigning a merging block candidate index of a smaller value to the specified merging block when a current block is coded.

When a merging block candidate does not have information such as a motion vector (for example, when the merging block has been a block coded by intra prediction, it is located outside the boundary of a picture or the boundary of a slice, or it is yet to be coded), the merging block candidate is unusable for coding.

In Embodiment 5, a merging block candidate unusable for coding is referred to as an unusable-for-merging candidate, and a merging block candidate usable for coding is referred to as a usable-for-merging candidate. In addition, among a plurality of merging block candidates, a merging block candidate identical in motion vector, reference picture index, and prediction direction to any other merging block is referred to as an identical candidate.

In the case shown in FIG. 3, the neighboring block C is an unusable-for-merging candidate because it is a block coded by intra prediction. The neighboring block D is an identical candidate because it is identical in motion vector, reference picture index, and prediction direction to the neighboring block A.

In Step S102, the inter prediction control unit 111 selects a prediction mode based on comparison between prediction error of a prediction picture generated using a motion vector derived by motion estimation and prediction error of a prediction picture generated using a motion vector obtained from a merging block candidate. When the selected prediction mode is the merging mode, the inter prediction control unit 111 sets the merging flag to 1, and when not, the inter prediction control unit 111 sets the merging flag to 0.

In Step S103, whether or not the merging flag is 1 (that is, whether or not the selected prediction mode is the merging mode) is determined.

When the result of the determination in Step S103 is true (Yes, S103), the variable-length-coding unit 516 attaches the merging flag to a bitstream in Step S104. Subsequently, in Step S505, the variable-length-coding unit 516 assigns bit sequences according to the size of the merging block candidate list as shown in FIG. 5 to the merging block candidate indexes of merging block candidates to be used for coding. Then, the variable-length-coding unit 516 performs variable-length coding on the assigned bit sequence.

On the other hand, when the result of the determination in Step S103 is false (S103, No), the variable-length-coding unit 516 attaches information on a merging flag and a motion estimation vector mode to a bitstream in Step S106.

In Embodiment 5, a merging block candidate index having a value of "0" is assigned to the neighboring block A as shown in (a) in FIG. 26. A merging block candidate index having a value of "1" is assigned to the neighboring block B. A merging block candidate index having a value of "2" is assigned to the co-located merging block. A merging block candidate index having a value of "3" is assigned to the neighboring block C. A merging block candidate index having a value of "4" is assigned to the neighboring block D.

It should be noted that the merging block candidate indexes having such a value may be assigned otherwise. For example, when a new candidate is added using the method described in Embodiment 1 or a method described later, the variable-length-coding unit 516 may assign smaller values to preexistent merging block candidates and a larger value to the new candidate. In other words, the variable-length-coding unit 516 may assign a merging block candidate index of a smaller value to a preexistent merging block candidate in priority to a new candidate.

Furthermore, merging block candidates are not limited to the blocks at the positions of the neighboring blocks A, B, C, and D. For example, a neighboring block located above the lower left neighboring block D can be used as a merging block candidate. Furthermore, it is not necessary to use all the neighboring blocks as merging block candidates. For example, it is also possible to use only the neighboring blocks A and B as merging block candidates.

Furthermore, although the variable-length-coding unit 516 attaches a merging block candidate index to a bitstream in Step S505 in FIG. 25 in Embodiment 5, attaching such a merging block candidate index to a bitstream is not always necessary. For example, the variable-length-coding unit 116 need not attach a merging block candidate index to a bitstream when the size of the merging block candidate list is "1". The amount of information on the merging block candidate index is thereby reduced.

Figure 27:
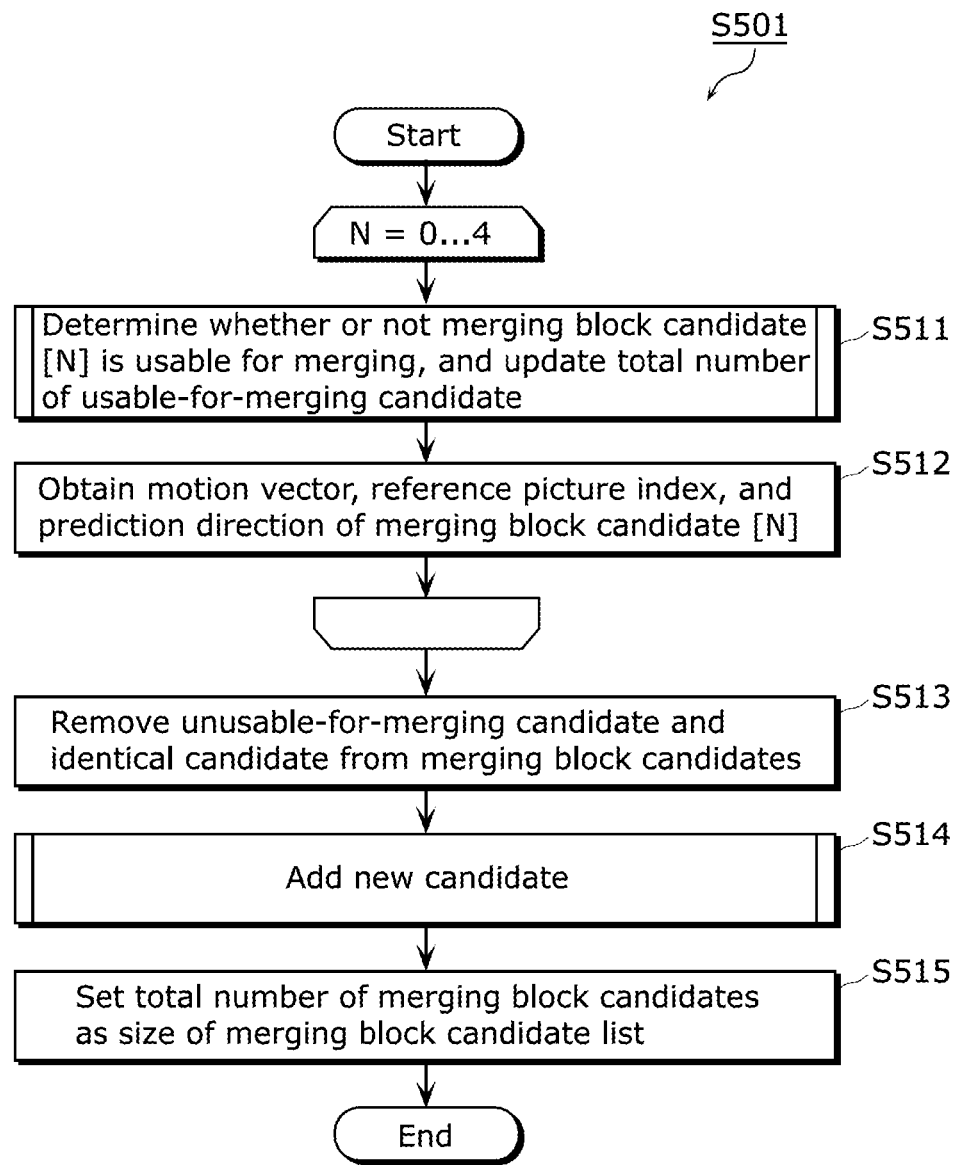
FIG. 27 is a flowchart illustrating a process for calculating merging block candidates and the size of a merging block candidate list according to Embodiment 5.

FIG. 27 is a flowchart showing details of the process in Step S501 in FIG. 25. Specifically, FIG. 27 illustrates a method of calculating merging block candidates and the size of a merging block candidate list. FIG. 27 will be described below.

In Step S511, the merging block candidate calculation unit 514 determines whether or not a merging block candidate [N] is a usable-for-merging candidate using a method described later. Then, the merging block candidate calculation unit 514 updates the total number of usable-for-merging candidates according to the result of the determination.

Here, N denotes an index value for identifying each merging block candidate. In Embodiment 5, N takes values from 0 to 4. Specifically, the neighboring block A in FIG. 3 is assigned to a merging block candidate [0]. The neighboring block B in FIG. 3 is assigned to a merging block candidate [1]. The co-located merging block is assigned to a merging block candidate [2]. The neighboring block C in FIG. 3 is assigned to a merging block candidate [3]. The neighboring block D in FIG. 5 is assigned to a merging block candidate [4].

In Step S512, the merging block candidate calculation unit 514 obtains the motion vector, reference picture index, and prediction direction of the merging block candidate [N], and adds them to a merging block candidate list.

In Step S513, the merging block candidate calculation unit 514 searches the merging block candidate list for an unusable-for-merging candidate and an identical candidate, and removes the unusable-for-merging candidate and the identical candidate from the merging block candidate list as shown in FIG. 26.

In Step S514, the merging block candidate calculation unit 514 adds a new candidate to the merging block candidate list using a method described in Embodiment 1 or a method described later. Here, when a new candidate is added, the merging block candidate calculation unit 514 may reassign merging block candidate indexes so that the merging block candidate indexes of smaller values are assigned to preexistent merging block candidates in priority to the new candidate. In other words, the merging block candidate calculation unit 514 may reassign the merging block candidate indexes so that a merging block candidate index of a larger value is assigned to the new candidate. The amount of code of merging block candidate indexes is thereby reduced.

In Step S515, the merging block candidate calculation unit 514 sets the total number of usable-for-merging candidates calculated in Step S511 as the size of the merging block candidate list. In the example shown in FIG. 26, the calculated number of usable-for-merging candidates is "4", and the size of the merging block candidate list is set at "4".

The new candidate in Step S514 is a candidate newly added to merging block candidates using the method described in Embodiment 1 or a method described later when the total number of merging block candidates is smaller than the total number of usable-for-merging candidates. The new candidate may be a merging block candidate having a motion vector which is a predetermined vector (for example, a zero vector). Examples of such a new candidate include a neighboring block located above the lower-left neighboring block D in FIG. 3, a block corresponding to any of neighboring blocks A, B, C, and D of a co-located block.

Furthermore, examples of such a new candidate further include a block having a motion vector, a reference picture index, a prediction direction, and the like which are statistically obtained for the whole or a certain region of a reference picture. Thus, when the total number of merging block candidates is smaller than the total number of usable-for-merging candidates, the merging block candidate calculation unit 514 adds a new candidate having a new motion vector, a new reference picture index, and a new prediction direction so that coding efficiency can be increased.

Figure 28:
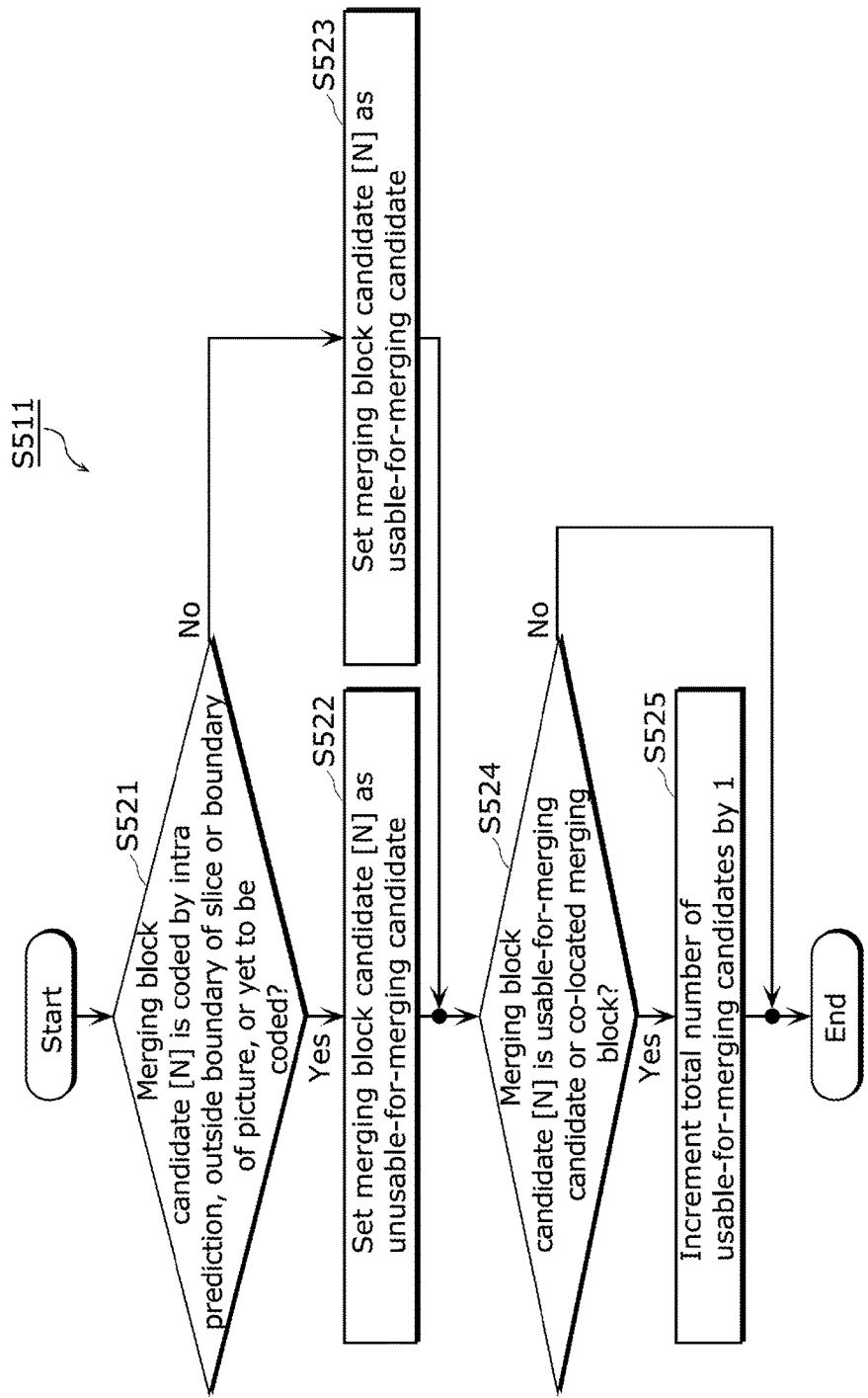
FIG. 28 is a flowchart illustrating a process for updating a total number of usable-for-merging candidates according to Embodiment 5.

FIG. 28 is a flowchart showing details of the process in Step S511 in FIG. 27. Specifically, FIG. 28 illustrates a method of determining whether or not a merging block candidate [N] is a usable-for-merging candidate and updating the total number of usable-for-merging candidates. FIG. 28 will be described below.

In Step S521, the merging block candidate calculation unit 514 determines whether it is true or false that (1) a merging block candidate [N] has been coded by intra prediction, (2) the merging block candidate [N] is a block outside the boundary of a slice including the current block or the boundary of a picture including the current block, or (3) the merging block candidate [N] is yet to be coded.

When the result of the determination in Step 521 is true (S521, Yes), the merging block candidate calculation unit 514 sets the merging block candidate [N] as an unusable-for-merging candidate in Step S522. On the other hand, when the result of the determination in Step S521 is false (S521, No), the merging block candidate calculation unit 514 sets the merging block candidate [N] as a usable-for-merging candidate in Step S523.

In Step S524, the merging block candidate calculation unit 514 determines whether it is true or false that the merging block candidate [N] Is either a usable-for-merging candidate or a co-located merging block candidate. Here, when the result of the determination in Step S524 is true (S524, Yes), the merging block candidate calculation unit 514 updates the total number of merging block candidates by incrementing it by one in Step S525. On the other hand, when the result of the determination in Step S524 is false (S524, No), the merging block candidate calculation unit 514 does not update the total number of usable-for-merging candidates.

Thus, when a merging block candidate is a co-located merging block, the merging block candidate calculation unit 514 increments the total number of usable-for-merging candidate by one regardless of whether the co-located block is a usable-for-merging candidate or an unusable-for-merging candidate. This prevents discrepancy of the numbers of usable-for-merging candidates between the image coding apparatus and the image decoding apparatus even when information on a co-located merging block is lost due to an incident such as packet loss.

The total number of usable-for-merging candidates is set as the size of the merging block candidate list in Step S515 shown in FIG. 27. Furthermore, the size of the merging block candidate list is used in variable-length coding of merging block candidate indexes in Step S505 shown in FIG. 25. This makes it possible for the image coding apparatus 500 to generate a bitstream which can be normally decoded so that merging block candidate indexes can be obtained even when information on reference picture including a co-located block is lost.

Figure 29:
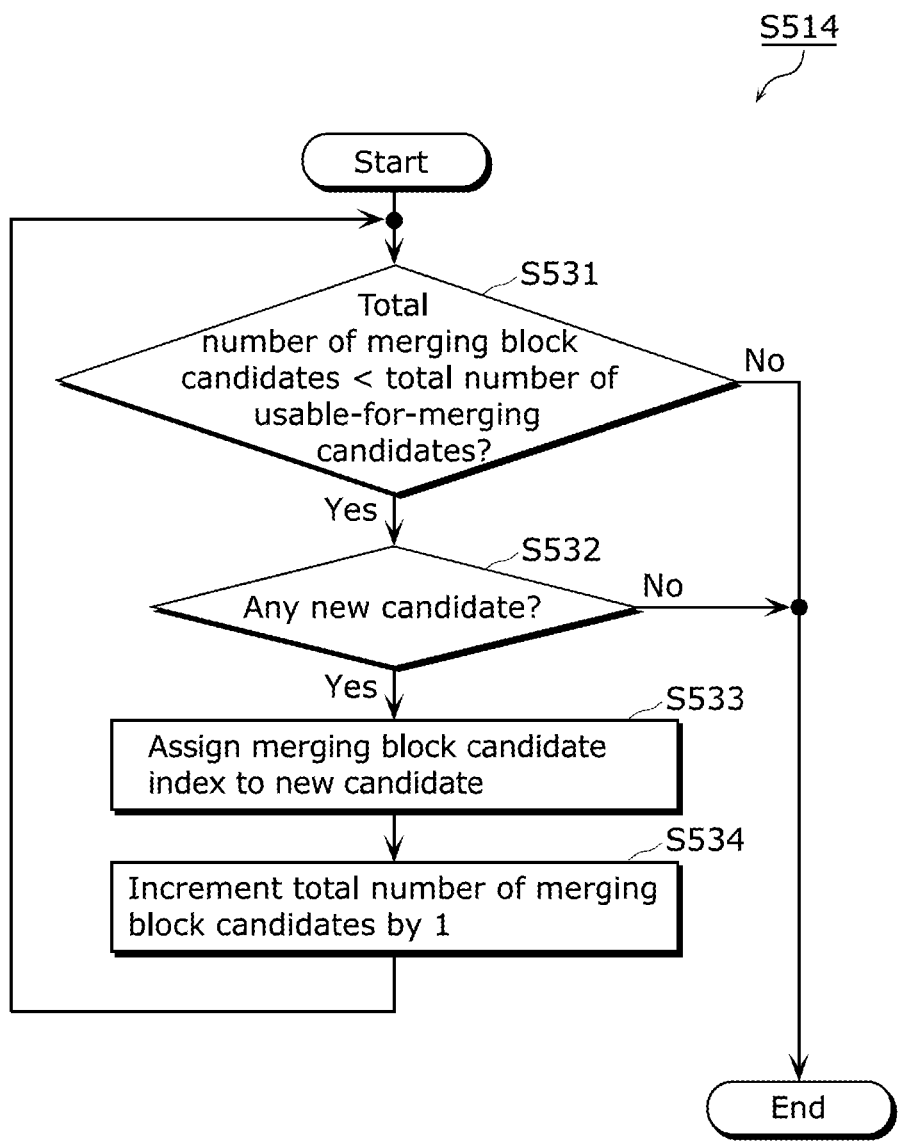
FIG. 29 is a flowchart illustrating a process for adding a new candidate according to Embodiment 5.

FIG. 29 is a flowchart showing details of the process in Step S514 in FIG. 27. Specifically, FIG. 29 illustrates a method of adding a new candidate. FIG. 29 will be described below.

In Step S531, the merging block candidate calculation unit 514 determines whether or not the total number of merging block candidates is smaller than the total number of usable-for-merging candidates. In other words, the merging block candidate calculation unit 514 determines whether or not the total number of merging block candidate is still below the total number of usable-for-merging candidates.

Here, when the result of the determination in Step S531 is true (S531, Yes), in Step S532, the merging block candidate calculation unit 514 determines whether or not there is a new candidate which can be added as a merging block candidate to the merging block candidate list. Here, when the result of the determination in Step S532 is true (S532, Yes), in Step S533, the merging block candidate calculation unit 514 assigns a merging block candidate index to the new candidate and adds the new candidate to the merging block candidate list. Furthermore, the merging block candidate calculation unit 514 increments the total number of merging block candidate by one in Step S534.

On the other hand, when the result of the determination in Step S101 or in Step S532 is false (S531 or S532, No), the process for adding a new candidate ends. In other words, the process for adding a new candidate ends when the total number of merging block candidates numbers the total number of usable-for-merging candidates or when there is no new candidate.

Thus, the image coding apparatus 500 according to Embodiment 5 is capable of calculating the size of a merging block candidate list for use in coding or decoding of a merging block candidate index, using a method independent of information on reference pictures including a co-located block. The image coding apparatus 500 thereby achieves enhanced error resistance.

More specifically, regardless of whether or not a co-located merging block is a usable-for-merging candidate, the image coding apparatus 500 according to Embodiment 5 increments the total number of usable-for-merging candidates by one each time a merging block candidate is determined as a co-located merging block. Then, the image coding apparatus 500 determines a bit sequence to be assigned to a merging block candidate index, using the total number of usable-for-merging candidates calculated in this manner. The image coding apparatus 500 is thus capable of generating a bitstream from which the merging block candidate index can be decoded normally even when information on reference pictures including a co-located block is lost.

Furthermore, when the total number of merging block candidates is smaller than the total number of usable-for-merging candidates, the image coding apparatus 500 according to Embodiment 5 adds, as a merging block candidate, a new candidate having a new motion vector, a new reference picture index, and a new prediction direction so that coding efficiency can be increased.

It should be noted that the example described in Embodiment 5 In which merging flag is always attached to a bitstream in merging mode is not limiting. For example, the merging mode may be forcibly selected depending on a block shape for use in inter prediction of a current block. In this case, it is possible to reduce the amount of information by attaching no merging flag to a bitstream.

It should be noted that the example described in Embodiment 5 where the merging mode is used in which a current block is coded using a prediction direction, a motion vector, and a reference picture index copied from a neighboring block of the current block is not limiting. For example, a skip merging mode may be used. In the skip merging mode, a current block is coded in the same manner as in the merging mode, using a prediction direction, a motion vector, and a reference picture index copied from a neighboring block of the current block with reference to a merging block candidate list created as shown in (b) in FIG. 26. When all resultant prediction errors are zero for the current block, a skip flag set at 1 and the skip flag and a merging block candidate index are attached to a bitstream. When any of the resultant prediction errors is non-zero, a skip flag is set at 0 and the skip flag, a merging flag, a merging block candidate index, and the prediction errors are attached to a bitstream.

It should be noted that the example described in Embodiment 5 where the merging mode is used in which a current block is coded using a prediction direction, a motion vector, and a reference picture index copied from a neighboring block of the current block is not limiting. For example, a motion vector in the motion vector estimation mode may be coded using a merging block candidate list created as shown in (b) in FIG. 26. Specifically, a difference is calculated by subtracting a motion vector of a merging block candidate indicated by a merging block candidate index from a motion vector in the motion vector estimation mode. Furthermore, the calculated difference and the merging block candidate index may be attached to a bitstream.

Optionally, a difference may be calculated by scaling a motion vector MV_Merge of a merging block candidate using a reference picture index RefIdx_ME in the motion estimation mode and a reference picture index RefIdx_Merge of the merging block candidate as represented by Equation 2, and subtracting a motion vector scaledMV_Merge of the merging block candidate after the scaling from the motion vector in the motion estimation mode. Then, the calculated difference and the merging block candidate index may be attached to a bitstream.

Embodiment 6

In Embodiment 5, the image coding apparatus determines a bit sequence to be assigned to a merging block candidate index using the total number of usable-for-merging candidates incremented by one each time a merging block candidate is determined as a co-located merging block, regardless of whether or not a co-located merging block is a usable-for-merging candidate. Optionally, for example, the image coding apparatus may determine a bit sequence to be assigned to a merging block candidate index using the total number of usable-for-merging candidates calculated by incrementing by one for each merging block candidate regardless of whether or not the merging block candidate is a co-located merging block in Step S524 in FIG. 28. In other words, the image coding apparatus may assign a bit sequence to a merging block candidate index using the size of a merging block candidate list fixed at a maximum number N of the total number of merging block candidates. In other words, the image coding apparatus may code merging block candidate indexes using the size of a merging block candidate list fixed at a maximum value N of the total number of merging block candidates on the assumption that the merging block candidates are all usable-for-merging candidates.

For example, in the case shown in Embodiment 5, when the maximum value N of the total number of merging block candidates is five (the neighboring block A, neighboring block B, co-located merging block, neighboring block C, and neighboring block D), the image coding apparatus may code the merging block candidate indexes using the size of the merging block candidate list fixedly set at five. Furthermore, for example, when the maximum value N of the total number of merging block candidates is four (the neighboring block A, neighboring block B, neighboring block C, and neighboring block D), the image coding apparatus may code the merging block candidate indexes using the size of the merging block candidate list fixedly set at four.

In this manner, the image coding apparatus may determine the size of a merging block candidate list based on the maximum value of the total number of merging block candidates. It is therefore possible to generate a bitstream from which a variable-length-decoding unit of an image decoding apparatus can decode a merging block candidate index without referencing information on a neighboring block or on a co-located block, so that computational complexity for the variable-length-decoding unit can be reduced.

Such a modification of the image coding apparatus according to Embodiment 5 will be specifically described below as an image coding apparatus according to Embodiment 6.

Figure 30:
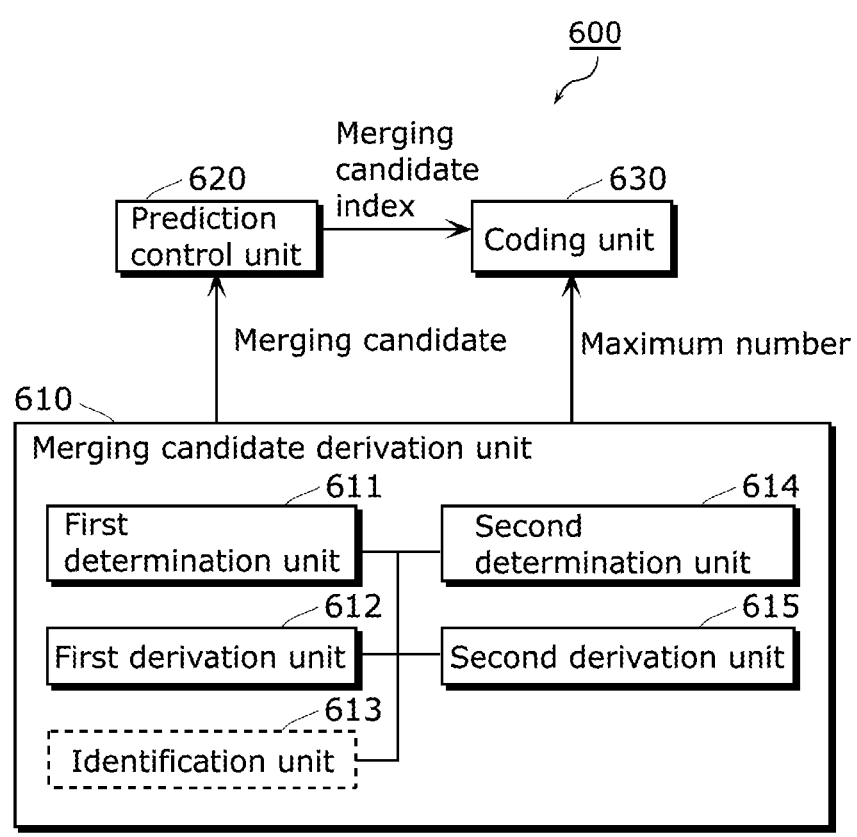
FIG. 30 is a block diagram showing a configuration of an image coding apparatus according to Embodiment 6.

FIG. 30 is a block diagram showing a configuration of an image coding apparatus 600 according to Embodiment 6. The image coding apparatus 600 codes an image on a block-by-block basis to generate a bitstream. The image coding apparatus 600 includes a merging candidate derivation unit 610, a prediction control unit 620, and a coding unit 630.

The merging candidate derivation unit 610 corresponds to the merging block candidate calculation unit 514 in Embodiment 5. The merging candidate derivation unit 610 derives merging candidates.

The merging candidate derivation unit 610 generates a merging candidate list in which, for example, indexes each identifying a different derived merging candidate are associated with the respective derived merging candidates.

As shown in FIG. 30, the merging candidate derivation unit 610 includes a first determination unit 611, a first derivation unit 612, a specification unit 613, a second determination unit 614, and a second derivation unit 615.

The first determination unit 611 determines a maximum number of merging candidates. In other words, the first determination unit 611 determines a maximum value N of the total number of merging block candidates.

For example, the first determination unit 611 determines a maximum number of the merging candidates based on characteristics of the input image sequence (such as a sequence, a picture, a slice, or a block). Optionally, for example, the first determination unit 611 may determine a predetermined number as a maximum number of merging candidates.

More specifically, the first derivation unit 612 derives first merging candidates based on, for example, a prediction direction, a motion vector, and a reference picture index which have been used for coding a block spatially or temporally neighboring the current block. Specifically, the first derivation unit 612 derives first merging candidates within a range in which the total number of the first merging candidates does not exceed the maximum number. Then, for example, the first derivation unit 612 registers the first merging candidates derived in this manner in the merging candidate list in association with the respective merging candidate indexes.

It should be noted that the first derivation unit 612 may derive, as a first merging candidate, a combination of a prediction direction, a motion vector, and a reference picture index which have been used for coding blocks which spatially neighbor the current block except unusable-for-merging blocks. An unusable-for-merging block is a block coded by intra prediction, a block outside the boundary of a slice including the current block or the boundary of a picture including the current block, or a block yet to be coded. With this configuration, the first derivation unit 612 can derive first merging candidates from blocks appropriate for obtaining merging candidates.

When a plurality of first merging candidates has been derived, the specification unit 613 specifies an identical candidate, that is, a first merging candidate which is a combination of a prediction direction, a motion vector, and a reference picture index identical to a combination of a prediction direction, a motion vector, and a reference picture index of any other of the first merging candidates. Then, the specification unit 613 removes the specified identical candidate from the merging candidate list.

The second determination unit 614 determines whether or not the total number of the first merging candidates is smaller than a determined maximum number. Here, the second determination unit 614 determines whether or not the total number of the first merging candidates except the specified identical first merging candidate is smaller than the determined maximum number.

When it is determined that the total number of the first merging candidates is smaller than the determined maximum number, the second derivation unit 615 derives a second merging candidate having a motion vector which is a predetermined vector. Specifically, the second derivation unit 615 derives second merging candidates within a range in which the sum of the total number of first merging candidates and the total number of the second merging candidates does not exceed the maximum number. Here, the second derivation unit 615 derives second merging candidates within a range in which the sum of the total number of first merging candidates except the identical candidate and the total number of the second merging candidates does not exceed the maximum number.

The predetermined vector may be a zero vector as described in Embodiment 5. It should be noted that the predetermined vector need not be a zero vector.

Then, for example, the second derivation unit 615 registers second merging candidates derived in this manner in the merging candidate list each in association with a different merging candidate index. At this time, the second derivation unit 615 may register the second merging candidates in the merging candidate list so that the merging candidate indexes assigned to the first merging candidates are smaller than the merging candidate indexes assigned to the second merging candidates. With this, the image coding apparatus 600 can reduce the code amount when the first merging candidates are more likely to be selected as a merging candidate to be used for coding than a second merging candidate so that coding efficiency can be increased.

It should be noted that the second derivation unit 615 need not derive a second merging candidate so that the sum of the total number of the first merging candidates and the total number of the second merging candidate equals a determined maximum number.

When the sum of the total number of the first merging candidates and the total number of the second merging candidate is smaller than the determined maximum number, for example, there may be a merging candidate index with which no merging candidate is associated.

The prediction control unit 620 selects a merging candidate to be used for coding a current block from the first merging candidates and the second merging candidates. In other words, the prediction control unit 620 selects a merging candidate to be used for coding a current block from the merging candidate list.

The coding unit 630 codes the index for identifying the selected merging candidate (merging candidate index) using the determined maximum number. Specifically, the coding unit 630 performs variable-length coding on a bit sequence assigned to the index value of the selected merging candidate as shown in FIG. 5.

Furthermore, the coding unit 630 attaches the coded index to a bitstream.

Here, the coding unit 630 may further attach information indicating the maximum number determined by the first determination unit 611 to the bitstream. Specifically, for example, the coding unit 630 may write the information indicating the maximum number in a slice header. This makes it possible to change maximum numbers by the appropriate unit so that coding efficiency can be increased.

The coding unit 630 need not attach a maximum number to a bitstream. For example, when the maximum number is specified in a standard, or when the maximum number is the same as a default value, the coding unit 630 need not attach information indicating the maximum number to a bitstream.

Next, operations of the image coding apparatus 600 in the above-described configuration will be described below.

Figure 31:
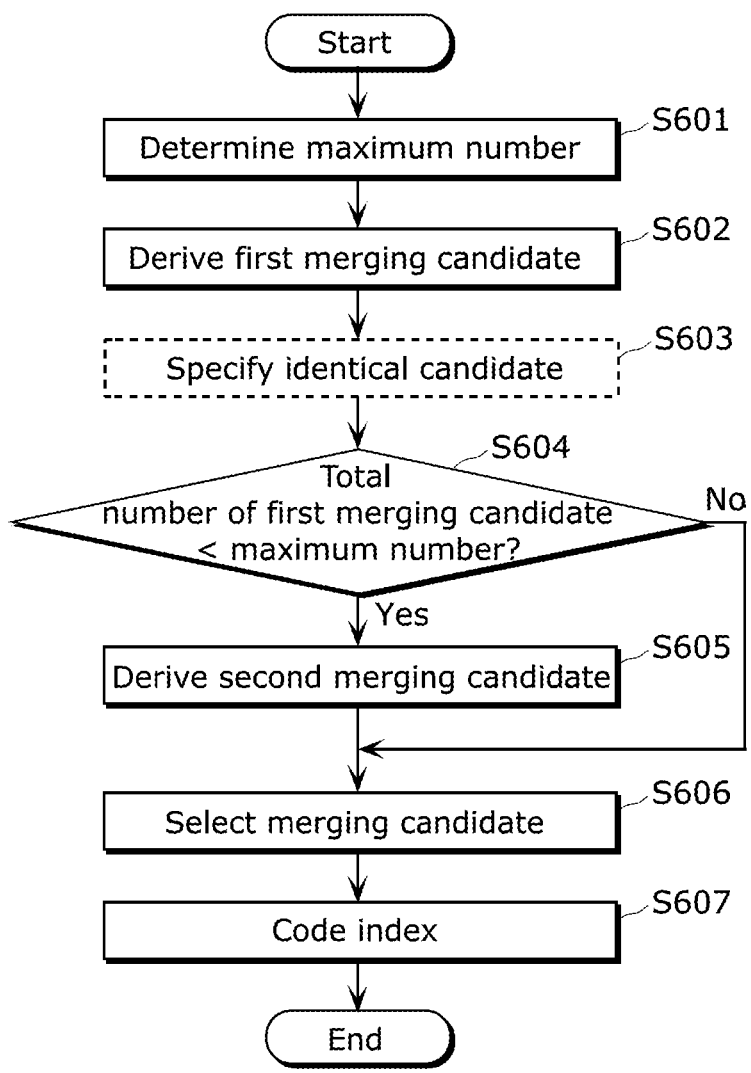
FIG. 31 is a flowchart showing processing operations of the image coding apparatus according to Embodiment 6.

FIG. 31 is a flowchart showing processing operations of the image coding apparatus 600 according to Embodiment 6.

First, the first determination unit 611 determines a maximum number of merging candidates (S601). The first derivation unit 612 derives a first merging candidate (S602). When a plurality of first merging candidates has been derived, the specification unit 613 specifies a first merging candidate which is an identical candidate, that is, a combination of a prediction direction, a motion vector, and a reference picture index identical to a combination of a prediction direction, a motion vector, and a reference picture index of any other of the first merging candidates (S603).

The second determination unit 614 determines whether or not the total number of the first merging candidates except the identical candidate is smaller than the determined maximum number (S604). Here, when it is determined that the total number of the first merging candidates except the identical candidate is smaller than the determined maximum number (S604, Yes), the second derivation unit 615 derives, as a second merging candidate, a merging candidate having a motion vector which is a predetermined vector (S605). On the other hand, when it is determined that the total number of the first merging candidates except the identical candidate is not smaller than the determined maximum number (S604, No), the second derivation unit 415 derives no second merging candidate. These Step S604 and Step S605 correspond to Step S514 in Embodiment 5.

The prediction control unit 620 selects a merging candidate to be used for coding a current block from the first merging candidates and the second merging candidates (S606). For example, the prediction control unit 620 selects a merging candidate for which the cost represented by Equation 1 is a minimum from the merging candidate list as in Embodiment 1.

The coding unit 630 codes an index for identifying the selected merging candidate, using the determined maximum number (S607).

Furthermore, the coding unit 630 attaches the coded index to a bitstream.

In this manner, the image coding apparatus 600 according to Embodiment 6 can derive, as a second merging candidate, a merging candidate having a motion vector which is a predetermined vector. It is therefore possible for the image coding apparatus 600 to derive a merging candidate having a motion vector and others for a stationary region as a second merging candidate, for example. In other words, it is possible for the image coding apparatus 600 to efficiently code a current block having a predetermined motion, so that a coding efficiency can be increased.

Furthermore, the image coding apparatus 600 according to Embodiment 6 can code an index for identifying a merging candidate using a determined maximum number. In other words, an index can be coded independently of the total number of actually derived merging candidates. Therefore, even when information necessary for derivation of a merging candidate (for example, information on a co-located block) is lost, an index can be still decoded and error resistance is thereby enhanced. Furthermore, an index can be decoded independently of the total number of actually derived merging candidates. In other words, an index can be decoded without waiting for derivation of merging candidates. In other words, a bitstream can be generated for which deriving of merging candidates and decoding of indexes can be performed in parallel.

Furthermore, with the image coding apparatus 600 according to Embodiment 6, a second merging candidate can be derived when it is determined that the total number of the first merging candidates is smaller than the maximum number. Accordingly, the total number of merging candidates can be increased within a range not exceeding the maximum number so that coding efficiency can be increased.

Furthermore, with the image coding apparatus 600 according to Embodiment 6, a second merging candidate can be derived based on the total number of first merging candidates except identical first merging candidates. As a result, the total number of the second merging candidates can be increased so that the variety of combinations of a prediction direction, a motion vector, and a reference picture index for a selectable merging candidate can be increased. It is therefore possible to further increase coding efficiency.

In Embodiment 6, the specification unit 613 included in the image coding apparatus 600 is not always necessary to the image coding apparatus 600. In other words, Step S603 in the flowchart shown in FIG. 31 is not always necessary. Even in such a case, the image coding apparatus 600 can code an index for identifying a merging candidate using a determined maximum number so that error resistance can be enhanced.

Furthermore, in Embodiment 6, although the specification unit 613 specifies an identical candidate after the first derivation unit 612 derives first merging candidates as shown in FIG. 31, the process need not be performed in this order. For example, the first derivation unit 612 may identify an identical candidate in the process for deriving first merging candidates, and derives the first merging candidates such that the specified identical candidate is excluded from the first merging candidates. In other words, the first derivation unit 612 may derive, as a first merging candidate, a merging candidate which is a combination of a prediction direction, a motion vector, and a reference picture index different from a combination of a prediction direction, a motion vector, and a reference picture index of any first merging candidate previously derived. More specifically, for example, in the case where a merging candidate based on a left neighboring block has already been selected as a first merging candidate, the first derivation unit 612 may derive a merging candidate which is based on an upper neighboring block as a first merging candidate when the merging candidate based on the upper neighboring block is different from the merging candidate which is based on the left neighboring block. In this manner, the first derivation unit 612 can remove, from the first merging candidates, a merging candidate which is a combination of a prediction direction, a motion vector, and a reference picture index identical to a combination of a prediction direction, a motion vector, and a reference picture index of any first merging candidate previously derived. As a result, the image coding apparatus 600 can increase the total number of the second merging candidates, and thereby increase the variety of combinations of a prediction direction, a motion vector, and a reference picture index from which a merging candidate is selected. The first derivation unit 612 thus can further increase coding efficiency.

In Embodiment 6, although deriving of a first merging candidate is followed by the determining whether or not the total number of the first merging candidate is smaller than a maximum number, and then by deriving of a second merging candidate, the process is not necessarily performed in this order. For example, first, the image coding apparatus 600 may derive a second merging candidate, and then register the derived second merging candidate in a merging candidate list. The image coding apparatus 600 may subsequently derive a first merging candidate, and overwrite the second merging candidate registered in the merging candidate list with the derived first merging candidate.

Embodiment 7

Embodiment 7 is different in the method of deriving the size of a merging block candidate list from Embodiment 3. The method of deriving the size of a merging block candidate list according to Embodiment 7 will be described below in detail.

Figure 32:
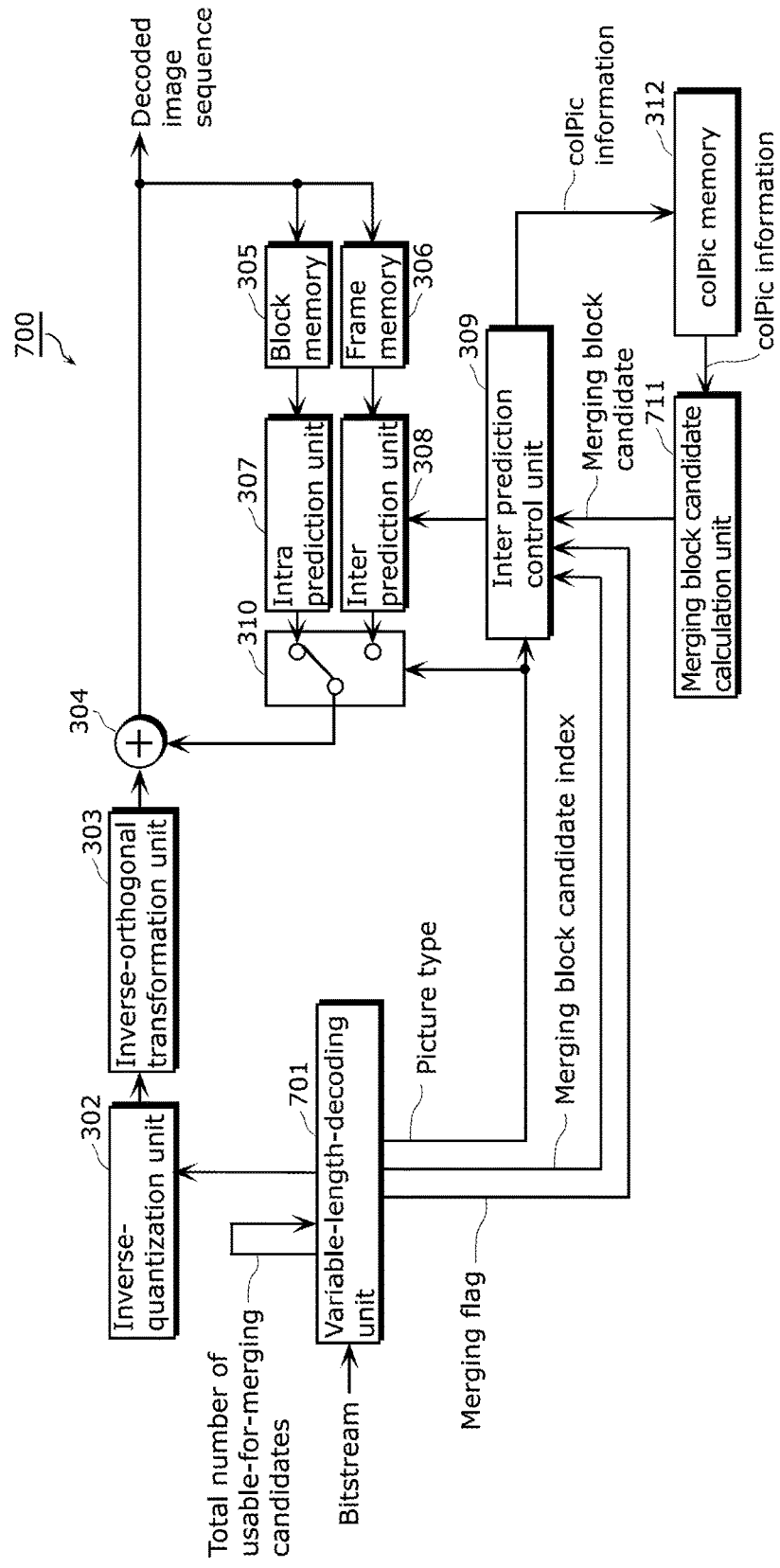
FIG. 32 is a block diagram showing a configuration of an image decoding apparatus according to Embodiment 7.

FIG. 32 is a block diagram showing a configuration of an image decoding apparatus 700 according to Embodiment 7. For FIG. 32, the constituent elements in common with FIG. 20 are denoted with the same reference signs, and description thereof is omitted.

The image decoding apparatus 700 is an apparatus corresponding to the image coding apparatus 500 according to Embodiment 5. Specifically, for example, the image decoding apparatus 700 decodes, on a block-by-block basis, coded images included in a bitstream generated by the image coding apparatus 500 according to Embodiment 5.

As shown in FIG. 32, the image decoding apparatus 700 includes a variable-length-decoding unit 701, an inverse-quantization unit 302, an inverse-orthogonal-transformation unit 303, an adder 304, block memory 305, frame memory 306, an intra prediction unit 307, an inter prediction unit 308, an inter prediction control unit 309, a switch 310, a merging block candidate calculation unit 711, and colPic memory 312.

The variable-length-decoding unit 701 generates picture-type information, a merging flag, and a quantized coefficient by performing variable-length decoding on an input bitstream.

Furthermore, the variable-length-decoding unit 701 obtains a merging block candidate index by performing variable-length decoding using the total number of usable-for-merging candidates described below.

The merging block candidate calculation unit 711 derives merging block candidates for the merging mode from motion vectors and others of neighboring blocks of the current block and a motion vector and others of a co-located block (colPic information) stored in the colPic memory 312, using a method described later.

Furthermore, the merging block candidate calculation unit 711 assigns merging block candidate indexes each having a different value to the derived merging block candidates. Then, the merging block candidate calculation unit 711 transmits the merging block candidates and merging block candidate indexes to the inter prediction control unit 309.

Figure 33:
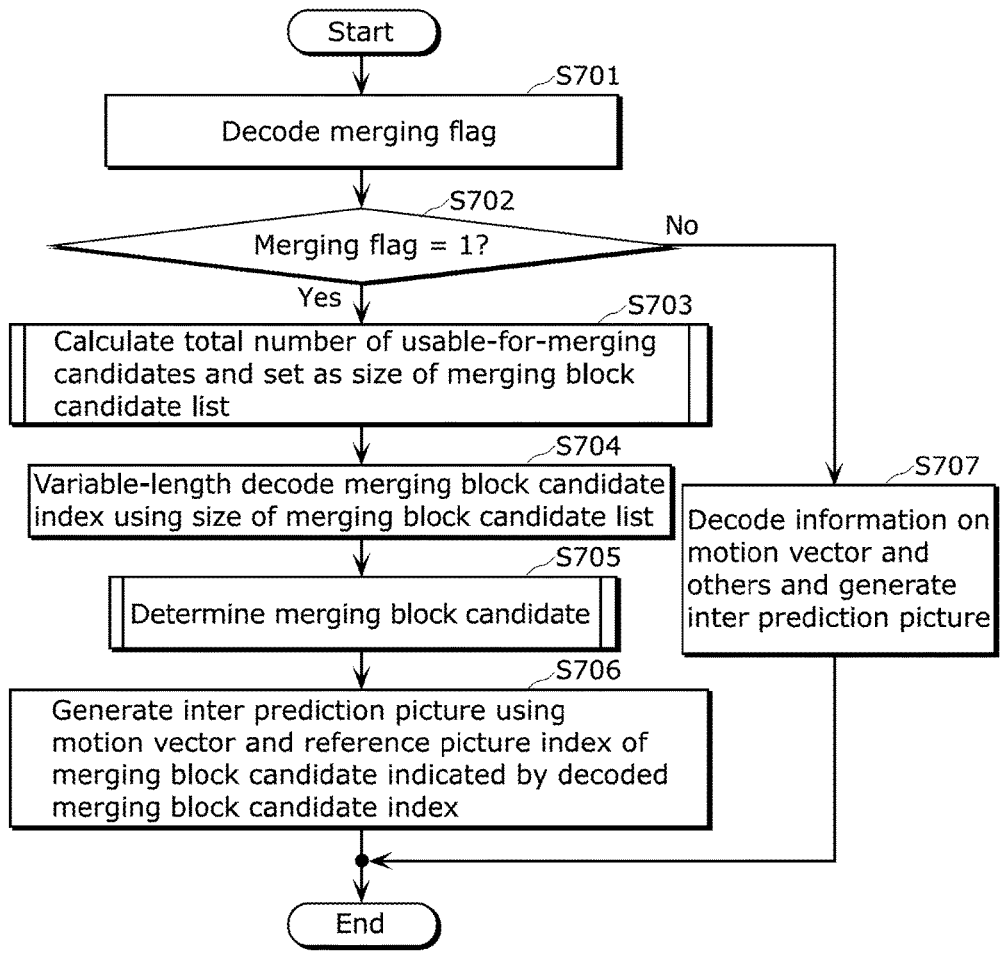
FIG. 33 is a flowchart showing processing operations of the image decoding apparatus according to Embodiment 7.

FIG. 33 is a flowchart showing processing operations of the image decoding apparatus according to Embodiment 7.

In Step S701, the variable-length-decoding unit 701 decodes a merging flag.

In Step S702, when the merging flag is "1" (S702, Yes), in Step S703, the merging block candidate calculation unit 711 calculates the total number of usable-for-merging candidates using a method described later. Then, the merging block candidate calculation unit 711 sets the calculated number of usable-for-merging candidates as the size of a merging block candidate list.

Next, in Step S704, the variable-length-decoding unit 701 performs variable-length decoding on a merging block candidate index from a bitstream using the size of the merging block candidate list. In Step S705, the merging block candidate calculation unit 711 generates merging block candidates from neighboring blocks and a co-located block of a current block to be decoded using the method described in Embodiment 1 or Embodiment 3 or a method described later.

In Step S706, the inter prediction control unit 309 causes the inter prediction unit 308 to generate an inter prediction picture using the motion vector, reference picture index, and prediction direction of the merging block candidate indicated by the decoded merging block candidate index.

When the merging flag is "0" in Step S702 (Step S702, No), in Step S707, the inter prediction unit 308 generates an inter prediction picture using information on motion vector estimation mode decoded by the variable-length-decoding unit 701.

Optionally, when the size of a merging block candidate list calculated in Step S703 is "1", a merging block candidate index may be estimated to be "0" without being decoded.

Figure 34:
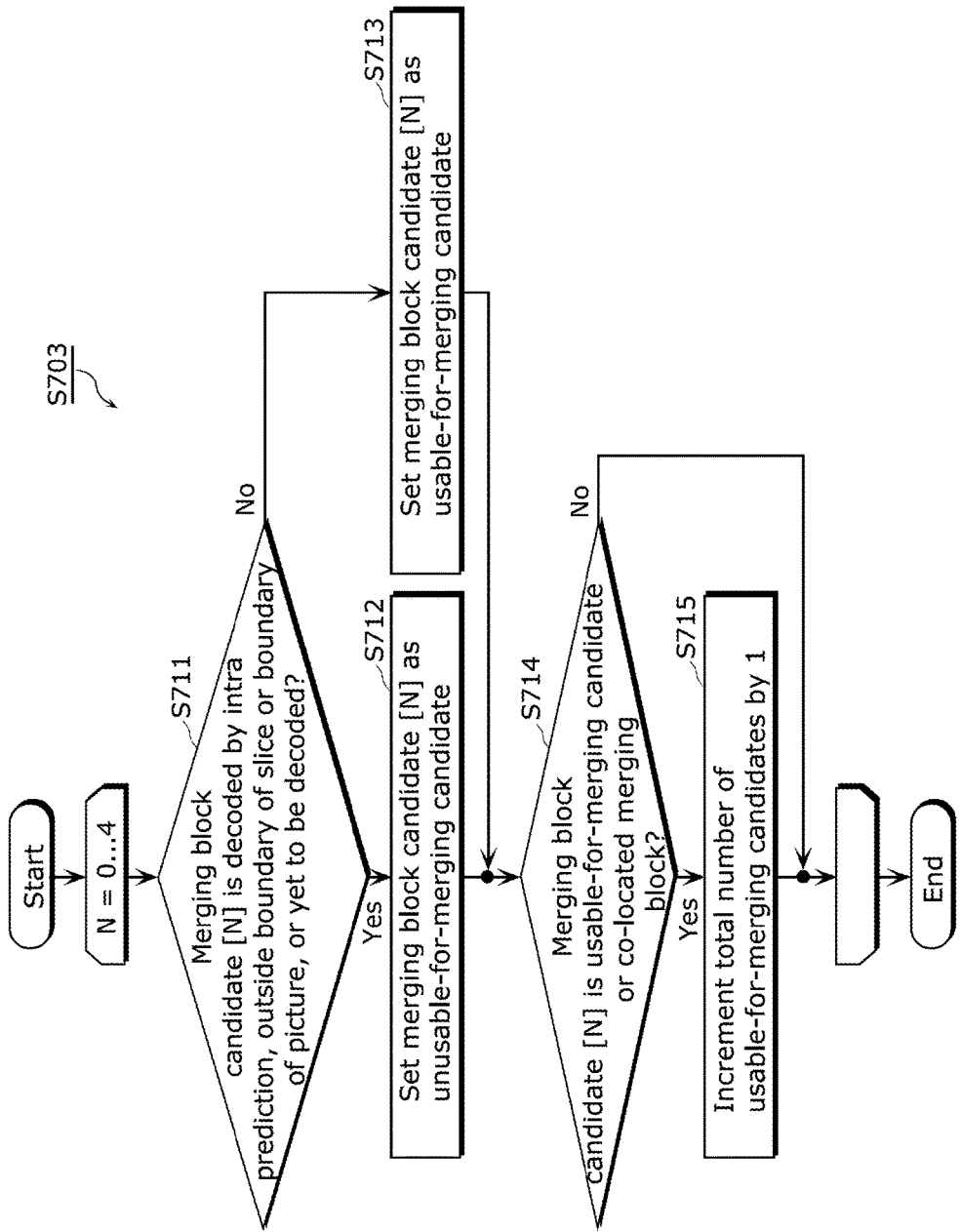
FIG. 34 is a flowchart illustrating a process for setting the size of a merging block candidate list according to Embodiment 7.

FIG. 34 is a flowchart showing details of the process in Step S703 shown in FIG. 33. Specifically, FIG. 34 illustrates a method of determining whether or not a merging block candidate [N] is a usable-for-merging candidate and calculating the total number of usable-for-merging candidates. FIG. 34 will be described below.

In Step S711, the merging block candidate calculation unit 711 determines whether it is true or false that (1) a merging block candidate [N] has been decoded by intra prediction, (2) the merging block candidate [N] is a block outside the boundary of a slice including the current block or the boundary of a picture including the current block, or (3) the merging block candidate [N] is yet to be decoded.

When the result of the determination in Step S711 is true (S711, Yes), the merging block candidate calculation unit 711 sets the merging block candidate [N] as an unusable-for-merging candidate in Step S712. On the other hand, when the result of the determination in Step S711 is false (S711, No), the merging block candidate calculation unit 711 sets the merging block candidate [N] as a usable-for-merging candidate in Step S713.

In Step S714, the merging block candidate calculation unit 711 determines whether it is true or false that the merging block candidate [N] is either a usable-for-merging candidate or a co-located merging block candidate. Here, when the result of the determination in Step S714 is true (S714, Yes), the merging block candidate calculation unit 711 updates the total number of merging block candidates by incrementing it by one in Step S715. On the other hand, when the result of the determination in Step S714 is false (S714, No), the merging block candidate calculation unit 711 does not update the total number of usable-for-merging candidates.

Thus, when a merging block candidate is a co-located merging block, the merging block candidate calculation unit 711 increments the total number of usable-for-merging candidates by one regardless of whether the co-located block is a usable-for-merging candidate or an unusable-for-merging candidate. This prevents discrepancy of the numbers of usable-for-merging candidates between the image coding apparatus and the image decoding apparatus even when information on a co-located merging block is lost due to an incident such as packet loss.

The total number of usable-for-merging candidates is set as the size of a merging block candidate list in Step S703 shown in FIG. 33. Furthermore, the size of the merging block candidate list is used in variable-length decoding of merging block candidate indexes in Step S704 shown in FIG. 33. This makes it possible for the image decoding apparatus 700 to decode merging block candidate indexes normally even when information on reference picture including a co-located block is lost.

Figure 35:
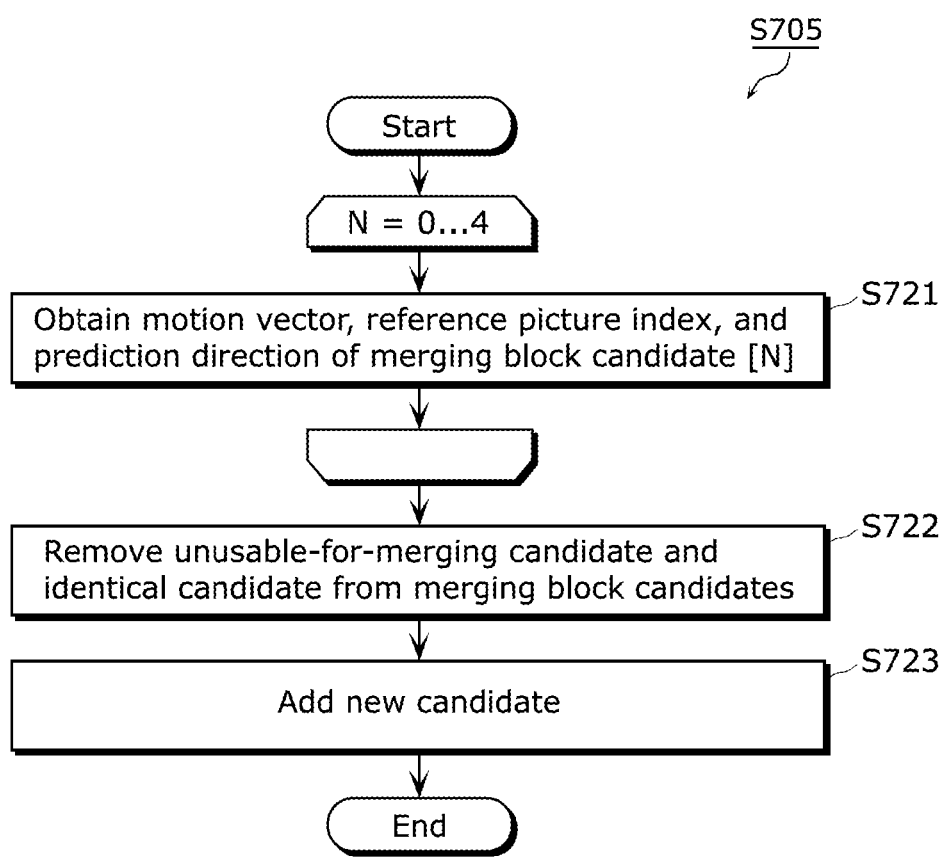
FIG. 35 is a flowchart illustrating a process for calculating a merging block candidate according to Embodiment 7.

FIG. 35 is a flowchart showing details of the process in Step S705 shown in FIG. 33. Specifically, FIG. 35 illustrates a method of calculating a merging block candidate. FIG. 35 will be described below.

In Step S721, the merging block candidate calculation unit 711 obtains the motion vector, reference picture index, and prediction direction of a merging block candidate [N], and adds them to a merging block candidate list.

In Step S722, the merging block candidate calculation unit 711 searches the merging block candidate list for an unusable-for-merging candidate and an identical candidate, and removes the unusable-for-merging candidate and the identical candidate from the merging block candidate list as shown in FIG. 26.

In Step S723, the merging block candidate calculation unit 711 adds a new candidate to the merging block candidate list using the method described in Embodiment 1 or Embodiment 3 or the method as illustrated in FIG. 29.

FIG. 36 shows exemplary syntax for attachment of merging block candidate indexes to a bitstream. In FIG. 36, merge_idx represents a merging block candidate index, and merge_flag represents a merging flag. NumMergeCand represents the size of a merging block candidate list. In Embodiment 7, NumMergeCand is set at the total number of usable-for-merging candidates calculated in the process flow shown in FIG. 34.

Thus, the image decoding apparatus 700 according to Embodiment 7 is capable of calculating the size of a merging block candidate list for use in coding or decoding of a merging block candidate index, using a method independent of information on reference pictures including a co-located block. The image decoding apparatus 700 therefore can appropriately decode a bitstream having enhanced error resistance.

More specifically, regardless of whether or not a co-located merging block is a usable-for-merging candidate, the image decoding apparatus 700 according to Embodiment 7 increments the total number of usable-for-merging candidates by one each time a merging block candidate is determined as a co-located merging block. Then, the image decoding apparatus 700 determines a bit sequence assigned to a merging block candidate index using the total number of usable-for-merging candidates calculated in this manner. The image decoding apparatus 700 thus can decode merging block candidate indexes normally even when information on reference picture including a co-located block is lost.

Furthermore, when the total number of the merging block candidates is smaller than the total number of the usable-for-merging candidates, it is possible for the image decoding apparatus 700 according to Embodiment 7 to appropriately decode a bitstream coded with increased coding efficiency by adding a new candidate having a new motion vector, a new reference picture index, and a new prediction direction.

Eighth Embodiment

In Embodiment 7, the image decoding apparatus determines a bit sequence to be assigned to a merging block candidate index using the total number of usable-for-merging candidates incremented by one each time a merging block candidate is determined as a co-located merging block, regardless of whether or not a co-located merging block is a usable-for-merging candidate. Optionally, for example, the image decoding apparatus may determine a bit sequence to be assigned to a merging block candidate index using the total number of usable-for-merging candidates calculated by incrementing by one for each merging block candidate each merging block candidate regardless of whether or not the merging block candidate is a co-located merging block in Step S714 in FIG. 34. In other words, the image decoding apparatus may assign a bit sequence to a merging block candidate index using the size of a merging block candidate list fixed at a maximum number N of the total number of merging block candidates. In other words, the image decoding apparatus may decode merging block candidate indexes using the size of a merging block candidate list fixed at a maximum value N of the total number of merging block candidates on the assumption that the merging block candidates are all usable-for-merging candidates.

For example, in the case shown in Embodiment 7, when the maximum value N of the total number of merging block candidates is five (the neighboring block A, neighboring block B, co-located merging block, neighboring block C, and neighboring block D), the Image decoding apparatus may decode the merging block candidate indexes using the size of the merging block candidate list fixedly set at five. It is therefore possible for the variable-length-decoding unit of the image decoding apparatus to decode a merging block candidate index from a bitstream without referencing information on a neighboring block or on a co-located block. As a result, for example, Step S714 and Step S715 shown in FIG. 34 can be skipped so that the computational complexity for the variable-length-decoding unit can be reduced.

FIG. 37 shows exemplary syntax in the case where the size of a merging block candidate list is fixed at the maximum value of the total number of merging block candidates. As can be seen in FIG. 37, NumMergeCand can be omitted from the syntax when the size of a merging block candidate list is fixed at a maximum value of the total number of merging block candidates.

Such a modification of the image decoding apparatus according to Embodiment 8 will be specifically described below as an image decoding apparatus according to Embodiment 0.7.

Figure 38:
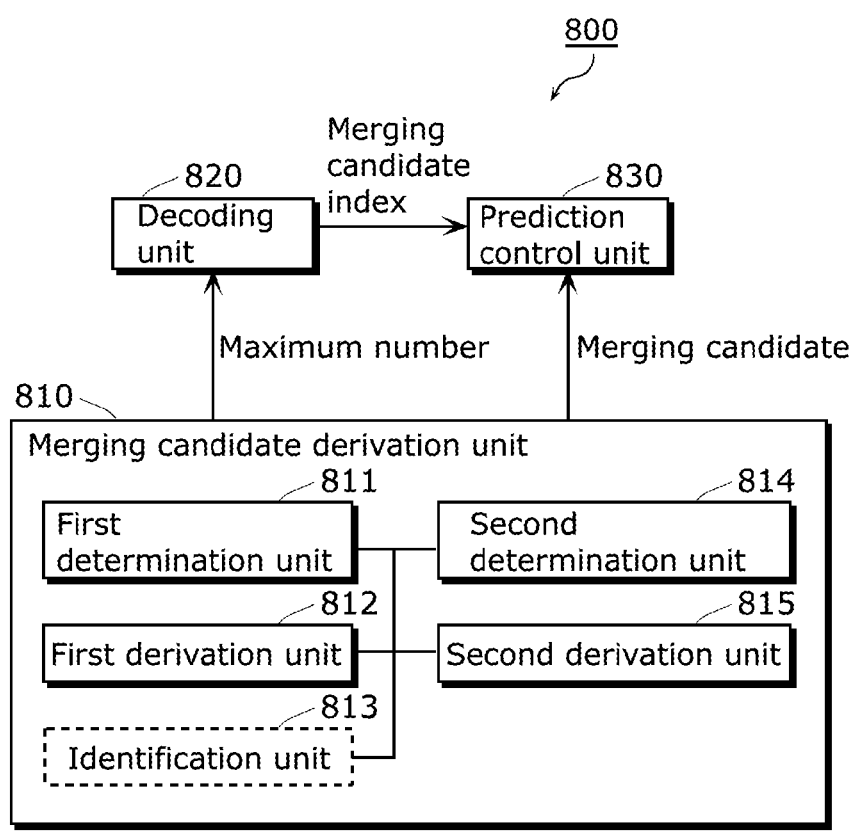
FIG. 38 is a block diagram showing a configuration of an image decoding apparatus according to Embodiment 8.

FIG. 38 is a block diagram showing a configuration of an image decoding apparatus 800 according to Embodiment 8. The image decoding apparatus 800 decodes a coded Image included in a bitstream on a block-by-block basis. Specifically, for example, the image decoding apparatus 800 decodes, on a block-by-block basis, coded images included in a bitstream generated by the Image coding apparatus 600 according to Embodiment 6. The image decoding apparatus 800 includes a merging candidate derivation unit 810, a decoding unit 820, and a prediction control unit 830.

The merging candidate derivation unit 810 corresponds to the merging block candidate calculation unit 711 in Embodiment 7. The merging candidate derivation unit 810 derives merging candidates.

The merging candidate derivation unit 810 generates a merging candidate list in which, for example, indexes each identifying a different derived merging candidate (merging candidate indexes) are associated with the respective derived merging candidates.

As shown in FIG. 38, the merging candidate derivation unit 810 includes a first determination unit 811, a first derivation unit 812, a specification unit 813, a second determination unit 814, and a second derivation unit 815.

The first determination unit 811 determines a maximum number of merging candidates. In other words, the first determination unit 811 determines a maximum value N of the total number of merging block candidates.

For example, the first determination unit 811 may determine a maximum number of the merging candidates using the same method used by the first determination unit 611 in Embodiment 6.

Optionally, for example, the first determination unit 811 may determine a maximum number based on information attached to a bitstream and indicating a maximum number. The image decoding apparatus 800 thus can decode an image coded using maximum numbers changed by the appropriate unit.

Here, although the first determination unit 811 is included in the merging candidate derivation unit 810, the first determination unit 811 may be included in the decoding unit 820.

The first derivation unit 812 derives first merging candidates in the same manner as the first derivation unit 612 in Embodiment 6. Specifically, the first derivation unit 812 derives first merging candidates based on, for example, a prediction direction, a motion vector, and a reference picture index which have been used for decoding a block spatially or temporally neighboring a current block to be decoded. Then, for example, the first derivation unit 812 registers the first merging candidates derived in this manner in the merging candidate list in association with the respective merging candidate indexes.

It should be noted that the first derivation unit 812 may derive, as a first merging candidate, a combination of a prediction direction, a motion vector, and a reference picture index which have been used for decoding blocks which spatially neighbor the current block except unusable-for-merging blocks. With this configuration, the first derivation unit 812 can derive first merging candidates from blocks appropriate for obtaining merging candidates.

When a plurality of first merging candidates has been derived, the specification unit 813 specifies an identical candidate, that is, a first merging candidate which is a combination of a prediction direction, a motion vector, and a reference picture index identical to a combination of a prediction direction, a motion vector, and a reference picture index of any other of the first merging candidates. Then, the specification unit 813 removes the specified identical candidate from the merging candidate list.

The second determination unit 814 determines whether or not the total number of the first merging candidates is smaller than a determined maximum number. Here, the second determination unit 814 determines whether or not the total number of the first merging candidates except the specified identical first merging candidate is smaller than the determined maximum number.

When it is determined that the total number of the first merging candidates is smaller than the determined maximum number, the second derivation unit 815 derives a second merging candidate having a motion vector which is a predetermined vector. Specifically, the second derivation unit 815 derives second merging candidates within a range in which the sum of the total number of first merging candidates and the total number of the second merging candidates does not exceed the maximum number. Here, the second derivation unit 815 derives second merging candidates within a range in which the sum of the total number of first merging candidates except the identical candidate and the total number of the second merging candidates does not exceed the maximum number.

The predetermined vector may be a zero vector as described in Embodiment 7. In this manner, the second derivation unit 815 thus can derive a merging candidate having a motion vector for a stationary region. The image decoding apparatus 800 thus can appropriately decode a bitstream coded with increased coding efficiency. It should be noted that the predetermined vector need not be a zero vector.

Then, for example, the second derivation unit 815 registers second merging candidates derived in this manner in the merging candidate list each in association with a different merging candidate index. At this time, the second derivation unit 815 may register the second merging candidates in the merging candidate list so that the merging candidate indexes assigned to the first merging candidates are smaller than the merging candidate indexes assigned to the second merging candidates. With this, the image decoding apparatus 800 can appropriately decode a bitstream coded with increased coding efficiency.

It should be noted that the second derivation unit 815 need not derive a second merging candidate so that the sum of the total number of the first merging candidates and the total number of the second merging candidate equals a determined maximum number.

When the sum of the total number of the first merging candidates and the total number of the second merging candidate is smaller than the determined maximum number, for example, there may be a merging candidate index with which no merging candidate is associated.

The decoding unit 820 decodes an index coded and attached to a bitstream, which is an index for identifying a merging candidate, using the determined maximum number.

The prediction control unit 830 selects, based on the decoded index, a merging candidate to be used for decoding a current block from the first merging candidates and second merging candidates. In other words, the prediction control unit 830 selects a merging candidate to be used for decoding a current block from the merging candidate list.

Next, operations of the image decoding apparatus 800 in the above-described configuration will be explained below.

Figure 39:
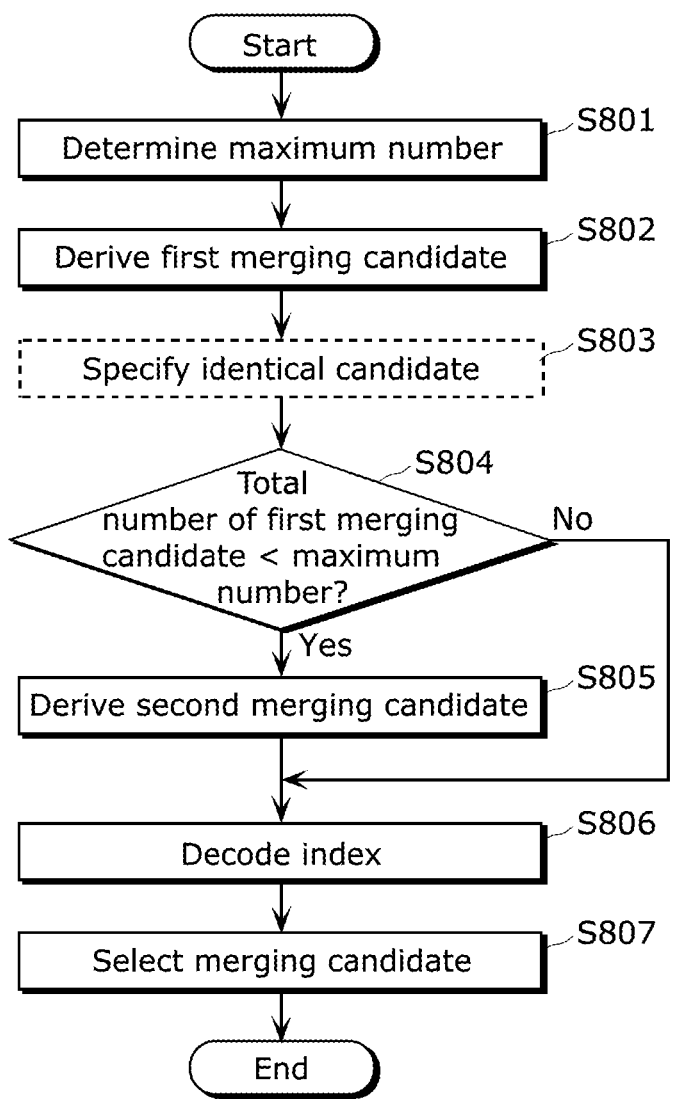
FIG. 39 is a flowchart showing processing operations of the image decoding apparatus according to Embodiment 8.

FIG. 39 is a flowchart showing processing operations of the image decoding apparatus 800 according to Embodiment 8.

First, the first determination unit 811 determines a maximum number of merging candidates (S801). The first derivation unit 812 derives a first merging candidate (S802). When a plurality of first merging candidates has been derived, the specification unit 813 specifies a first merging candidate which is an identical candidate, that is, a combination of a prediction direction, a motion vector, and a reference picture index identical to a combination of a prediction direction, a motion vector, and a reference picture index of any other of the first merging candidates (S803).

The second determination unit 814 determines whether or not the total number of the first merging candidates except the identical candidate is smaller than the determined maximum number (S804). Here, when it is determined that the total number of the first merging candidates except the identical candidate is smaller than the determined maximum number (S804, Yes), the second derivation unit 815 derives second merging candidates (S805). On the other hand, when it is determined that the total number of the first merging candidates except the identical candidate is not smaller than the determined maximum number (S804, No), the second derivation unit 815 derives no second merging candidate.

The decoding unit 820 decodes an index coded and attached to a bitstream, which is an index for identifying a merging candidate, using the determined maximum number (S806).

The prediction control unit 830 selects, based on the decoded index, a merging candidate to be used for decoding a current block from the first merging candidates and second merging candidates (S807). For example, the prediction control unit 830 selects a merging candidate for which the cost represented by Equation 1 is a minimum from the merging candidate list as in Embodiment 1.

Although the process is performed such that the decoding an index (S806) is performed after a merging candidate is derived, the process need not be performed in this order. For example, a merging candidate may be derived (S802 to S805) after decoding an index (S806). Optionally, decoding an index (S806) and deriving of a merging candidate (S802 to S805) may be performed in parallel. This increases processing speed for decoding.

In this manner, the image decoding apparatus 800 according to Embodiment 8 can derive, as a second merging candidate, a merging candidate having a motion vector which is a predetermined vector. It is therefore possible for the image decoding apparatus 800 to derive a merging candidate having a motion vector and others for a stationary region as a second merging candidate, for example. In other words, it is possible for the image decoding apparatus 800 to efficiently decode a current block having a predetermined motion, and thereby appropriately decode a bitstream coded with increased coding efficiency.

Furthermore, the image decoding apparatus 800 according to Embodiment 8 can decode an index for identifying a merging candidate, using a determined maximum number. In other words, an Index can be decoded independently of the total number of actually derived merging candidates. Therefore, even when information necessary for derivation of a merging candidate (for example, information on a co-located block) is lost, the image decoding apparatus 800 still can decode an index, and error resistance is thereby enhanced. Furthermore, the image decoding apparatus 800 can decode an index without waiting for derivation of merging candidates so that deriving of merging candidates and decoding of indexes can be performed in parallel.

Furthermore, the image decoding apparatus 800 according to Embodiment 8 can derive a second merging candidate when it is determined that the total number of the first merging candidates is smaller than a maximum number. Accordingly, the image decoding apparatus 800 can increase the total number of merging candidates within a range not exceeding the maximum number, and appropriately decode a bitstream coded with increased coding efficiency.

Furthermore, the image decoding apparatus 800 according to Embodiment 8 can derive a second merging candidate based on the total number of first merging candidates except identical first merging candidates. As a result, the image decoding apparatus 800 can increase the total number of the second merging candidates, and thereby increase the variety of combinations of a prediction direction, a motion vector, and a reference picture index from which a merging candidate is selected. With this, the image decoding apparatus 800 thus can appropriately decode a bitstream coded with further increased coding efficiency.

As in Embodiment 6, the specification unit 813 included in the image decoding apparatus 800 is not always necessary to the image decoding apparatus 800 in Embodiment 8. In other words, Step S803 in the flowchart shown in FIG. 39 is not always necessary. Even in such a case, the image decoding apparatus 800 can decode an index for identifying a merging candidate using a determined maximum number so that error resistance can be enhanced.

Furthermore, in Embodiment 8, although the specification unit 813 specifies an identical candidate after the first derivation unit 812 derives first merging candidates as shown in FIG. 39, the process need not be performed in this order. For example, the first derivation unit 812 may derive, as a first merging candidate, a merging candidate which is a combination of a prediction direction, a motion vector, and a reference picture index different from a combination of a prediction direction, a motion vector, and a reference picture index of any first merging candidate previously derived. In this manner, the first derivation unit 812 can remove, from the first merging candidates, a merging candidate which is a combination of a prediction direction, a motion vector, and a reference picture index identical to a combination of a prediction direction, a motion vector, and a reference picture index of any first merging candidate previously derived. As a result, the image decoding apparatus 800 can increase the total number of the second merging candidates, and thereby increase the variety of combinations of a prediction direction, a motion vector, and a reference picture index from which a merging candidate is selected. The image decoding apparatus 800 thus can appropriately decode a bitstream coded with further increased coding efficiency.

In Embodiment 8, although deriving of a first merging candidate is followed by the determining whether or not the total number of the first merging candidate is smaller than a maximum number, and then by deriving of a second merging candidate, the process is not necessarily performed in this order. For example, first, the image decoding apparatus 800 may derive a second merging candidate, and then register the derived second merging candidate in a merging candidate list. The image decoding apparatus 800 may subsequently derive a first merging candidate, and overwrite the second merging candidate registered in the merging candidate list with the derived first merging candidate.

Although the image coding apparatus and image decoding apparatus according to one or more aspects of the present disclosure have been described based on the embodiments, the present disclosure is not limited to the embodiments. Those skilled in the art will readily appreciate that many modifications of the exemplary embodiments or embodiments in which the constituent elements of the exemplary embodiments are combined are possible without materially departing from the novel teachings and advantages described in the present disclosure. All such modifications and embodiments are also within scopes of one or more aspects of the present disclosure.

In the exemplary embodiments, each of the constituent elements may be implemented as a piece of dedicated hardware or implemented by executing a software program appropriate for the constituent element. The constituent elements may be implemented by a program execution unit such as a CPU or a processor which reads and executes a software program recorded on a recording medium such as a hard disk or a semiconductor memory. Here, examples of the software program which implements the image coding apparatus or image decoding apparatus in the embodiments include a program as follows.

Specifically, the program causes a computer to execute an image coding method which is a method for coding an image on a block-by-block basis to generate a bitstream and includes: deriving, as a first merging candidate, a merging candidate which is a combination of a prediction direction, a motion vector, and a reference picture index for use in coding of the current block; deriving, as a second merging candidate, a merging candidate having a motion vector which is a predetermined vector; selecting a merging candidate to be used for the coding of the current block from the derived first merging candidate and the derived second merging candidate; and attaching an index for identifying the selected merging candidate to the bitstream.

Furthermore, the program causes a computer to execute an image decoding method which is a method for decoding, on a block-by-block basis, a coded image included in a bitstream and includes: deriving, as a first merging candidate, a merging candidate which is a combination of a prediction direction, a motion vector, and a reference picture index for use in decoding of the current block; deriving, as a second merging candidate, a merging candidate having a motion vector which is a predetermined vector; obtaining, from the bitstream, an index for identifying a merging candidate; and selecting, based on the obtained index, a merging candidate from the first merging candidate and the second merging candidate, the merging candidate being to be used for the decoding of a current block.

Embodiment 9

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 40:
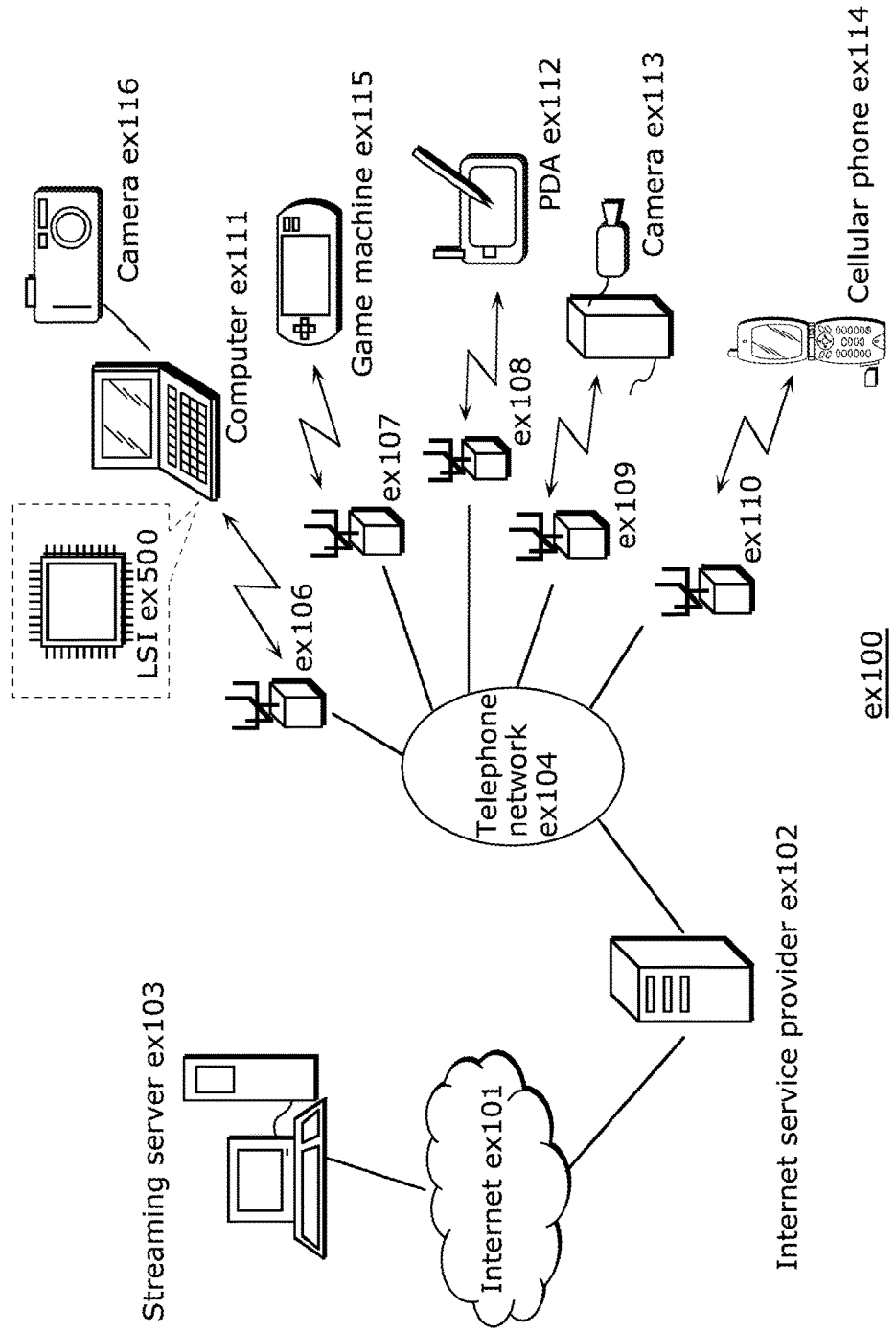
FIG. 40 shows an overall configuration of a content providing system for implementing content distribution services.

FIG. 40 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 40, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 41:
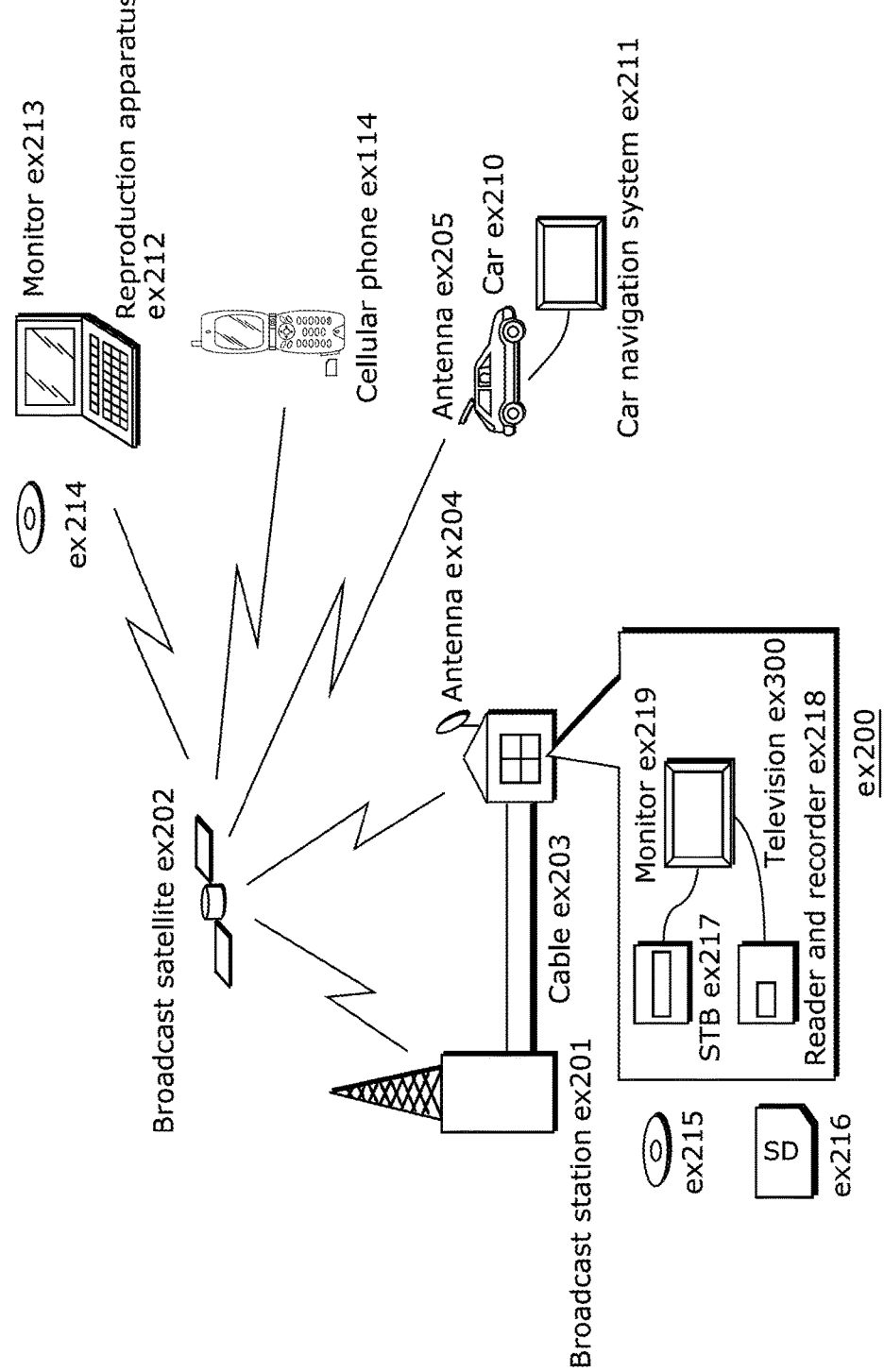
FIG. 41 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 41. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can Include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded.

It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 42:
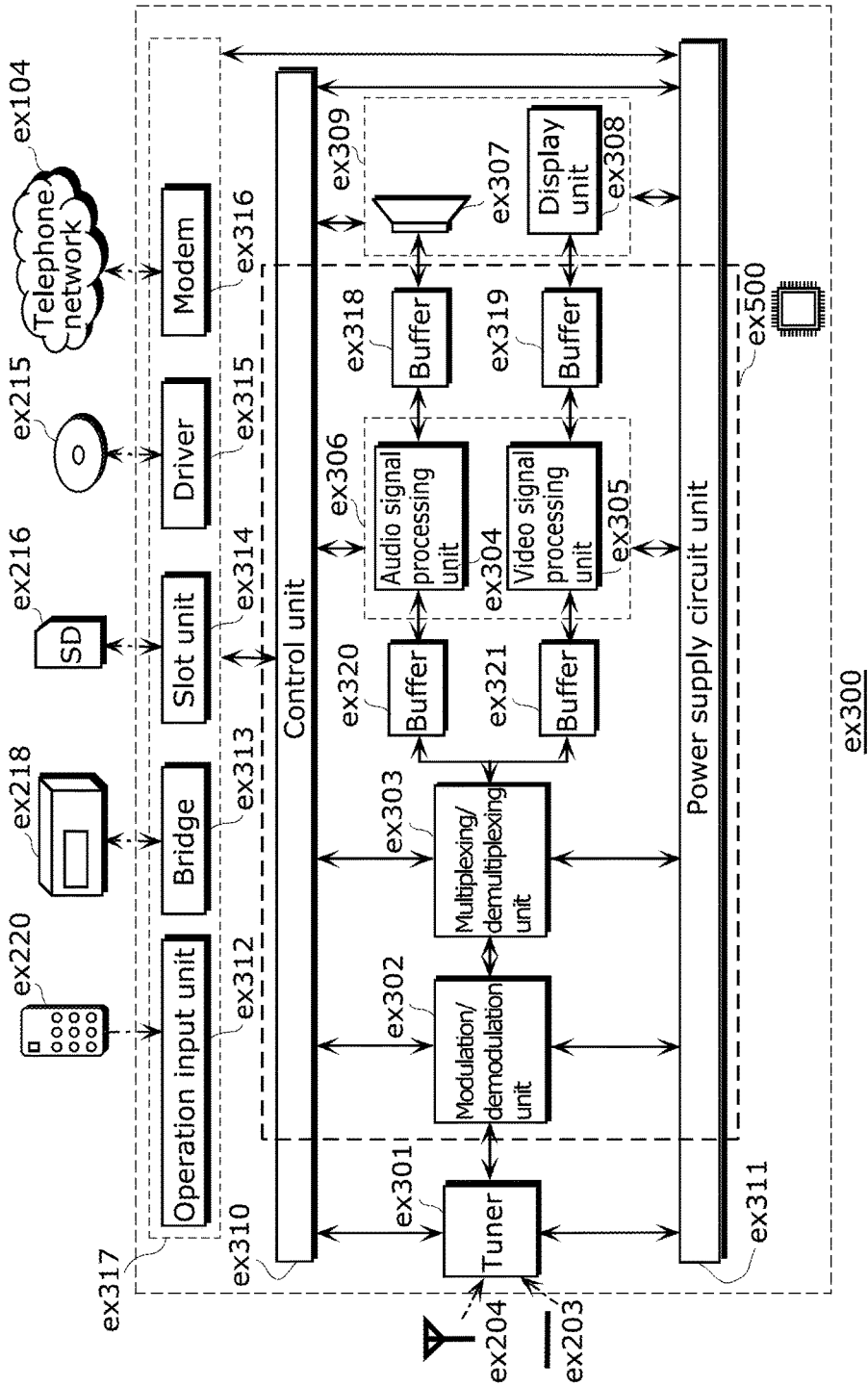
FIG. 42 shows a block diagram illustrating an example of a configuration of a television.

FIG. 42 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 43:
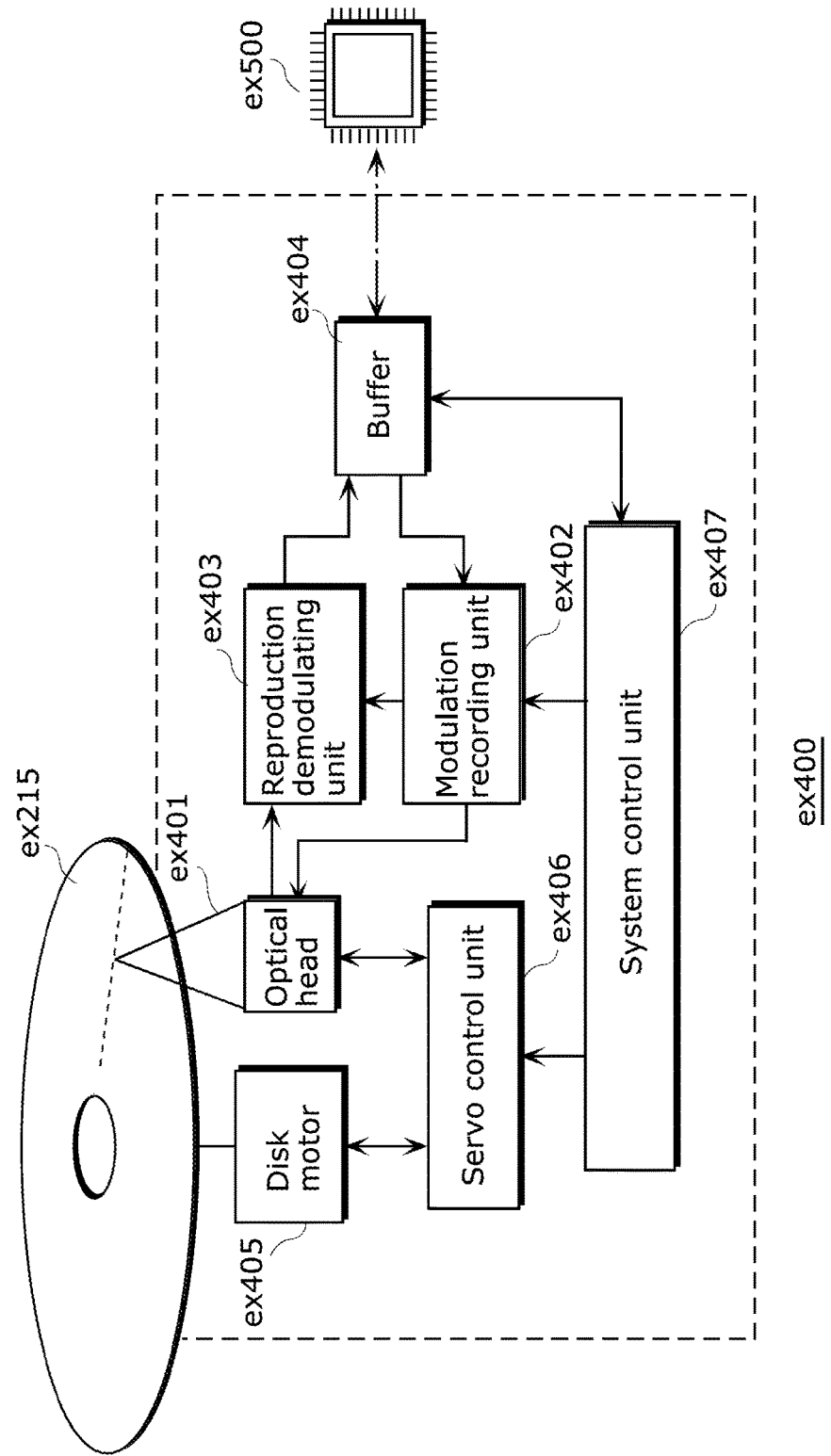
FIG. 43 is a block diagram illustrating an example of a configuration of an information reproducing/recording unit that reads and writes information from and on a recording medium that is an optical disk.

As an example, FIG. 43 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215.

The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 44:
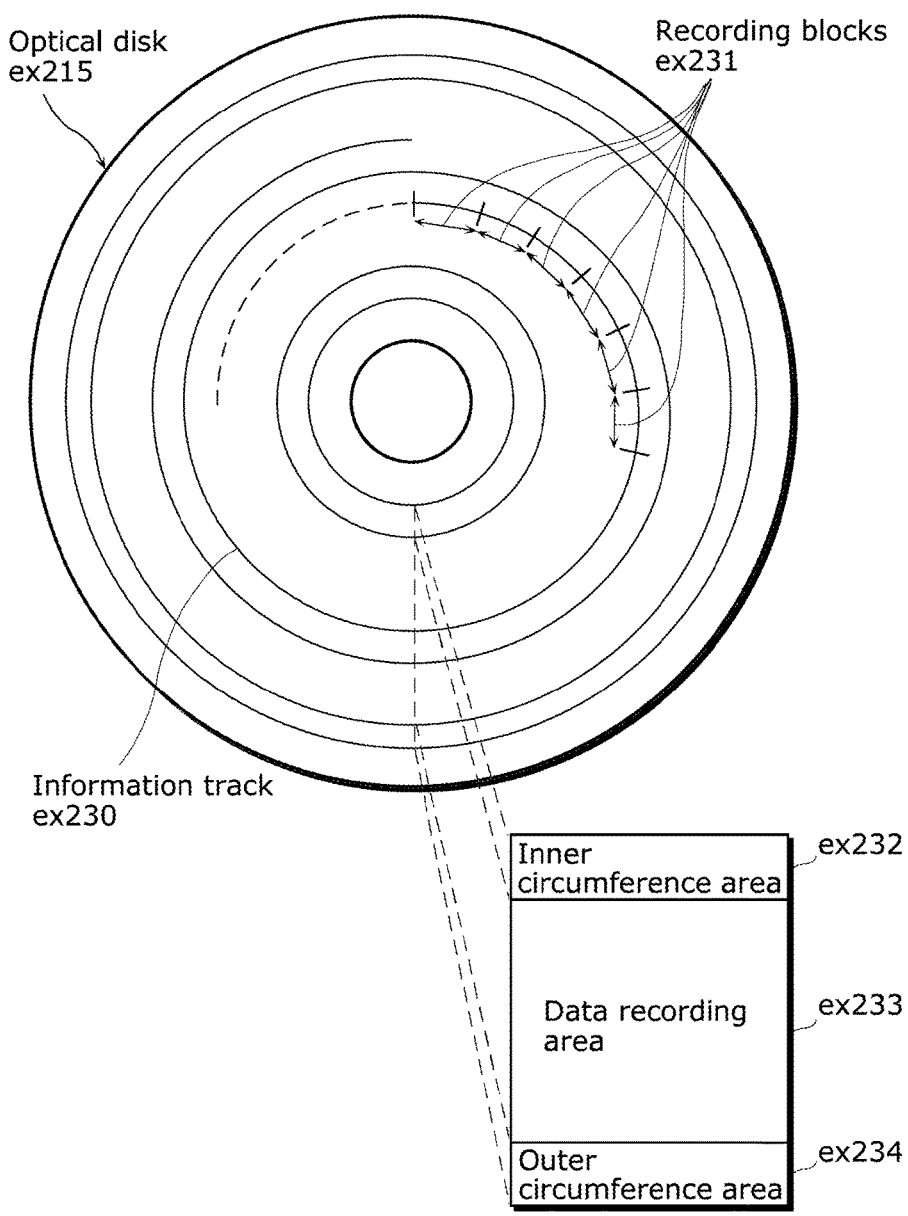
FIG. 44 shows an example of a configuration of a recording medium that is an optical disk.

FIG. 44 illustrates the recording medium ex215 that is the optical disk. On the recording surface of the recording medium ex215, guide grooves are spirally formed, and an information track ex230 records, in advance, address Information Indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 42. The same will be true for the configuration of the computer ex111, the cellular phone ex114, and others.

Figure 45A:
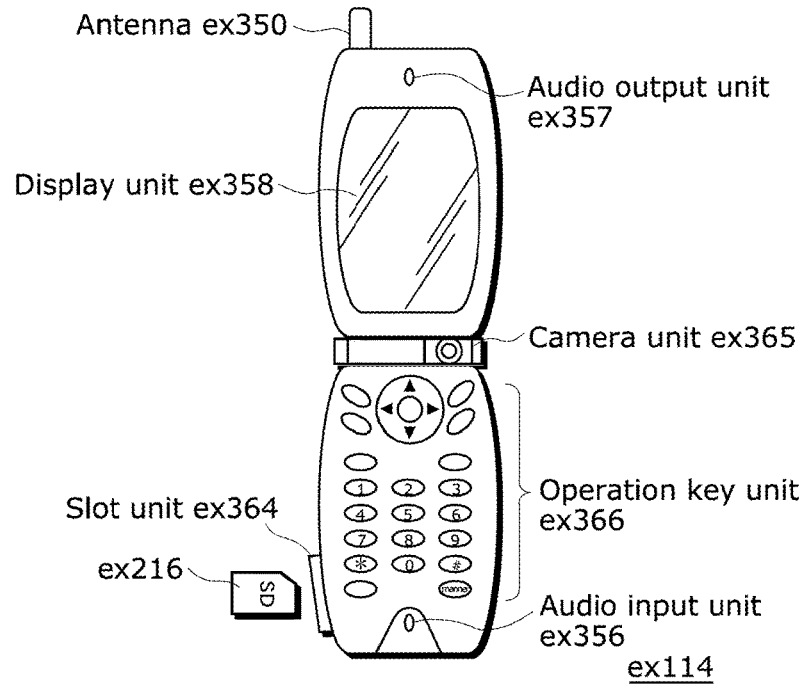
FIG. 45A shows an example of a cellular phone.

FIG. 45A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 45B:
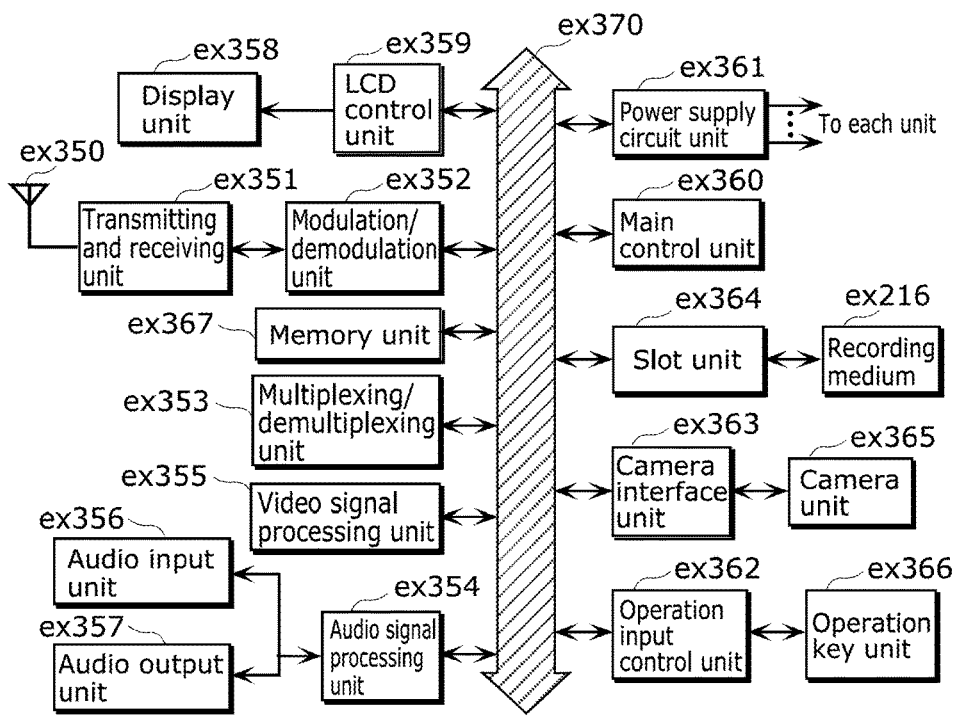
FIG. 45B is a block diagram showing an example of a configuration of a cellular phone.

Next, an example of a configuration of the cellular phone ex114 will be described with reference to FIG. 45B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM.

Then, the modulation/demodulation unit ex352 performs spread spectrum processing on the digital audio signals, and the transmitting and receiving unit ex351 performs digitalto-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio Input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bitstream and an audio data bitstream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 10

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 46 illustrates a structure of the multiplexed data. As illustrated in FIG. 46, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0xB00 to 0x1B1F are allocated to the video streams to be used for secondary video of the movie, and 0x1A00 to 0x1A1F are allocated to the audio streams to be used for the secondary audio to be mixed with the primary audio.

Figure 47:
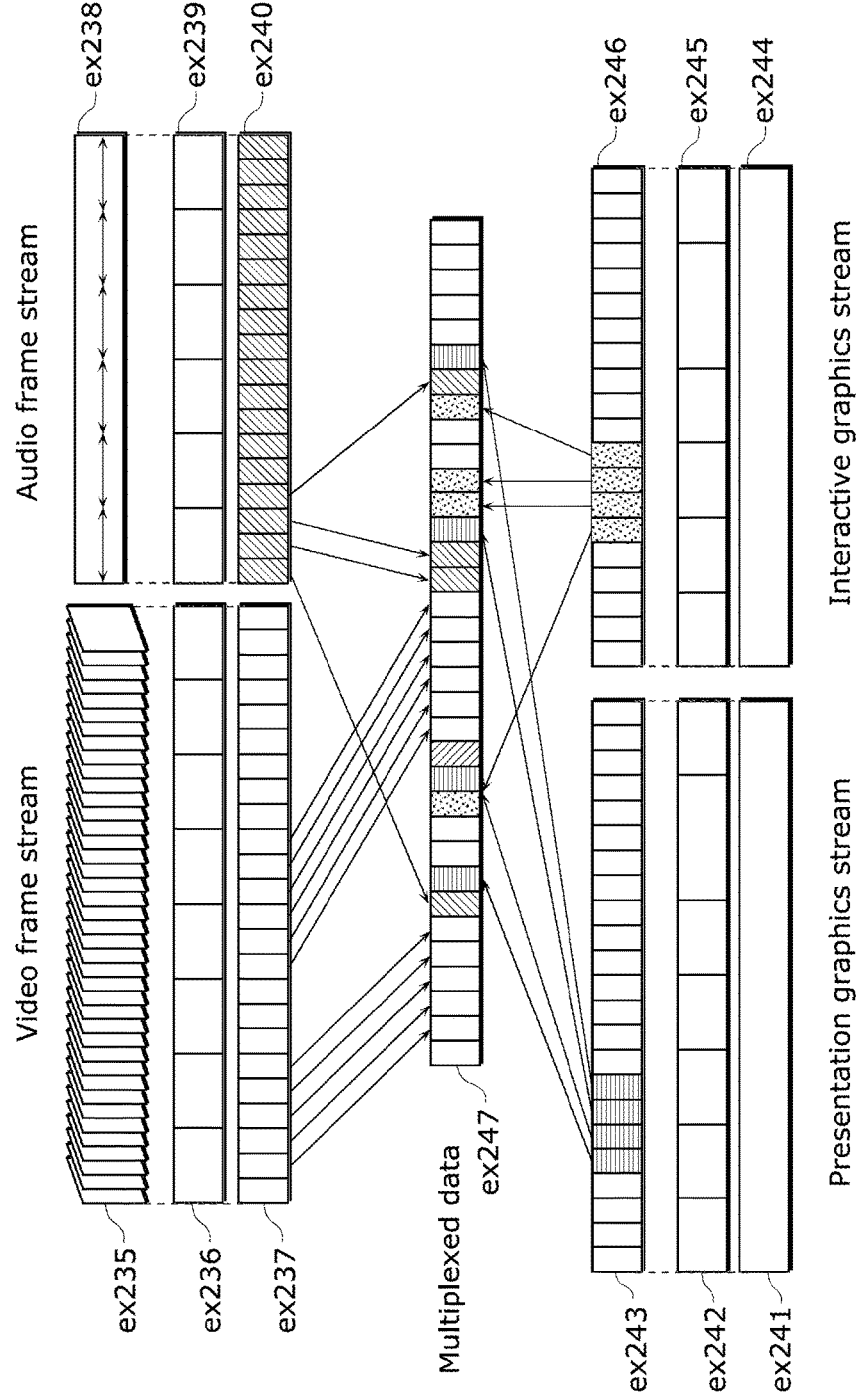
FIG. 47 schematically shows how each stream is multiplexed in multiplexed data.

FIG. 47 schematically Illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 48:
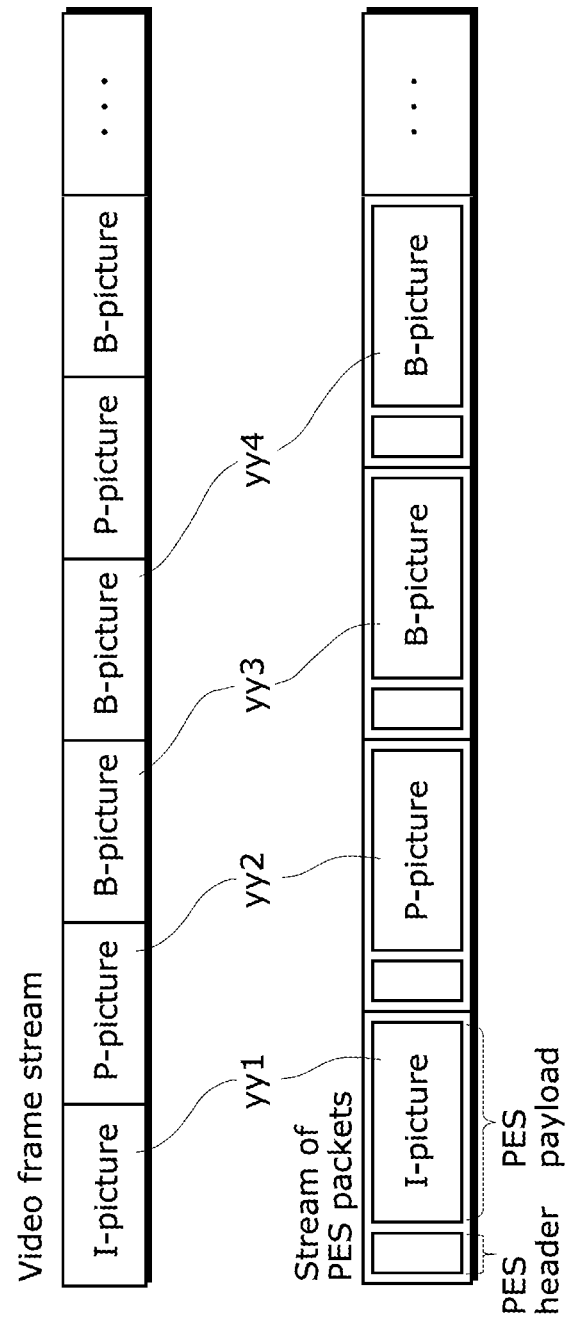
FIG. 48 shows how a video stream is stored in a stream of PES packets in more detail.

FIG. 48 illustrates how a video stream is stored in a stream of PES packets in more detail. The first bar in FIG. 48 shows a video frame stream in a video stream. The second bar shows the stream of PES packets. As indicated by arrows denoted as yy1, yy2, yy3, and yy4 in FIG. 48, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 49:
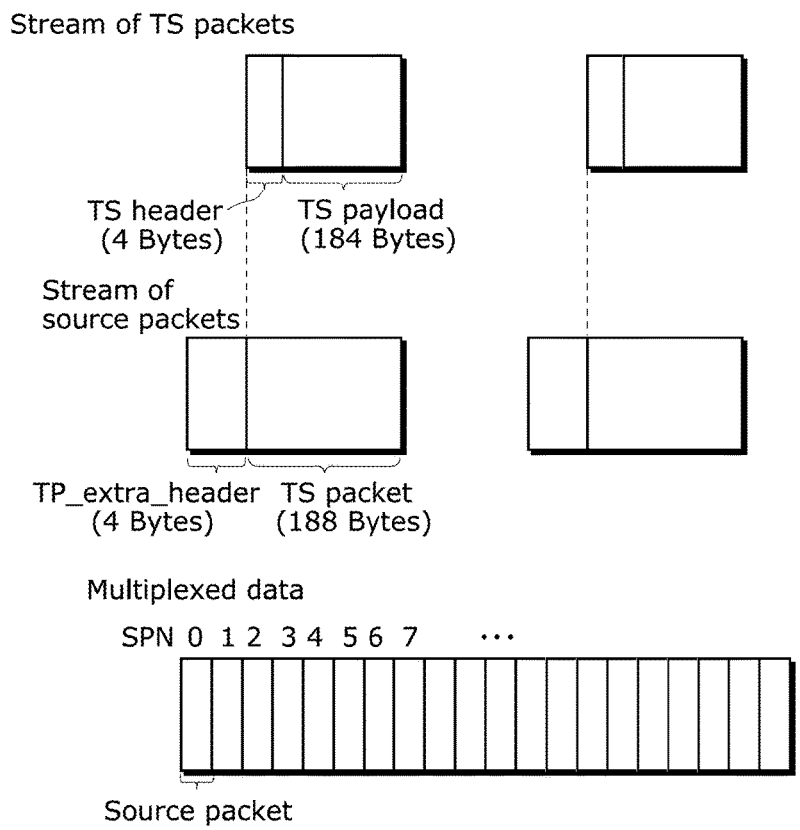
FIG. 49 shows a structure of TS packets and source packets in the multiplexed data.

FIG. 49 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 49. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 50:
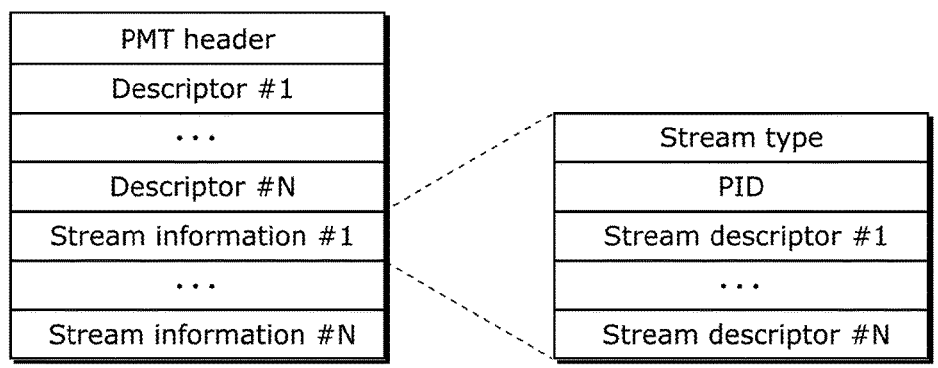
FIG. 50 shows a data structure of a PMT.

FIG. 50 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 51:
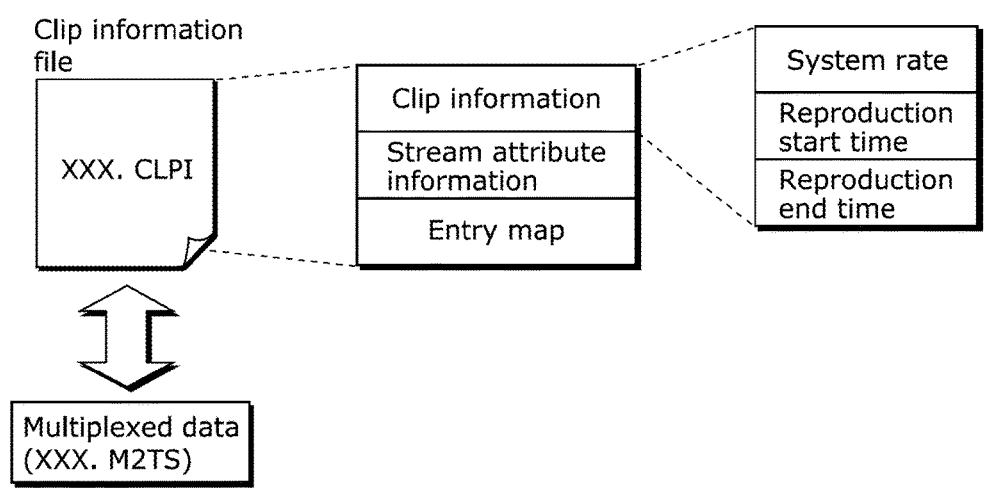
FIG. 51 shows an internal structure of multiplexed data information.

Each of the multiplexed data information files is management information of the multiplexed data as shown in FIG. 51. The multiplexed data information files are in one to one correspondence with the multiplexed data, and each of the files includes multiplexed data information, stream attribute information, and an entry map.

As illustrated in FIG. 51, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 52:
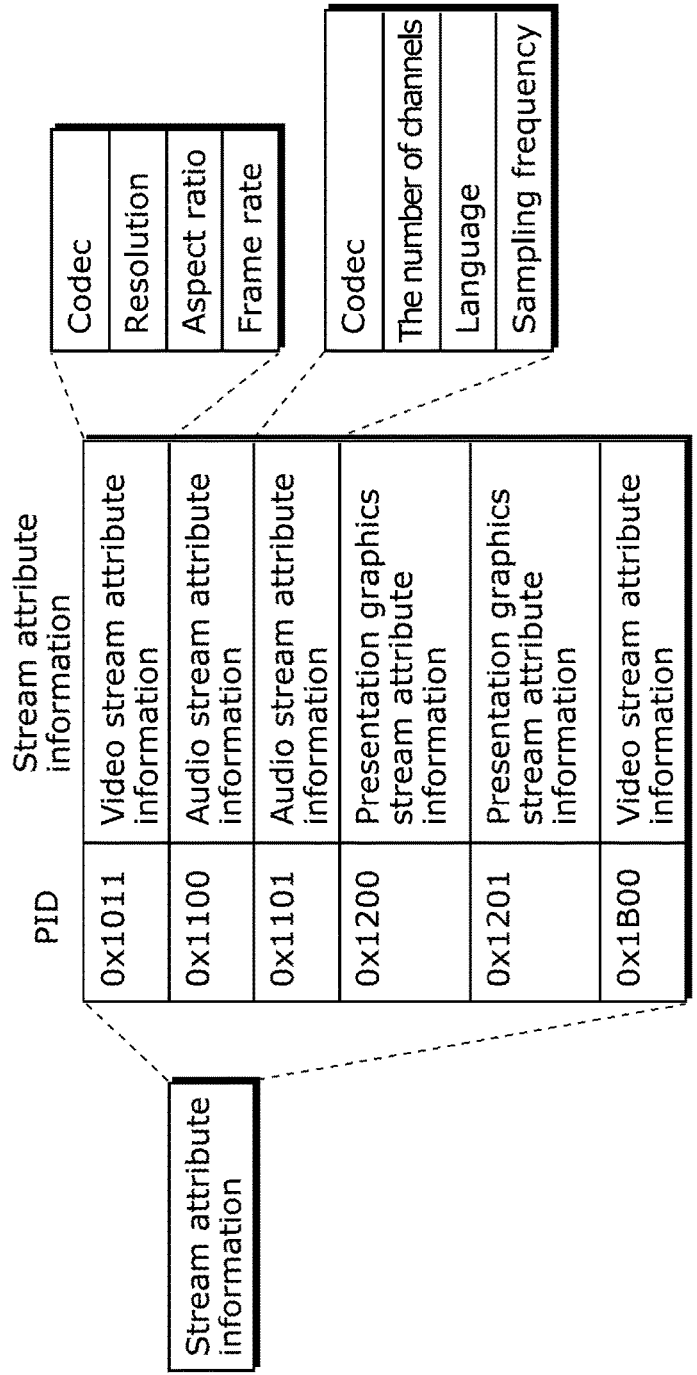
FIG. 52 shows an internal structure of stream attribute information.

As shown in FIG. 52, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 53:
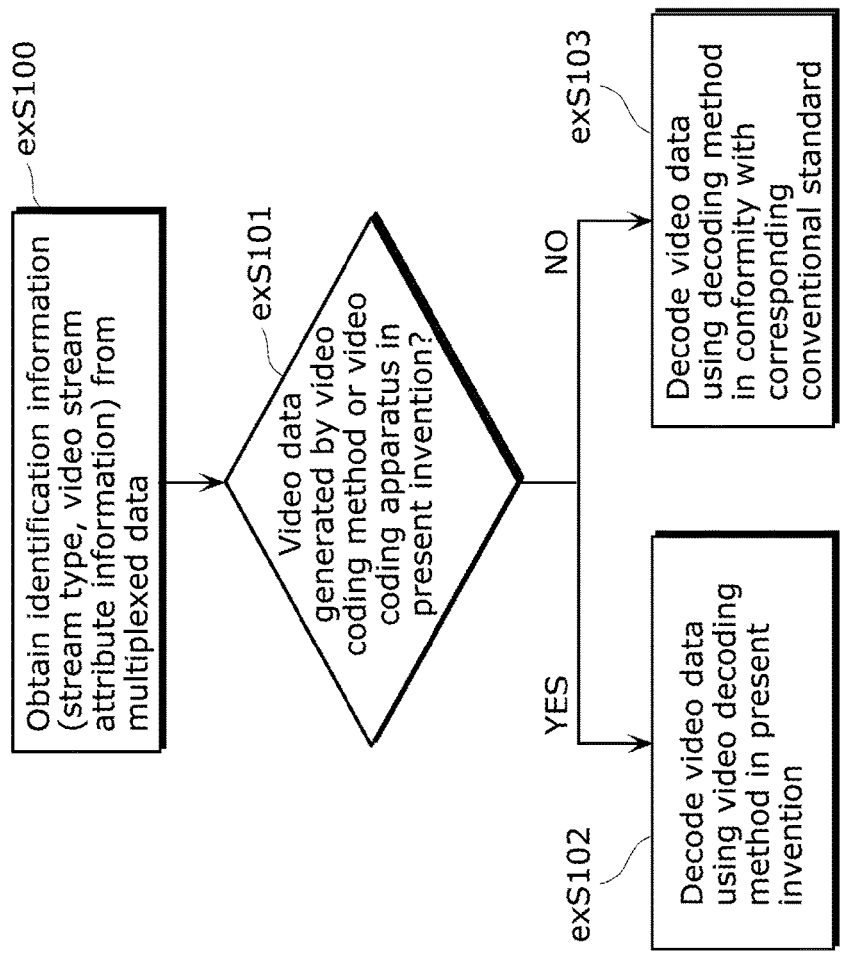
FIG. 53 shows steps for identifying video data.

Furthermore, FIG. 53 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 11

Figure 54:
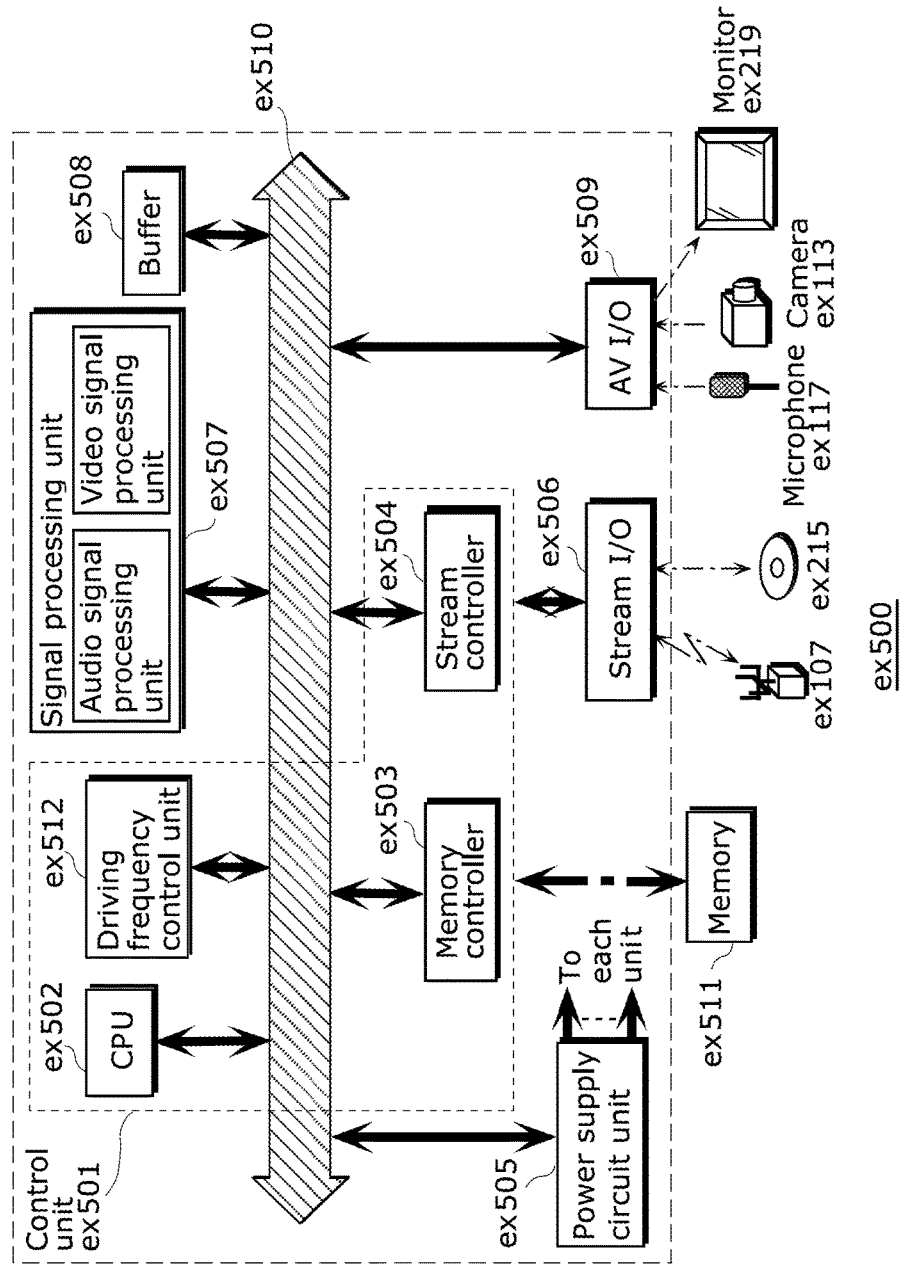
FIG. 54 is a block diagram showing an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 54 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments.

Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 12

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 55:
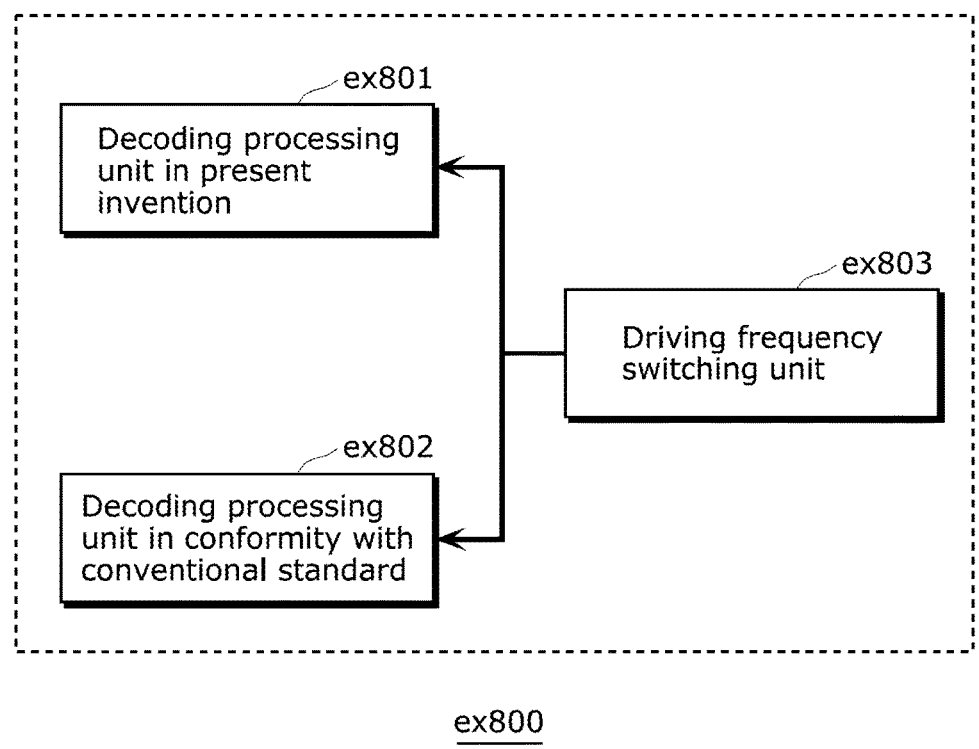
FIG. 55 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 55 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data.

When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 54. Here, each of the decoding processing unit ex801 that executes the moving picture decoding method described in each of embodiments and the decoding processing unit ex802 that conforms to the conventional standard corresponds to the signal processing unit ex507 in FIG. 54. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 10 is probably used for identifying the video data. The identification information is not limited to the one described in Embodiment 10 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 57. The driving frequency can be selected by storing the look-up table in the buffer ex508 and in an internal memory of an LSI, and with reference to the look-up table by the CPU ex502.

Figure 56:
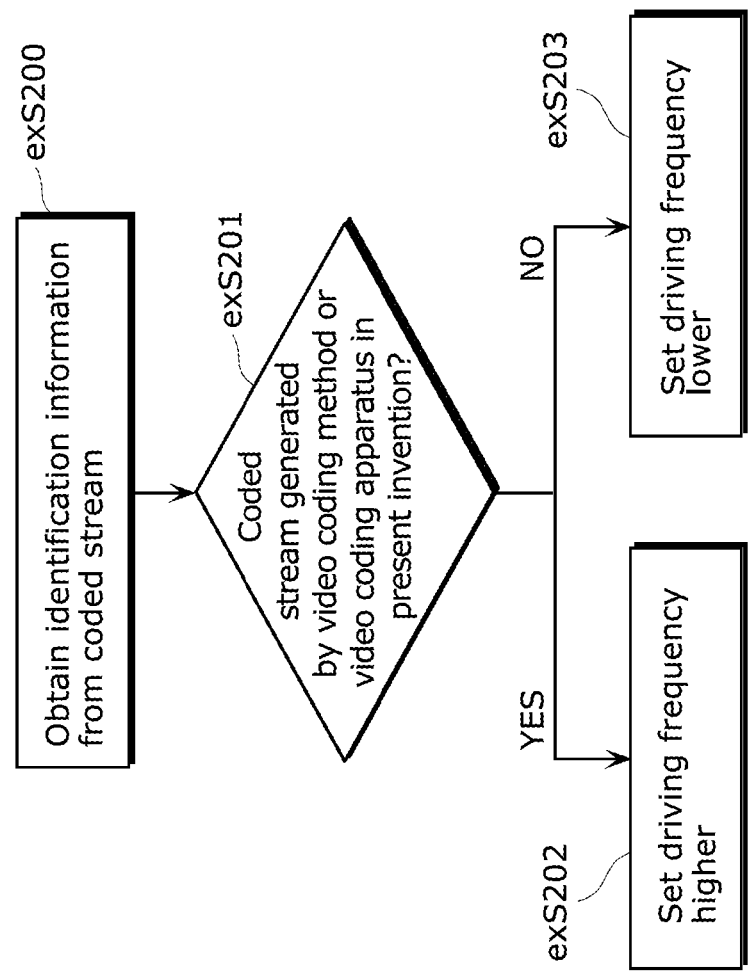
FIG. 56 shows steps for identifying video data and switching between driving frequencies.

FIG. 56 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 13

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 58A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 58B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image coding method and image decoding method according to an aspect of the present disclosure is advantageously applicable to a moving picture coding method and a moving picture decoding method.

What is claimed is:
1. An image coding and decoding apparatus comprising:
a coding apparatus for coding a current block included in a bitstream; and
a decoding apparatus for decoding the current block included in the bitstream,
wherein the coding apparatus includes
a first deriver configured to derive a first candidate having a first motion vector that has been used to code a first block,
a second deriver configured to derive a second candidate having a second motion vector and a first reference picture index value that identifies a first reference picture corresponding to the second motion vector, the second motion vector being a first zero vector,
a third deriver configured to derive a third candidate having a third motion vector and a second reference picture index value that identifies a second reference picture corresponding to the third motion vector, the third motion vector being a second zero vector, the first reference picture index value being different from the second reference picture index value,
a first selector configured to select one candidate from a plurality of candidates being used for coding the current block, the plurality of candidates including the first candidate, the second candidate, and the third candidate, and
a coder configured to code an index identifying the candidate selected by the first selector,
wherein the candidate selected by the first selector includes a motion vector and a reference picture index value,
wherein the decoding apparatus includes
a fourth deriver configured to derive a fourth candidate having a fourth motion vector that has been used to decode the first block,
a fifth deriver configured to derive a fifth candidate having a fifth motion vector and a third reference picture index value that identifies a third reference picture corresponding to the fifth motion vector, the fifth motion vector being a third zero vector,
a sixth deriver configured to derive a sixth candidate having a sixth motion vector and a fourth reference picture index value that identifies a fourth reference picture corresponding to the sixth motion vector, the sixth motion vector being a fourth zero vector, the third reference picture index value being different from the fourth reference picture index value,
a seventh deriver configured to derive, from the bitstream, an index identifying one candidate from a plurality of candidates including the fourth candidate, the fifth candidate, and the sixth candidate, and
a second selector configured to select the candidate identified by the index derived by the seventh deriver,
wherein the candidate selected by the second selector includes a motion vector and a reference picture index value.
2. An image coding and decoding apparatus comprising:
a coding apparatus for coding a current block included in a bitstream; and
a decoding apparatus for decoding the current block included in the bitstream,
wherein the coding apparatus includes at least one of a processor or a circuit configured to derive a first candidate having a first motion vector that has been used to code a first block, derive a second candidate having a second motion vector and a first reference picture index value that identifies a first reference picture corresponding to the second motion vector, the second motion vector being a first zero vector, derive a third candidate having a third motion vector and a second reference picture index value that identifies a second reference picture corresponding to the third motion vector, the third motion vector being a second zero vector, the first reference picture index value being different from the second reference picture index value, select one candidate from a plurality of candidates being used for coding the current block, the plurality of candidates including the first candidate, the second candidate, and the third candidate, and code an index identifying the candidate selected by the coding apparatus, wherein the candidate selected by the coding apparatus includes a motion vector and a reference picture index value, wherein the decoding apparatus includes at least one of a processor or a circuit configured to:

derive a fourth candidate having a fourth motion vector that has been used to decode the first block, derive a fifth candidate having a fifth motion vector and a third reference picture index value that identifies a third reference picture corresponding to the fifth motion vector, the fifth motion vector being a third zero vector, derive a sixth candidate having a sixth motion vector and a fourth reference picture index value that identifies a fourth reference picture corresponding to the sixth motion vector, the sixth motion vector being a fourth zero vector, the third reference picture index value being different from the fourth reference picture index value, derive, from the bitstream, an index identifying one candidate from a plurality of candidates including the fourth candidate, the fifth candidate, and the sixth candidate, and select the candidate identified by the index derived by the decoding apparatus, wherein the candidate selected by the decoding apparatus includes a motion vector and a reference picture index value.

* * * * *